(12) United States Patent
Takamiya

(10) Patent No.: US 8,159,599 B2
(45) Date of Patent: Apr. 17, 2012

(54) FOCUS DETECTION APPARATUS, FOCUS DETECTION METHOD, AND IMAGE SENSING APPARATUS

(75) Inventor: Makoto Takamiya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 320 days.

(21) Appl. No.: 12/636,509

(22) Filed: Dec. 11, 2009

(65) Prior Publication Data

US 2010/0157094 A1    Jun. 24, 2010

(30) Foreign Application Priority Data

Dec. 24, 2008 (JP) ................................. 2008-328659

(51) Int. Cl.
*H04N 5/232* (2006.01)
*G03B 3/10* (2006.01)

(52) U.S. Cl. ........................................ 348/345; 396/121

(58) Field of Classification Search .................. 348/345, 348/348, 349, 350, 355, 356, 251; 396/89, 396/121, 122, 128, 140; 359/618, 626
See application file for complete search history.

(56) References Cited

U.S. PATENT DOCUMENTS

| | | | |
|---|---|---|---|
| 4,410,804 A | | 10/1983 | Stauffer |
| 4,914,282 A | * | 4/1990 | Akashi et al. .............. 250/201.8 |
| 5,191,201 A | * | 3/1993 | Kusaka et al. ................. 396/121 |
| 5,367,153 A | * | 11/1994 | Suda et al. ..................... 396/114 |
| 5,784,655 A | * | 7/1998 | Akashi et al. ................. 396/128 |
| 5,880,890 A | * | 3/1999 | Furuta ............................. 359/626 |
| 5,955,753 A | | 9/1999 | Takahashi |
| 5,995,144 A | * | 11/1999 | Sasakura ........................ 348/350 |
| 7,358,999 B2 | * | 4/2008 | Ikeda .............................. 348/349 |
| 7,474,352 B2 | * | 1/2009 | Oikawa .......................... 348/345 |
| 2009/0256952 A1 | * | 10/2009 | Kusaka .......................... 348/349 |

FOREIGN PATENT DOCUMENTS

| | | |
|---|---|---|
| JP | 58-024105 | 2/1983 |
| JP | 05-127074 | 5/1983 |
| JP | 09-046596 | 2/1997 |
| JP | 2005-106994 | 4/2005 |

\* cited by examiner

*Primary Examiner* — Nhan T Tran

(74) *Attorney, Agent, or Firm* — Cowan, Liebowitz & Latman, P.C.

(57) ABSTRACT

A focus detection apparatus includes an image sensor which includes a pair of pixel groups, outputs a first image signal from one of the pair of pixel groups, and outputs a second image signal from the other of the pair of pixel groups, where the pair of pixel groups receive luminous fluxes passing different pupil regions of an imaging optical system which forms an object image; a calculation unit which generates a first corrected image signal by subtracting the second image signal multiplied by a coefficient from the first image signal and generates a second corrected image signal by subtracting the first image signal multiplied by a coefficient from the second image signal; and a focus detection unit which detects a defocus amount based on a phase difference between the first corrected image signal and the second corrected image signal generated by the calculation unit.

8 Claims, 39 Drawing Sheets

PLAN VIEW

A-A SECTIONAL VIEW

PLAN VIEW

B-B SECTIONAL VIEW

FOCUS DETECTION APPARATUS, FOCUS DETECTION METHOD, AND IMAGE SENSING APPARATUS

BACKGROUND OF THE INVENTION

1. Field of the Invention

The present invention relates to a focus detection apparatus, focus detection method, and image sensing apparatus, and more particularly, to a focus detection apparatus and focus detection method used in an image sensing apparatus, such as a digital still camera, capable of detecting a focus state of a photographing lens based on an image obtained from an image sensor for image sensing.

2. Description of the Related Art

Regarding systems for detecting a focus state of a photographing lens in a digital camera which photographs using an image sensor, an apparatus which performs pupil division-based focus detection using a two-dimensional sensor is disclosed in Japanese Patent Laid-Open No. 58-24105 (p. 2, FIG. 1), where the two-dimensional sensor has a microlens formed in each pixel. In the apparatus disclosed in Japanese Patent Laid-Open No. 58-24105, a photoelectric converter in each pixel of the image sensor is divided into multiple parts and the divided photoelectric converter is configured to receive a luminous flux passing different areas of a pupil of the photographing lens via the microlens.

Also, in Japanese Patent Laid-Open No. 2005-106994 (p. 7, FIG. 3), the present inventor discloses a solid-state image sensing apparatus which performs pupil division-based focus detection using a CMOS image sensor (solid-state image sensing apparatus) used in a digital still camera. With the solid-state image sensing apparatus disclosed in Japanese Patent Laid-Open No. 2005-106994, in some of a large number of pixels in the solid-state image sensing apparatus, the photoelectric converter is divided into two parts to detect focus state of the photographing lens. The photoelectric converter is configured to receive a luminous flux passing a predetermined area of a pupil of the photographing lens via the microlens.

Also, Japanese Patent Laid-Open No. 5-127074 (p. 15, FIG. 34) discloses a technique for detecting focus state after deforming a specific filter contained in a camera according to an aperture ratio, exit pupil position, and amount of image displacement and adapting the deformed filter to an object image.

However, in detecting focus state by dividing the photoelectric converter of each pixel into two light-receiving areas, since vignetting is caused in the luminous flux by a lens frame of the photographing lens and the like, it is difficult for each light-receiving area of the photoelectric converter to maintain photosensitivity characteristics. Consequently, it is difficult to maintain agreement of photosensitivity characteristics, that is, agreement in blur shape between a pair of images.

Thus, there is poor agreement between an image generated by a luminous flux passing through a first region of a pupil of the photographing lens and an image generated by a luminous flux passing through a second region different from the first region. Consequently, the inventions disclosed in Japanese Patent Laid-Open Nos. 58-24105 and 2005-106994 have a problem in that accurate focus detection is not possible on peripheries of the photographic screen if correlation calculation is performed based on two images generated by luminous fluxes passing through different regions on the pupil of the photographing lens.

On the other hand, the invention disclosed in Japanese Patent Laid-Open No. 5-127074 describes a method for deforming the specific filter contained in the camera according to a defocus amount and thereby performing convolution integration. However, since it is necessary to perform convolution integration for each defocus amount, the method requires massive amounts of calculation. Thus, the method has a problem in that it is difficult to ensure low costs and space savings when implementing the convolution integration in a realizable arithmetic processing circuit.

SUMMARY OF THE INVENTION

The present invention has been made in consideration of the above situation, and has as its object to enable restoring images by simple calculations according to vignetting state of a luminous flux and thereby improve focusing accuracy.

According to the present invention, provided is a focus detection apparatus comprising: an image sensor which includes a pair of pixel groups, outputs a first image signal from one of the pair of pixel groups, and outputs a second image signal from the other of the pair of pixel groups, where the pair of pixel groups receive luminous fluxes passing different pupil regions of an imaging optical system which forms an object image; a calculation unit which generates a first corrected image signal by subtracting the second image signal multiplied by a coefficient from the first image signal and generates a second corrected image signal by subtracting the first image signal multiplied by a coefficient from the second image signal; and a focus detection unit which detects a defocus amount based on a phase difference between the first corrected image signal and the second corrected image signal generated by the calculation unit.

Further, according to the present invention, provided is an image sensing apparatus comprising: an imaging optical system which form an object image; and the focus detection apparatus mentioned above.

Further, according to the present invention, provided is a focus detection apparatus comprising: an image sensor which includes a pair of pixel groups, outputs a first image signal from one of the pair of pixel groups, and outputs a second image signal from the other of the pair of pixel groups, where the pair of pixel groups receive luminous fluxes passing different pupil regions of an imaging optical system which forms an object image; a calculation unit which generates a first corrected image signal based on the first image signal and on the second image signal multiplied by a coefficient corresponding to an image height and generates a second corrected image signal based on the second image signal and on the first image signal multiplied by a coefficient corresponding to the image height; and a focus detection unit which detects a defocus amount based on a phase difference between the first corrected image signal and the second corrected image signal generated by the calculation unit.

Furthermore, according to the present invention, provided is a focus detection method comprising: an image sensing step of outputting a first image signal from one of a pair of pixel groups and outputting a second image signal from the other of the pair of pixel groups, where the pair of pixel groups receive luminous fluxes passing different pupil regions of an imaging optical system which form an object image; a calculation step of generating a first corrected image signal by subtracting the second image signal multiplied by a coefficient from the first image signal, and generating a second corrected image signal by subtracting the first image signal multiplied by a coefficient from the second image signal; and a focus detection step of detecting a defocus amount based on a phase difference between the first corrected image signal and the second corrected image signal generated in the calculation step.

Further features of the present invention will become apparent from the following description of exemplary embodiments (with reference to the attached drawings).

DESCRIPTION OF THE EMBODIMENTS

Preferred embodiments of the present invention will be described in detail in accordance with the accompanying drawings. The dimensions, shapes and relative positions of the constituent parts shown in the embodiments should be changed as convenient depending on various conditions and on the structure of the apparatus adapted to the invention, and the invention is not limited to the embodiments described herein.

First Embodiment

Figure 1:
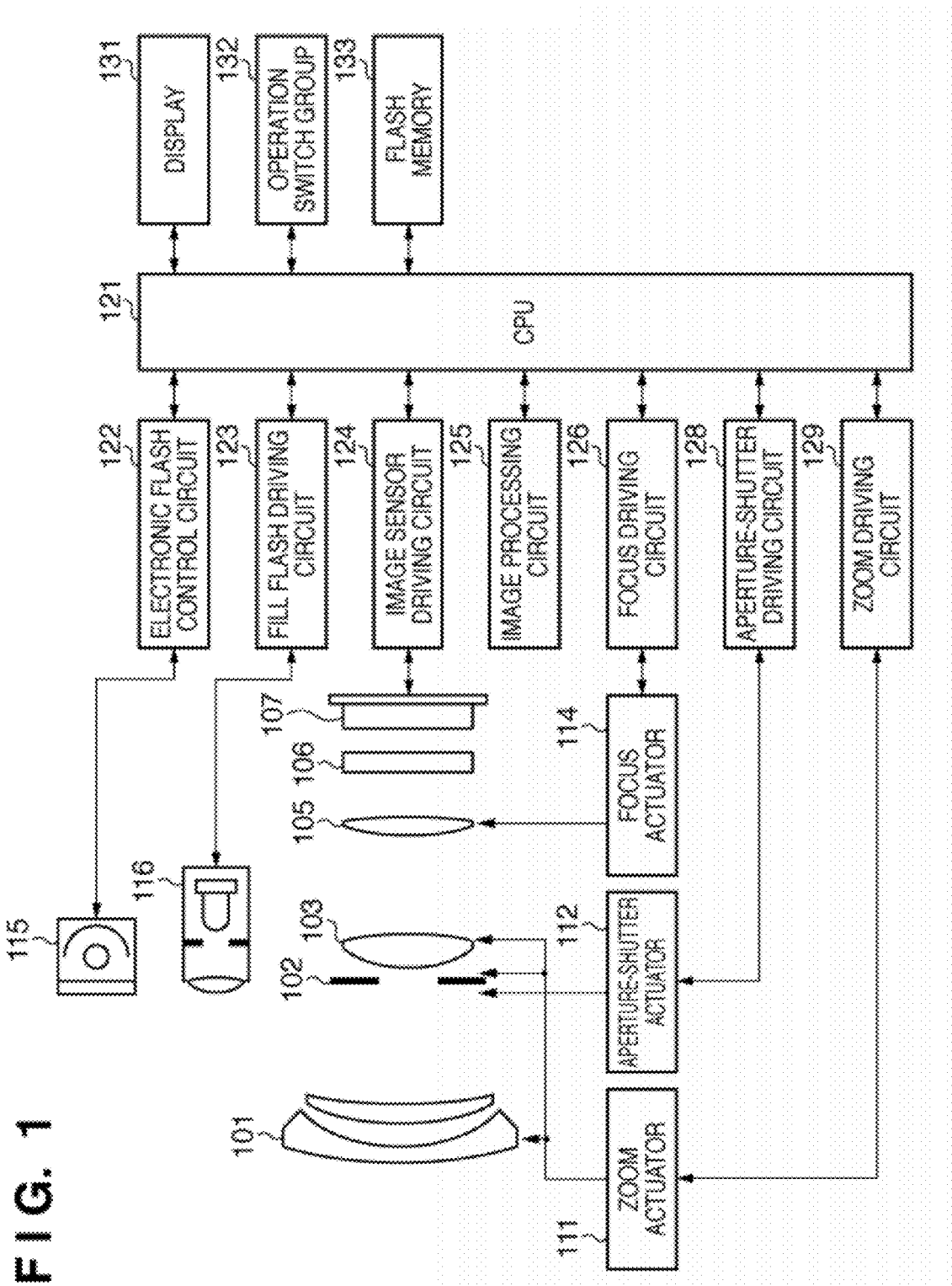
FIG. 1 is a block diagram showing a configuration of a camera according to an embodiment of the present invention.

FIG. 1 is a block diagram of an image sensing apparatus according to a first embodiment of the present invention, showing an electronic camera made up of a camera body containing an image sensor, and a photographic optical system integral with the camera body. In FIG. 1, reference numeral 101 denotes a first lens group placed at the distal end of the photographic optical system (imaging optical system), being held in such a way as to be able to move forward and backward along an optical axis. Reference numeral 102 denotes an aperture-shutter which has capabilities to adjust an amount of light during shooting through adjustment of an aperture diameter and adjust exposure time (in fractions of a second) during still image shooting. Reference numeral 103 denotes a second lens group. The aperture-shutter 102 and second lens group 103 move forward and backward integrally along an optical axis, and performs a scaling operation (zoom function) in conjunction with forward and backward movement of the first lens group 101.

Reference numeral 105 denotes a third lens group which performs focus adjustment by moving forward and backward along the optical axis. Reference numeral 106 denotes an optical low pass filter which is an optical element used to reduce false colors and moire in shot images. Reference numeral 107 denotes an image sensor which includes a CMOS image sensor and peripheral circuits of the CMOS image sensor. The image sensor 107 uses a two-dimensional single-plate color sensor which has multiple light-receiving pixels, with m pixels arranged in a horizontal direction and n pixels arranged in a vertical direction, over which a Bayer array of primary-color mosaic filters is formed on chip.

Reference numeral 111 denotes a zoom actuator which turns a cam barrel (not shown) and thereby drives the first lens group 101 and second lens group 103 forward and backward along the optical axis, to perform a scaling operation. Reference numeral 112 denotes an aperture-shutter actuator which adjusts an amount of photographic light by controlling the aperture diameter of the aperture-shutter 102 and controls the exposure time during still image shooting. Reference numeral 114 denotes a focus actuator which performs focus adjustment by moving the third lens group 105 forward and backward along the optical axis.

Reference numeral 115 denotes an electronic flash used to illuminate an object at the time of photography. A flash lighting system which uses a xenon tube is used preferably, but a lighting system equipped with a LED which emits light successively may be used alternatively. Reference numeral 116 denotes an AF fill flash unit which projects an image of a mask provided with a predetermined open pattern to an object field via a projection lens to improve focus detection capability with respect to a dark object or low-contrast object.

Reference numeral 121 denotes a CPU which performs various types of control over the camera body in the image sensing apparatus. The CPU 121 includes, for example, a calculation unit, ROM, RAM, A/D converter, D/A converter, and communications interface circuit. Based on a predetermined program stored in the ROM, the CPU 121 performs a series of operations including AF, shooting, image processing, and recording operations by driving a various circuits of the image sensing apparatus.

Reference numeral 122 denotes an electronic flash control circuit which performs lighting control of the electronic flash 115 in synchronization with shooting operation. Reference numeral 123 denotes a fill flash driving circuit which performs lighting control of the AF fill flash unit 116 in synchronization with focus detection operation. Reference numeral 124 denotes an image sensor driving circuit which controls image sensing operation of the image sensor 107 as well as performs A/D conversion of an acquired image signal and transmits the resulting image signal to the CPU 121. Reference numeral 125 denotes an image processing circuit which performs γ conversion, color interpolation, JPEG compression, and other processes on an image acquired by the image sensor 107.

Reference numeral 126 denotes a focus driving circuit which controls driving of the focus actuator 114 based on results of focus detection, thereby moves the third lens group 105 forward and backward along the optical axis, and thereby performs focus adjustment. Reference numeral 128 denotes an aperture-shutter driving circuit which controls driving of the aperture-shutter actuator 112 and thereby controls opening of the aperture-shutter 102. Reference numeral 129 denotes a zoom driving circuit which drives the zoom actuator 111 in response to a zoom operation performed by a photographer.

Reference numeral 131 denotes a display such as an LCD which displays information about shooting mode of the image sensing apparatus, a preview image before shooting and a confirmation image after shooting, a focus state display image brought up when focus is detected, and the like. Reference numeral 132 denotes an operation switch group which includes a power switch, release (shutter trigger) switch, zoom operation switch, shooting mode selector switch, and the like. Reference numeral 133 denotes a detachable flash memory used to record shot images.

Figure 2:
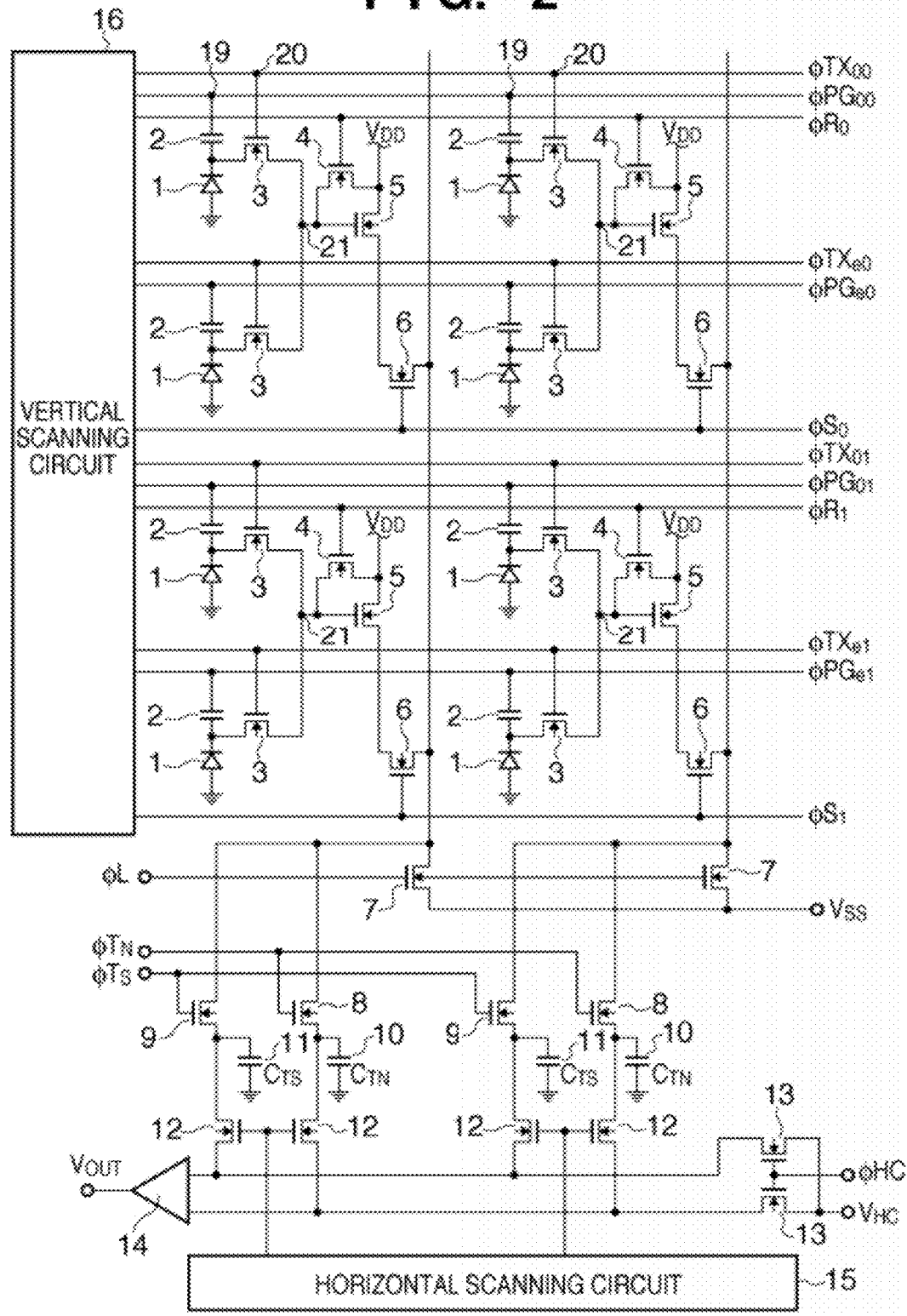
FIG. 2 is a circuit diagram showing an exemplary configuration of an image sensor according to the embodiment of the present invention.

FIG. 2 is a circuit diagram showing a schematic configuration of the image sensor 107 according to the present embodiment which can suitably use, for example, a technique disclosed in Japanese Patent Laid-Open No. 09-046596 and the like by the present inventor. Although FIG. 2 shows a range covering 2 columns×4 rows of pixels in a two-dimensional CMOS area sensor, actually a large number of pixels such as shown in FIG. 2 are arranged to obtain high-resolution images. Incidentally, according to the present embodiment, it is assumed that the image sensor has a pixel pitch of 2 μm, effective pixel count of 3000 columns wide×2000 rows high for a total of 600 million pixels, and image sensing screen size of 6 mm wide×4 mm high.

In FIG. 2, reference numeral 1 denotes a photoelectric converter of a photoelectric conversion device which includes a MOS transistor gate and a depletion layer under the gate, reference numeral 2 denotes a photogate, reference numeral 3 denotes a transfer switch MOS transistor, and reference numeral 4 denotes a reset MOS transistor. Reference numeral 5 denotes a source follower amplifier MOS transistor, reference numeral 6 denotes a horizontal selector switch MOS transistor, and reference numeral 7 denotes a source follower load MOS transistor. Reference numeral 8 denotes a dark signal transfer MOS transistor, reference numeral 9 denotes an image signal transfer MOS transistor, reference numeral 10 denotes a dark signal storage capacitor $C_{TN}$, and reference numeral 11 denotes an image signal storage capacitor $C_{TS}$. Reference numeral 12 denotes a horizontal transfer MOS transistor, reference numeral 13 denotes a horizontal output line reset MOS transistor, reference numeral 14 denotes a differential amplifier, reference numeral 15 denotes a horizontal scanning circuit, and reference numeral 16 denotes a vertical scanning circuit.

Figure 3:
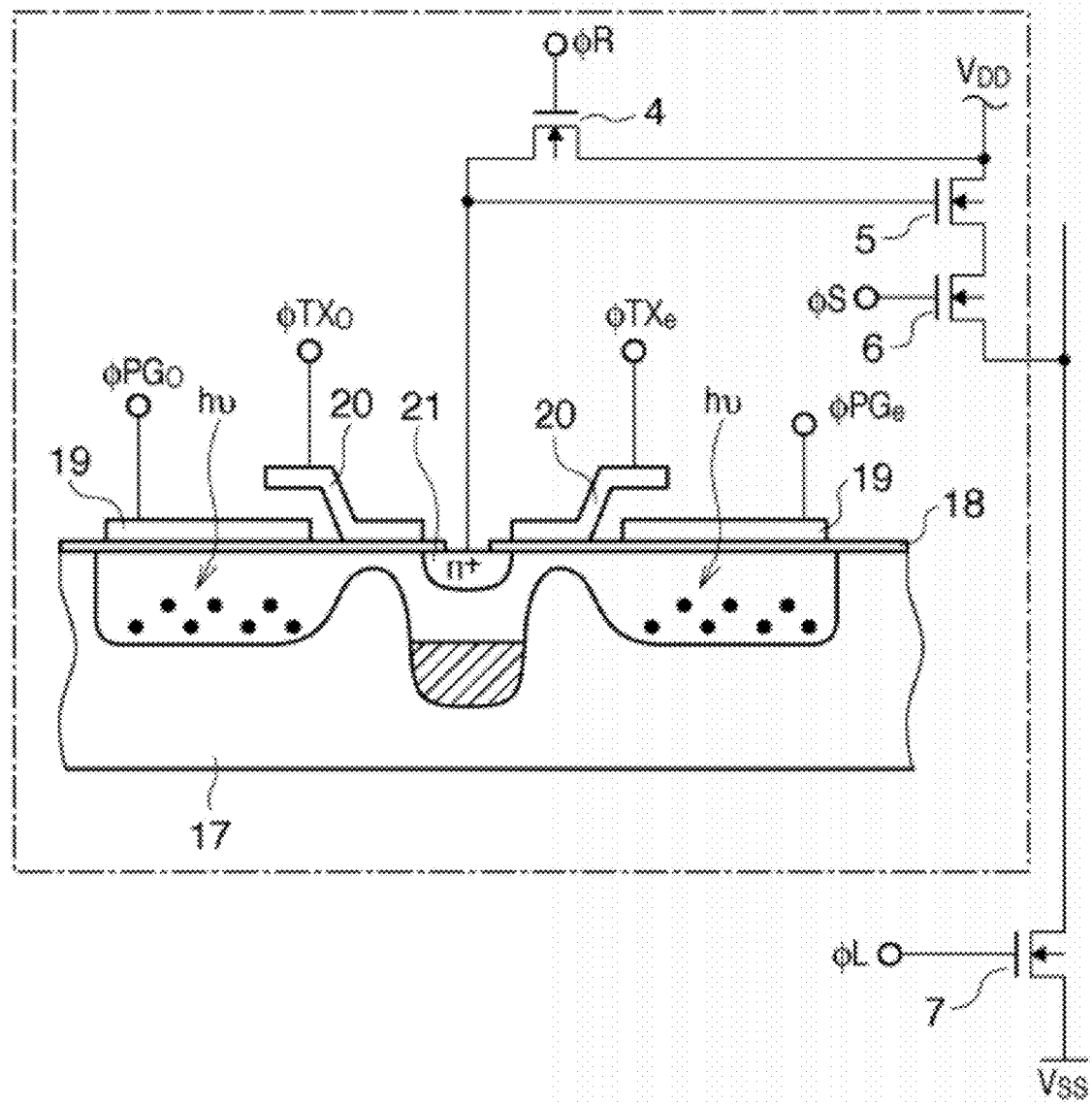
FIG. 3 is a sectional view of a wired portion which spans two pixels of the image sensor according to the embodiment of the present invention.

FIG. 3 is a sectional view of a wired portion which spans two pixels in the Y-direction in FIG. 2. In FIG. 3, reference numeral 17 denotes a p-type well, reference numeral 18 denotes a gate oxide film, reference numeral 19 denotes a first polysilicon layer, reference numeral 20 denotes a second polysilicon layer, and reference numeral 21 denotes an n+ floating diffusion (FD) portion. The FD portion 21 is connected with two photoelectric converters via two transfer MOS transistors. In FIG. 3, drains of two transfer switch MOS transistors 3 and the FD portion 21 are shared to improve sensitivity through capacitance reduction of the FD portion 21 and miniaturization. However, the FD portion 21 may be connected by aluminum (Al) wiring.

Figure 4:
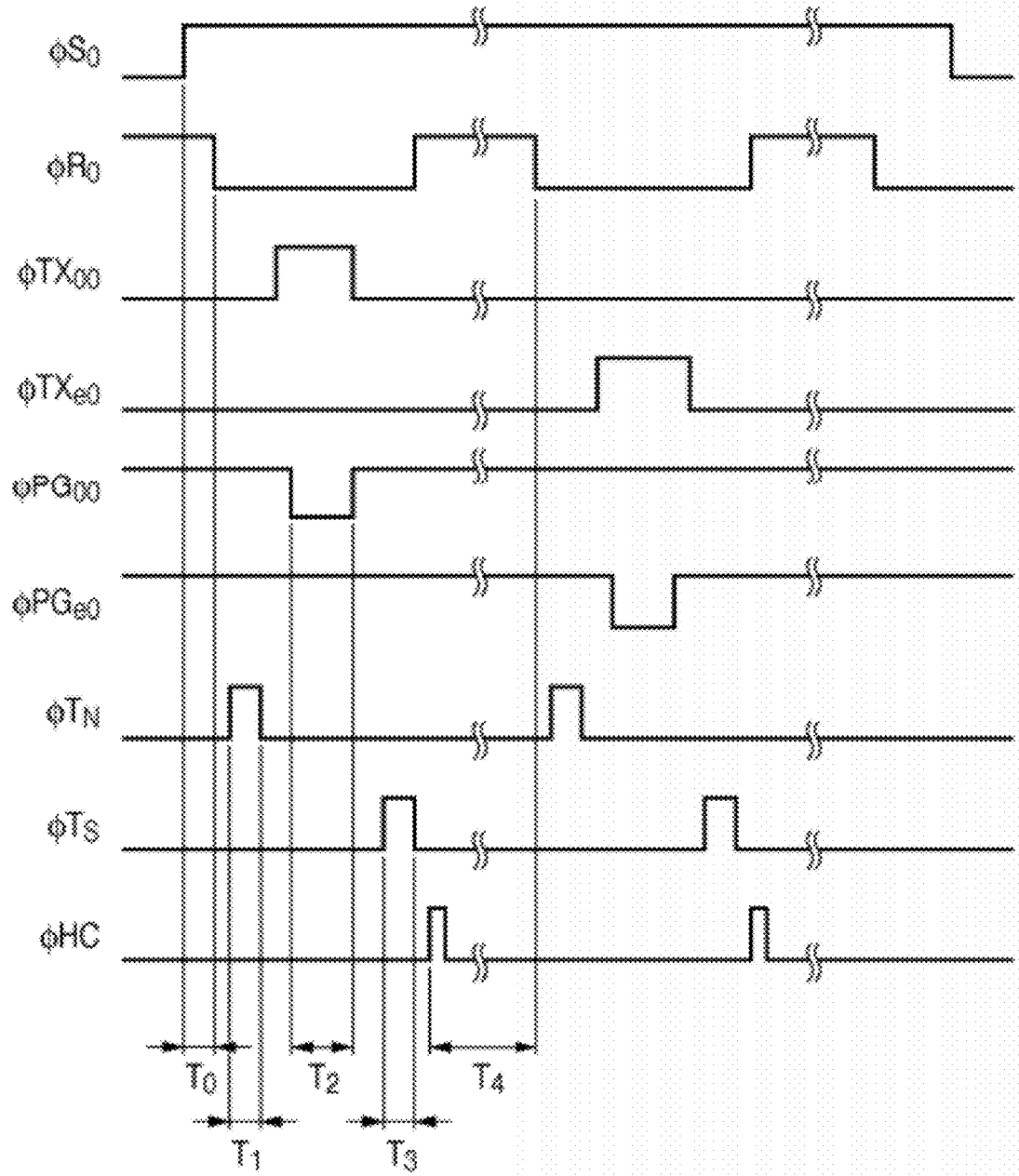
FIG. 4 is a timing chart for driving the image sensor according to the embodiment of the present invention.

Next, operation of independent outputs from all pixels in the image sensor 107 shown in FIGS. 2 and 3 will be described with reference to a timing chart in FIG. 4.

First, in response to a timing output from the vertical scanning circuit 16, a control pulse ϕL is set High to reset a vertical output line. Also, control pulses $\phi R_0$, $\phi G_{o0}$, and $\phi G_{e0}$ are set High to turn on the reset MOS transistor 4 and set the first polysilicon layer 19 of the photogate 2 to High. At time $T_0$, a control pulse $\phi S_0$ is set High to turn on the horizontal selector switch MOS transistor 6 and thereby select the pixels on the first and second lines. Next, the control pulse $\phi R_0$ is set Low to release the FD portion 21 from reset state and put the FD portion 21 into floating state and thereby cause the source follower amplifier MOS transistor 5 to conduct between gate and source. Subsequently, at time $T_1$, a control pulse $\phi T_N$ is set High to cause the FD portion 21 to output a dark voltage to the storage capacitor $C_{TN}$ 10 through source follower operation.

Next, in order to obtain photoelectric conversion outputs from the pixels of the first line, a control pulse $\phi TX_{00}$ for the first line is set High to bring the transfer switch MOS transistor 3 into conduction. After that, at time $T_2$, the control pulse $\phi G_{o0}$ is set Low. In so doing, preferably voltage relationship is such as to shallow potential wells which are spread below the photogate 2 and completely transfer light-generating carriers to the FD portion 21. Thus, as long as complete transfer is possible, a fixed potential may be used instead of the control pulse ϕTX.

At time $T_2$, as charge is transferred from the pixels of the first line of a photodiode to the FD portion 21, potential of the FD portion 21 changes according to light. Since the source follower amplifier MOS transistor 5 is in a floating state, a control pulse $\phi T_s$ is set High at time $T_3$ to output the potential of the FD portion 21 to the storage capacitor $C_{TS}$ 11. At this point, a dark signal and image signal of the pixels of the first line are stored in the storage capacitors $C_{TN}$ 10 and $C_{TS}$ 11, respectively. At time $T_4$, a control pulse ϕHC is temporarily set High to bring the horizontal output line reset MOS transistor 13 into conduction. Consequently, a horizontal output line is reset, causing the dark signal and image signal of the pixels to be output to the horizontal output line in a horizontal transfer period in response to a scan timing signal for the horizontal scanning circuit 15. In so doing, by determining differential output $V_{OUT}$ using the differential amplifier 14 for the storage capacitors $C_{TN}$ 10 and $C_{TS}$ 11, it is possible to obtain a signal free of random pixel noise and fixed-pattern noise and with a good signal-to-noise ratio.

The dark signal and image signal of the pixels of the first line are stored, respectively, in the storage capacitors $C_{TN}$ 10 and $C_{TS}$ 11 connected to respective vertical output lines. Thus, when the horizontal transfer MOS transistors 12 are turned on in sequence, the charges stored in the respective storage capacitors $C_{TN}$ 10 and $C_{TS}$ 11 are read out to the horizontal output line in sequence and output from the differential amplifier 14.

The present embodiment is configured to produce the differential output $V_{OUT}$ in the chip. However, similar effects can be obtained using a conventional external CDS (Correlated Double Sampling) circuit outside the chip.

On the other hand, after the image signal is output from the pixels of the first line to the storage capacitors $C_{TS}$ 11, the control pulse $\phi R_0$ is set High to bring the reset MOS transistor 4 into conduction and reset the FD portion 21 to a power supply voltage $V_{DD}$. When horizontal transfer of charges from the first line is finished, charges are read out from pixels on the second line. To read the second line, a control pulse $\phi TX_{e0}$ and control pulse $\phi G_{e0}$ are driven first, as in the case of the first line described above. Next, the control pulses $\phi T_N$ and $\phi T_S$ are sequentially set High, and the dark signal and image signal are stored in the respective storage capacitors $C_{TN}$ 10 and $C_{TS}$ 11.

The above process allows the first line and second line to be read independently of each other. Subsequently, if the (2n+1)-th and (2n+2)-th lines (n=1, 2, . . . ) are read similarly by operating the vertical scanning circuit 16, independent outputs can be produced from all pixels. Specifically, when n=1, first a control pulse $\phi S_1$ is set High, then $\phi R_1$ is set Low, and subsequently control pulses $\phi T_N$ and $\phi TX_{01}$ are set High. Then, a control pulse $\phi G_{o1}$ is set Low, the control pulse $\phi T_S$ is set High, and the control pulse ϕHC is temporarily set High to read the dark signal and image signal from each pixel of the third line. Next, control pulses $\phi TX_{e1}$ and $\phi G_{e1}$ are applied in addition to the control pulses described above to read the dark signal and image signal from each pixel of the fourth line.

FIGS. 5A to 7B are diagrams illustrating structures of image sensing pixels and focus detection pixels. The present embodiment uses a Bayer array in which, out of 4 pixels in 2 rows×2 columns, 2 pixels having G (green) spectral sensitivity are arranged diagonally, the remaining 2 pixels being a pixel having R (red) spectral sensitivity and a pixel having B (blue) spectral sensitivity. Besides, focus detection pixels of a structure described later are distributed and arranged according to a predetermined rule among the pixels in the Bayer array.

Figure 5A:
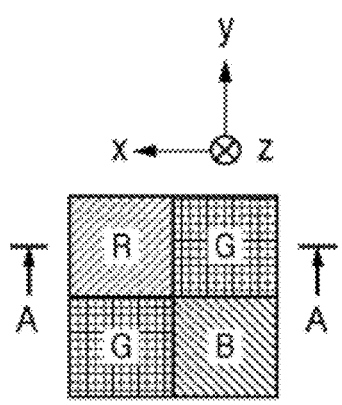
FIGS. 5A and 5B are diagrams illustrating a structure of image sensing pixels according to the embodiment of the present invention.
Figure 5B:
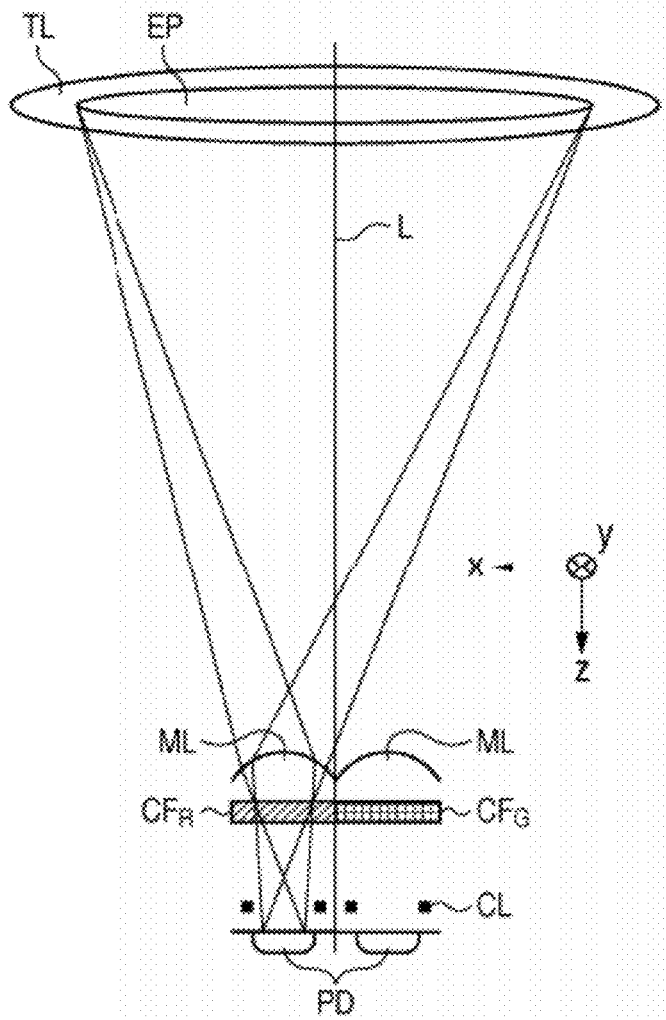

FIGS. 5A and 5B show an arrangement and structure of image sensing pixels. FIG. 5A is a plan view of image sensing pixels in 2 rows×2 columns. As is well known, in a Bayer array, G pixels are arranged diagonally, the remaining two pixels being an R pixel and B pixel. The structure of 2 rows×2 columns is arranged in a repetitive fashion.

A sectional view taken along A-A in FIG. 5A is shown in FIG. 5B. Reference character ML denotes an on-chip microlens placed at the forward end of each pixel, reference character $CF_R$ denotes an R (red) color filter, and reference character $CF_G$ denotes a G (green) color filter. Reference character PD (which stands for Photo Diode) schematically represents the photoelectric conversion device of the image sensor 107. Reference character CL (which stands for Contact Layer) denotes a wiring layer containing signal lines used to transmit various signals in the image sensor 107. Reference character TL (which stands for Taking Lens) schematically represents the photographing lens 100. Reference character L denotes an optical axis of the photographing lens TL. Incidentally, FIGS. 5A and 5B show pixels near the center of the image sensor 107, that is, a pixel structure near the optical axis L of the photographing lens TL.

The on-chip microlens ML of the image sensing pixel and the photoelectric conversion device PD are configured to capture luminous fluxes passing the photographing lens TL as effectively as possible. In other words, the exit pupil EP of the photographing lens TL and the photoelectric conversion device PD are conjugated via the microlens ML. Also, the effective area of the photoelectric conversion device PD is designed to be large. Although a luminous flux incident upon the R pixel has been described in FIG. 5B, the G pixel and B (blue) pixel have the same structure. In this way, the exit pupil EP for each of the image sensing RGB pixels have a large diameter to efficiently capture the luminous fluxes from the object and improve the signal-to-noise ratio of the image signal.

Figure 6A:
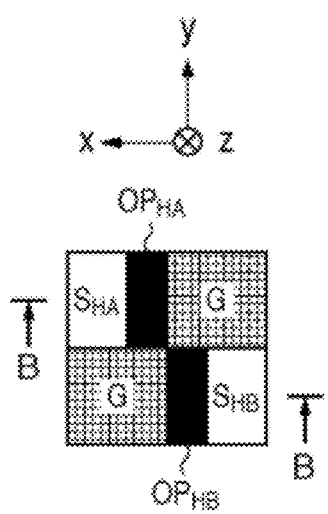
FIGS. 6A and 6B are a plan view and sectional view illustrating a structure of focus detection pixels used for pupil division in a horizontal direction of a photographing lens according to the embodiment of the present invention.
Figure 6B:
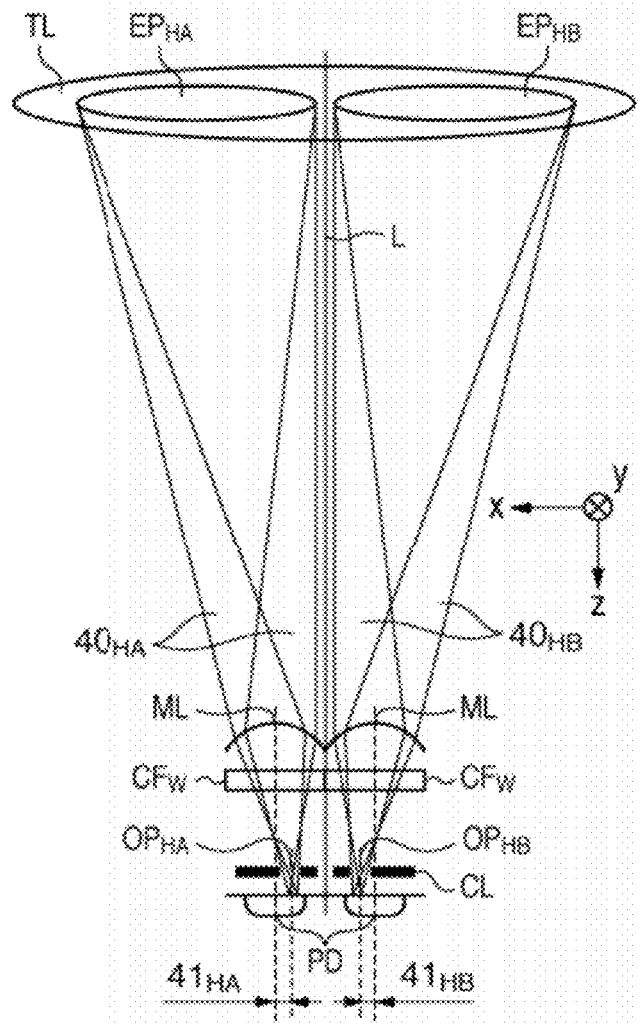

FIGS. 6A and 6B are a plan view and sectional view of focus detection pixels used for pupil division in an x-direction of the photographing lens TL in FIGS. 6A and 6B. FIG. 6A is a plan view of 2 rows×2 columns of pixels including the focus detection pixels. To obtain an image signal for recording or observation, G pixels are used to acquire a main component of luminance information. This is because man's image recognition characteristics, which are sensitive to luminance information, tend to perceive image quality degradation when G pixels are deficient. On the other hand, even if the R pixels or B pixels, which are used to acquire color information (color difference information), are more or less deficient, image quality degradation is hard to be recognized because man's visual characteristics are somewhat insensitive to color information. Thus, according to the present embodiment, out of 2 rows×2 columns of pixels, the R and B pixels are replaced by focus detection pixels at a certain rate while retaining the G pixels as image sensing pixels. The focus detection pixels shown as a pair in FIG. 6A are denoted by $S_{HA}$ and $S_{HB}$.

A sectional view taken along B-B in FIG. 6A is shown in FIG. 6B. The microlens ML and photoelectric conversion device PD have the same structure as the image sensing pixel shown in FIG. 5B. FIGS. 6A and 6B also show pixels near the center of the image sensor 107, that is, the pixel structure near the optical axis L of the photographing lens TL.

According to the present embodiment, since signals from the focus detection pixels are not used for image formation, a transparent film $CF_W$ (white) is placed instead of a color separation color filter. Also, since the image sensor 107 performs pupil division, an opening of the wiring layer CL is deviated to the centerline of the microlens ML in the x-direction. Specifically, an opening $OP_{HA}$ of the pixel $S_{HA}$ is deviated to the centerline of the microlens ML by $41_{HA}$ in the −x-direction, and thus receives a luminous flux $40_{HA}$ passing an exit pupil region $EP_{HA}$ in the +x-direction of the photographing lens TL. Similarly, an opening $OP_{HB}$ of the pixel $S_{HB}$ is deviated to the centerline of the microlens ML by $41_{HB}$ in the +x-direction, and thus receives a luminous flux $40_{HB}$ passing an exit pupil region $EP_{HB}$ in the −x-direction of the photographing lens TL.

The pixels $S_{HA}$ configured as described above are arranged regularly in the x-direction and an object image obtained from this pixel group is designated as image A. Also, the pixels $S_{HB}$ are arranged regularly in the x-direction and an object image obtained from this pixel group is designated as image B. Then, by detecting relative position of images A and B thus acquired, it is possible to detect a defocus amount of an object image which has a luminance distribution in the x-direction.

Incidentally, the pixels $S_{HA}$ and $S_{HB}$ described above are useful in detecting focus with respect to an object which has a luminance distribution in the x-direction of a photographic screen, such as a line in a y-direction (vertical line), for example, but are not useful in detecting focus with respect to a line in the x-direction (horizontal line) which has a luminance distribution in the y-direction. Thus, to enable focus detection with respect to a line in the x-direction as well, the present embodiment is also provided with pixels used for pupil division in the y-direction of the photographing lens.

Figures 7A, 7B:
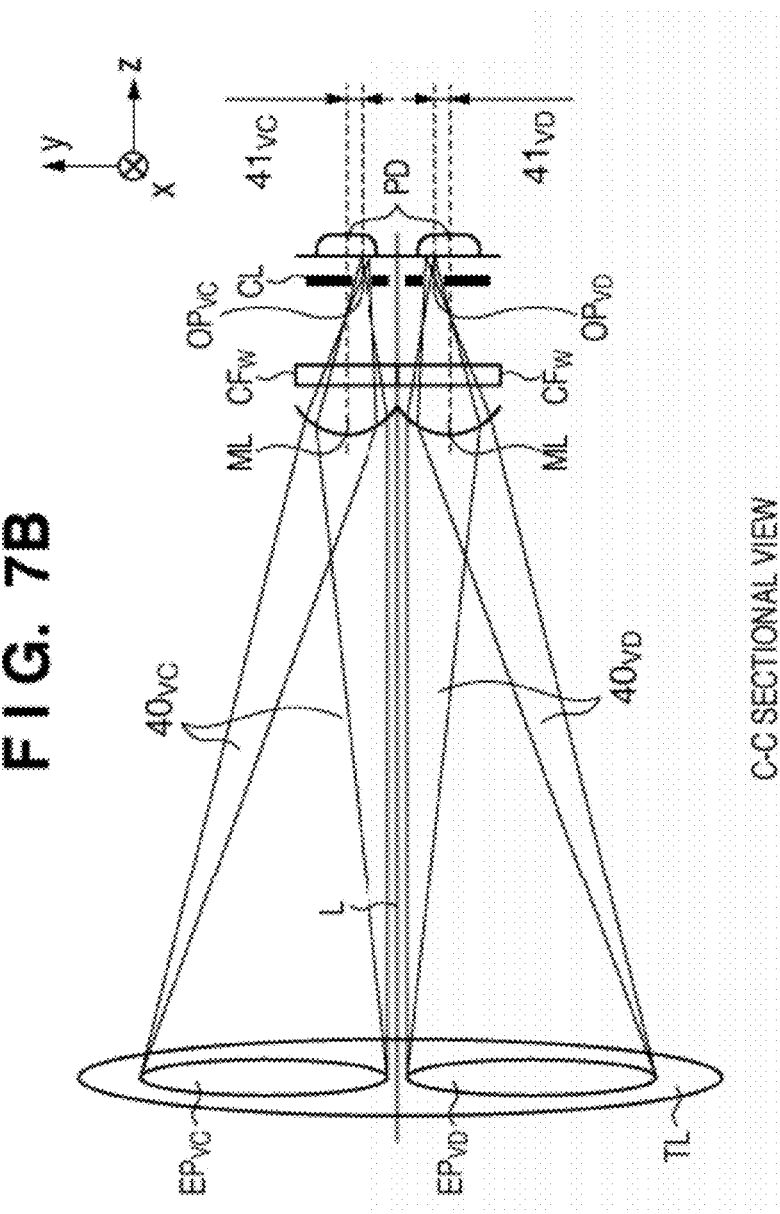
FIGS. 7A and 7B are a plan view and sectional view illustrating a structure of focus detection pixels used for pupil division in a vertical direction of the photographing lens according to the embodiment of the present invention.

FIGS. 7A and 7B are a plan view and sectional view of focus detection pixels used for pupil division in the y-direction of the photographing lens TL in FIGS. 7A and 7B. FIG. 7A is a plan view of 2 rows×2 columns of pixels, including focus detection pixels, near the center of the image sensor 107, that is, near the optical axis L of the photographing lens TL. As in the case of FIG. 6A, the R and B pixels are replaced by focus detection pixels at a certain rate while retaining the G pixels as image sensing pixels. The focus detection pixels shown as a pair in FIG. 7A are denoted by $S_{VC}$ and $S_{VD}$.

A sectional view taken along C-C in FIG. 7A is shown in FIG. 7B. While with the pixels shown in FIG. 6B, the pupil is separated in the x-direction, with the pixels shown in FIG. 7B, the pupil is separated in the y-direction, but the pixel structure is the same. That is, an opening $OP_{VC}$ of the pixel $S_{VC}$ is deviated to the centerline of the microlens ML by $41_{VC}$ in the −y-direction, and thus receives a luminous flux $40_{VC}$ passing an exit pupil region $EP_{VC}$ in the +y-direction of the photographing lens TL. Similarly, an opening $OP_{TD}$ of the pixel $S_{TD}$ is deviated to the centerline of the microlens ML by $41_{VD}$ in the +y-direction, and thus receives a luminous flux $40_{VD}$ passing an exit pupil region $EP_{TD}$ in the −y-direction of the photographing lens TL.

The pixels $S_{VC}$ configured as described above are arranged regularly in the y-direction and an object image obtained from this pixel group is designated as image C. Also, the pixels $S_{TD}$ are arranged regularly in the y-direction and an object image obtained from this pixel group is designated as image D. Then, by detecting relative position of images C and D thus acquired, it is possible to detect a defocus amount of an object image which has a luminance distribution in the y-direction.

Figure 8:
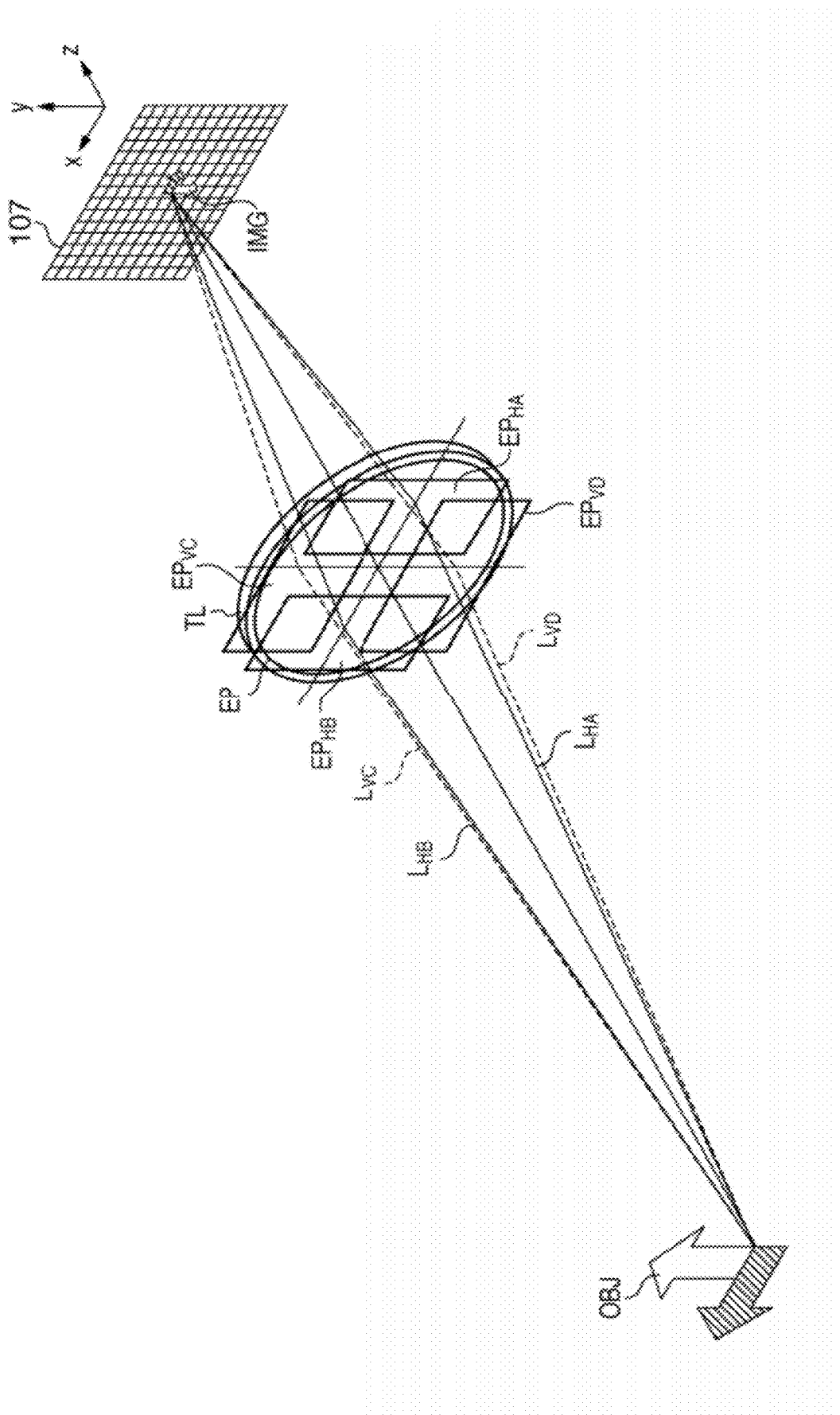
FIG. 8 is a diagram conceptually illustrating a pupil division function of the focus detection pixels according to the embodiment of the present invention.

FIG. 8 is a diagram conceptually illustrating a pupil division function of the focus detection pixels in the image sensor 107. In FIG. 8, the same components as those in FIGS. 5A to 7B are denoted by the same reference numerals/characters as the corresponding components in FIGS. 5A to 7B. Reference character OBJ denotes an object and reference character IMG denotes an object image.

As described with reference to FIGS. 5A and 5B, the image sensing pixels receive the luminous flux passing the entire area of the exit pupil EP of the photographing lens TL. On the other hand, as described with reference to FIGS. 6A, 6B, 7A, and 7B, the focus detection pixels have a pupil division function. Specifically, the pixel $S_{HA}$ shown in FIGS. 6A and 6B receives a luminous flux $L_{HA}$ passing the +x side of the pupil, that is, a luminous flux passing the exit pupil region $EP_{HA}$ in FIG. 8. Similarly, the pixels $S_{HB}$, $S_{VC}$, and $S_{TD}$ receive luminous fluxes passing the exit pupil regions $EP_{HB}$, $EP_{VC}$, and $EP_{TD}$, respectively. The focus detection pixels include pairs of pixels $S_{HA}$ and $S_{HB}$ for detection of x-direction deviation and pairs of pixels $S_{VC}$ and $S_{TD}$ for detection of y-direction deviation, which are arranged at uniform density over an entire image sensing area. To detect the x-direction deviation, a pair of image signals obtained from the pairs of pixels $S_{HA}$ and $S_{HB}$ for detection of x-direction deviation are used as AF pixel signals for calculation of phase difference. Also, to detect the y-direction deviation, a pair of image signals obtained from the pairs of pixels $S_{VC}$ and $S_{VD}$ for detection of y-direction deviation are used as AF pixel signals for calculation of the phase difference. This configuration makes it possible to detect focus at any location in the image sensing area based on x-direction and y-direction phase differences.

Figure 9:
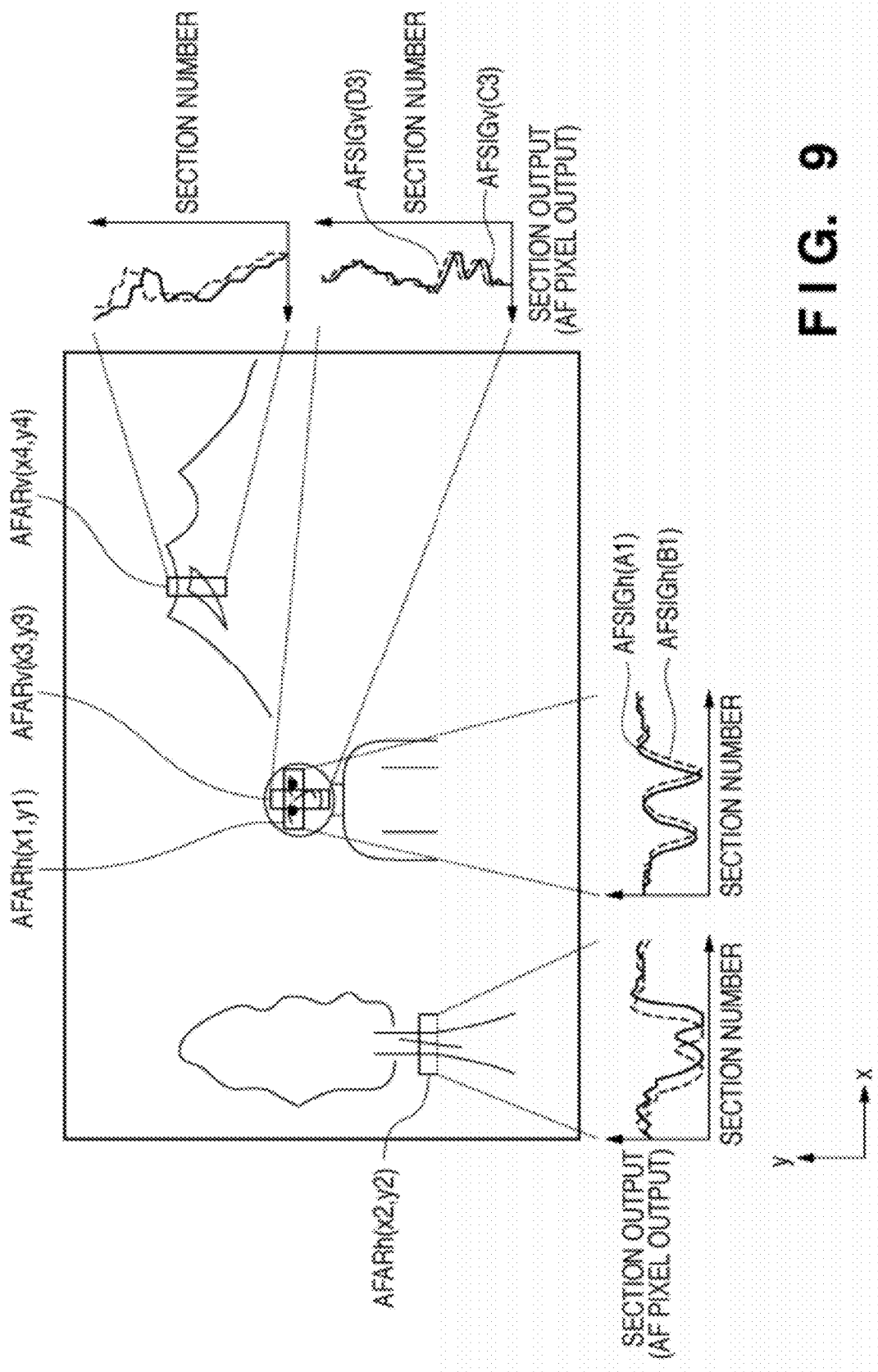
FIG. 9 is a diagram illustrating a focus detection area in an image acquired during focus detection according to the embodiment of the present invention.

FIG. 9 is a diagram illustrating a focus detection area and an image acquired during focus detection. In FIG. 9, an object image formed on an image sensing surface contains a person shown near the center, a close-range tree shown on the left, and distant mountains shown on the right.

In FIG. 9, the face of the person is shown in the center of the screen. Once a face is detected using a known face recognition technique, a focus detection area AFARh (x1, y1) for detection of x-direction deviation and focus detection area AFARv (x3, y3) for detection of y-direction deviation are set centering around a face region, where the subscript h represents the x-direction, the subscript v represents the y-direction, and (x1, y1) and (x3, y3) represent coordinates in the upper left corner of the focus detection areas. A signal of image A for phase difference detection obtained by connecting signals from the pixels $S_{HA}$ for detection of x-direction deviation contained in sections of the focus detection area AFARh (x1, y1) over 30 sections is denoted by AFSIGh (A1). Similarly, a signal of image B for phase difference detection obtained by connecting signals from the pixels $S_{HB}$ for detection of x-direction deviation over 30 sections is denoted by AFSIGh (B1). Then, by calculating an amount of relative x-direction deviation between the signal AFSIGh of image A (A1) and signal AFSIGh of image B (B1) using a known correlation calculation, it is possible to determine a defocus amount of the photographing lens.

Regarding the focus detection area AFARv (x3, y3), by calculating an amount of relative y-direction deviation of a signal of image C AFSIGv (C1) for phase difference detection and a signal of image D AFSIGh (D1) for phase difference detection using a known correlation calculation, a defocus amount of the photographing lens is determined similarly. Then, the two defocus amounts detected in the x-direction and y-direction focus detection areas are compared, and the value with the higher reliability is adopted.

On the other hand, the trunk of the tree on the left side of the screen mainly contains a y-direction component, that is, it has a luminance distribution in the x-direction. Therefore, it is determined that the object is suitable for detecting x-direction deviation, and a focus detection area AFARh (x2, y2) for detection of x-direction deviation is set. Also, ridges of the mountains on the right side of the screen mainly contain an x-direction component, that is, it has a luminance distribution in the y-direction. Therefore, it is determined that the object is suitable for detecting y-direction deviation, and a focus detection area AFARv (x4, y4) for detection of y-direction deviation is set.

Thus, the present embodiment, which can set focus detection areas for detection of x-direction deviation and y-direction deviation at any location, is always capable of focus detection even if projected position of the object or directionality of luminance distribution has wide variations. Principles of deviation detection will be described below. Principles for the x-direction and y-direction are identical except for the difference in direction, and thus only the deviation detection in the x-direction will be described, and description of deviation detection in the y-direction will be omitted.

Figure 10A:
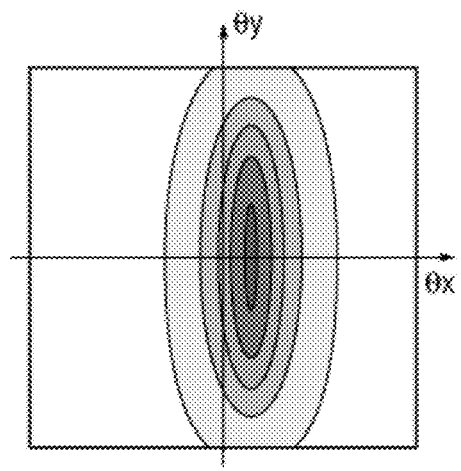
FIGS. 10A and 10B are schematic diagrams showing incident angle characteristics of focus detection pixels at the center of the image sensor according to the embodiment of the present invention.
Figure 10B:
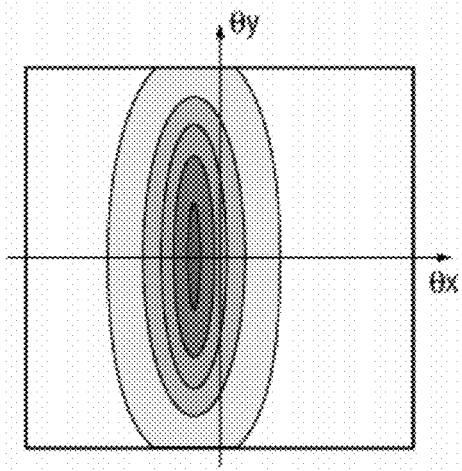

FIGS. 10A and 10B are schematic diagrams showing incident angle characteristics of focus detection pixels at the center of the image sensor 107, where FIG. 10A shows characteristics of the pixel $S_{HA}$ and FIG. 10B shows characteristics of the pixel $S_{HB}$. In FIGS. 10A and 10B, a θx-axis and θy-axis represent x-direction and y-direction incident angles of the pixels, respectively. In FIGS. 10A and 10B, darker colors represent higher intensity of light received. In FIGS. 6A and 6B, for ease of explanation, the exit pupil of the pixel $S_{HA}$ and exit pupil of the pixel $S_{HB}$ are denoted by $EP_{HA}$ and $EP_{HB}$, respectively, and shown as being completely separated. Actually, however, as shown in FIGS. 10A and 10B, the exit pupils of the pixels $S_{HA}$ and $S_{HB}$ partially overlap each other due to the effects of diffraction at the openings $OP_{HA}$ and $OP_{HB}$ and for the purpose of improvement in the signal-to-noise ratio.

Figure 11:
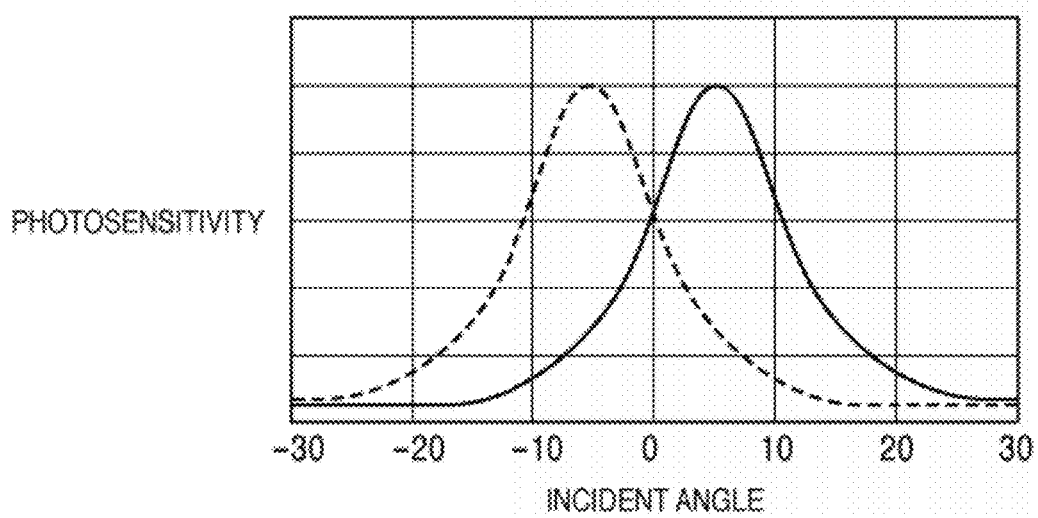
FIG. 11 is a diagram one-dimensionally showing the incident angle characteristics of the focus detection pixels shown in FIGS. 10A and 10B.

FIG. 11 is a diagram one-dimensionally showing the incident angle characteristics of the focus detection pixels. The abscissa represents the incident angle, the ordinate represents the sum of photosensitivity values in the θy-direction in FIGS. 10A and 10B, and the origin represents the optical axis L. Characteristics of the pixel $S_{HA}$ are indicated by a solid line and characteristics of the pixel $S_{HB}$ are indicated by a broken line. As shown in FIG. 11, the incident angle characteristics of the focus detection pixels $S_{HA}$ and $S_{HB}$ at the center of the image sensor 107 are approximately symmetric with respect to the optical axis L.

Figure 12A:
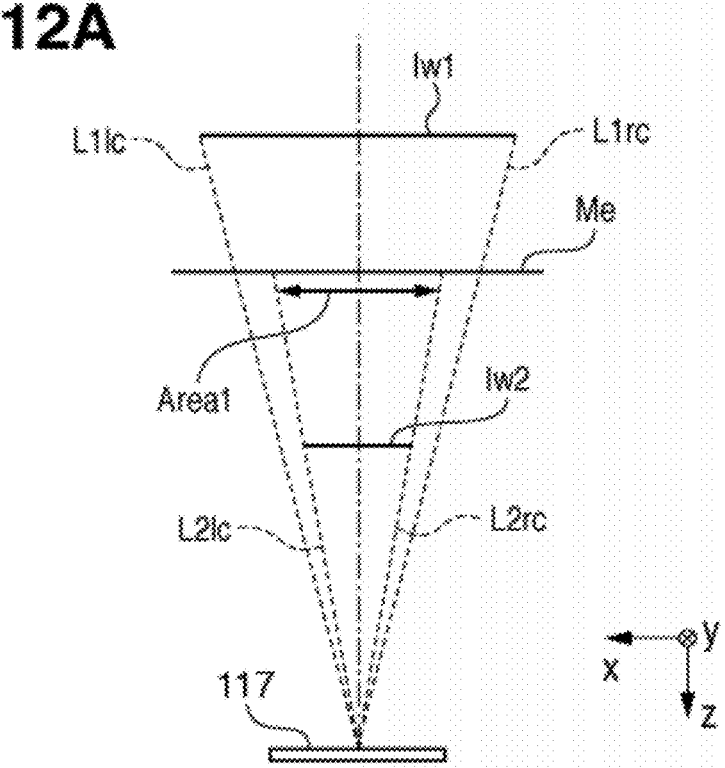
FIGS. 12A and 12B are diagrams illustrating vignetting of luminous fluxes.
Figure 12B:
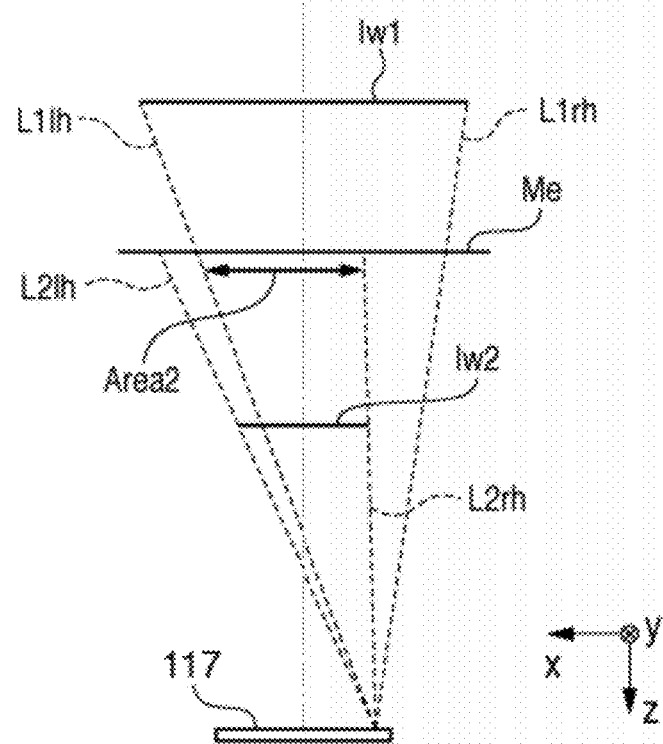

FIGS. 12A and 12B are diagrams illustrating vignetting of luminous fluxes. FIG. 12A shows a luminous flux incident upon a pixel at the center of the image sensor 107 while FIG. 12B shows a luminous flux incident upon a pixel which has an image height from the center of the image sensor 107. A luminous flux restricted by some components, including a lens holding frame of the photographing lens TL and the aperture-shutter 102, is incident upon the image sensor 107. For simplicity of explanation, it is assumed here that at any image height, there are two members which restrict the luminous flux.

Reference characters Iw1 and Iw2 denote windows of the members which restrict the luminous flux. The luminous flux passes the windows Iw1 and Iw2 of the members. Reference character Me denotes a pupil surface established according to the configuration of the microlens ML. First, vignetting of the luminous flux incident upon the pixel at the center of the image sensor 107 will be described with reference to FIG. 12A.

Reference characters L1*rc* and L1*lc* denote an outer circumference of an exit luminous flux from the window Iw1, where L1*rc* indicates the right end of the circumference in FIG. 12A and L1*lc* indicates the left end of the circumference in FIG. 12A. Reference characters L2*rc* and L2*lc* denote an outer circumference of an exit luminous flux from the window Iw2 as the outer circumference is projected to pupil position of the microlens ML, where L2*rc* indicates the right end of the circumference in FIG. 12A and L2*lc* indicates the left end of the circumference in FIG. 12A. As shown in FIG. 12A, on the pupil surface Me, the pupil region of the luminous flux incident upon the center pixel of the image sensor 107 is represented by the luminous flux having the outer circumference L2*lc* and L2*rc*, that is, represented by an arrow Area1.

Next, vignetting of the luminous flux incident upon the pixel which has an image height from the center of the image sensor 107 will be described with reference to FIG. 12B. Reference characters L1*rh* and L1*lh* denote an outer circumference of an exit luminous flux from the window Iw1, where L1*rh* indicates the right end of the circumference in FIG. 12B and L1*lh* indicates the left end of the circumference in FIG. 12B. Reference characters L2*rh* and L2*lh* denote an outer circumference of an exit luminous flux from the window Iw2 as the outer circumference is projected to pupil position of the microlens ML, where L2*rh* indicates the right end of the circumference in FIG. 12B and L2*lh* indicates the left end of the circumference in FIG. 12B. As shown in FIG. 12B, on the pupil surface Me, the pupil region of the luminous flux incident upon the pixel which has an image height from the center of the image sensor 107 is represented by the luminous flux having the outer circumference L1*lh* and L2*rh*, that is, represented by an arrow Area2.

Figure 13A:
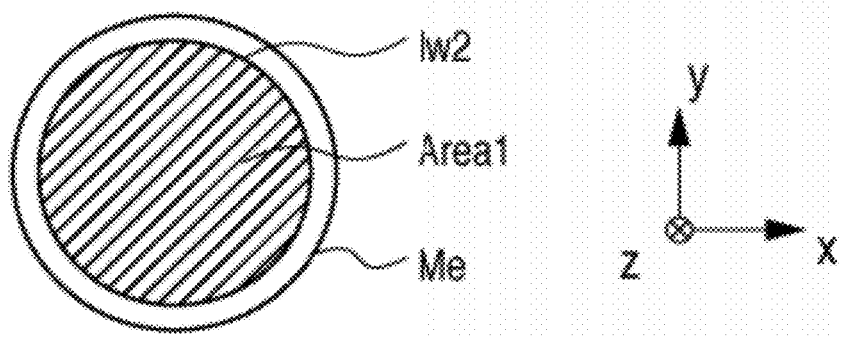
FIGS. 13A and 13B are diagrams showing pupil regions on pupil surfaces.
Figure 13B:
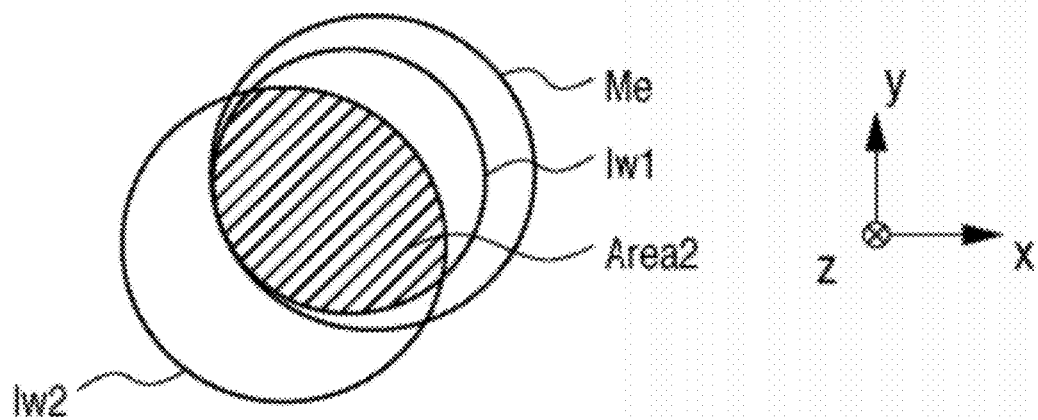

FIGS. 13A and 13B are diagrams showing pupil regions on pupil surfaces Me. FIG. 13A shows the pupil region of the pixel at the center of the image sensor 107 and FIG. 13B shows the pupil region of the pixel which has an image height from the center of the image sensor 107. As described with reference to FIGS. 12A and 12B, since the luminous flux restricted only by the window Iw2 enters the pixel at the center of the image sensor 107, shape of the window Iw2 is projected as it is onto the pupil region Area1 as shown in FIG. 13A. Since the window which restricts the luminous flux is circular in shape, so is the pupil region Area1. On the other hand, since the luminous flux restricted by Iw1 and Iw2 enter the pixel which has an image height from the center of the image sensor 107, the pupil region Area2 has a shape shown in FIG. 13B.

Since position and size of both lens holding frame and aperture described above vary with the type of lens, the shape of the pupil region varies with the type of lens even if the lenses are located at the same image height position.

Figure 14A:
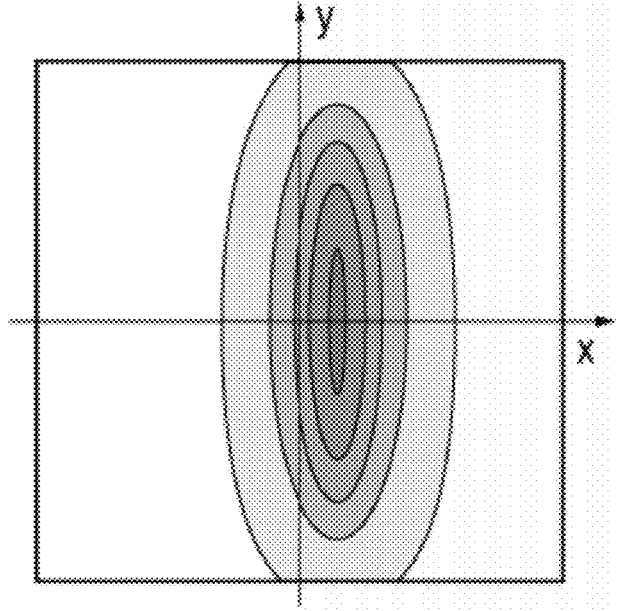
FIGS. 14A and 14B are diagrams showing pupil intensity distributions of focus detection pixels.
Figure 14B:
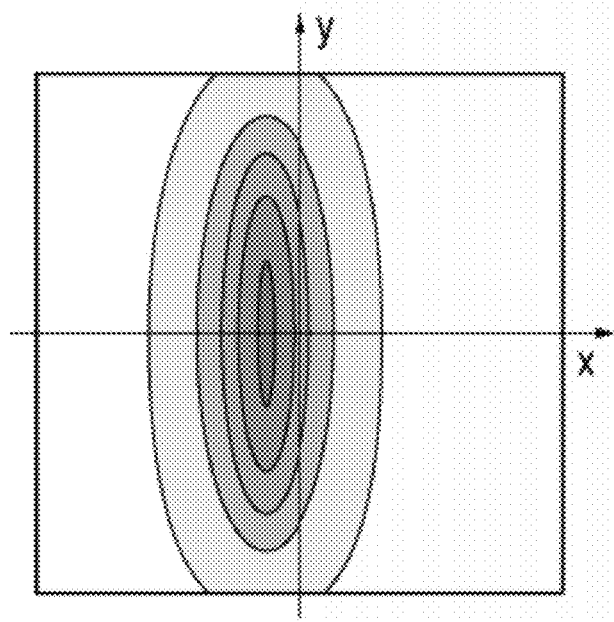

FIGS. 14A and 14B are diagrams showing pupil intensity distributions of focus detection pixels. The diagrams are projections of the incident angle characteristics of the focus detection pixels at the center of the image sensor 107 shown in FIGS. 10A and 10B onto the pupil of the microlens ML, where FIG. 14A shows characteristics of the pixel $S_{HA}$ and FIG. 14B shows characteristics of the pixel $S_{HB}$. In FIGS. 14A and 14B, the ordinate and abscissa are mapped to coordinates on the pupil. The characteristics of the pupil intensity distributions are the same for the pixel which has an image height from the center of the image sensor 107. This is because the microlens ML of the pixel located on a plane which has an image height from the center of the image sensor 107 is designed to be deviated so that the center of the optical axis will pass the center of the pupil of the microlens ML.

Figure 15:
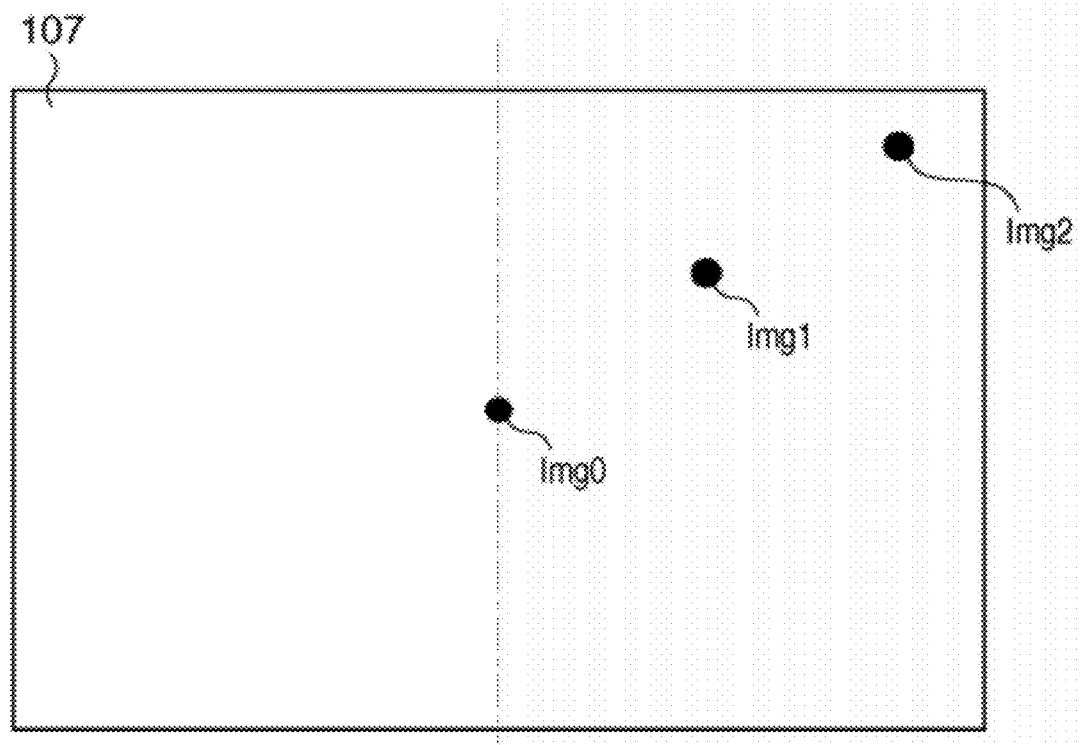
FIG. 15 is a diagram showing image height on an image sensor.

FIG. 15 is a diagram showing image height on the image sensor 107, where reference character Img0 shows a position at center image height, Img1 shows a position at 40% diagonal image height, and Img2 shows a position at 80% diagonal image height.

Figure 16A:
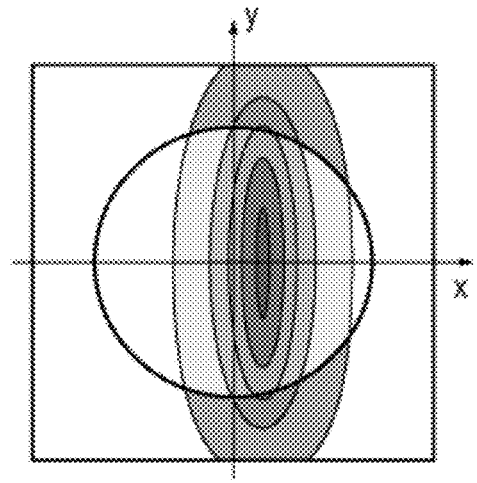
FIGS. 16A and 16B are diagrams each showing vignetting on a pupil surface Me at center image height Img0.
Figure 16B:
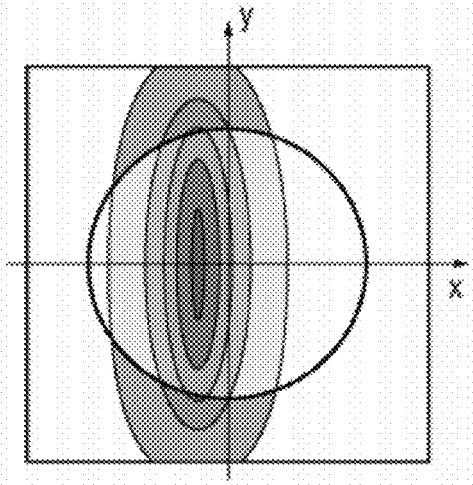

FIGS. 16A and 16B are diagrams each showing vignetting, at a predetermined maximum aperture (f2.8), on a pupil surface Me of a focus detection pixel at the center image height Img0 of the image sensor 107, where FIG. 16A shows characteristics of the pixel $S_{HA}$ and FIG. 16B shows characteristics of the pixel $S_{HB}$. FIGS. 16A and 16B are obtained by superimposing FIGS. 14A and 14B over the pupil vignetting shape described with reference to FIG. 13A, where the luminous flux passing through the shape represented by Area1 enters the pixels $S_{HA}$ and $S_{HB}$ with the illustrated pupil intensity distributions.

Figure 17:
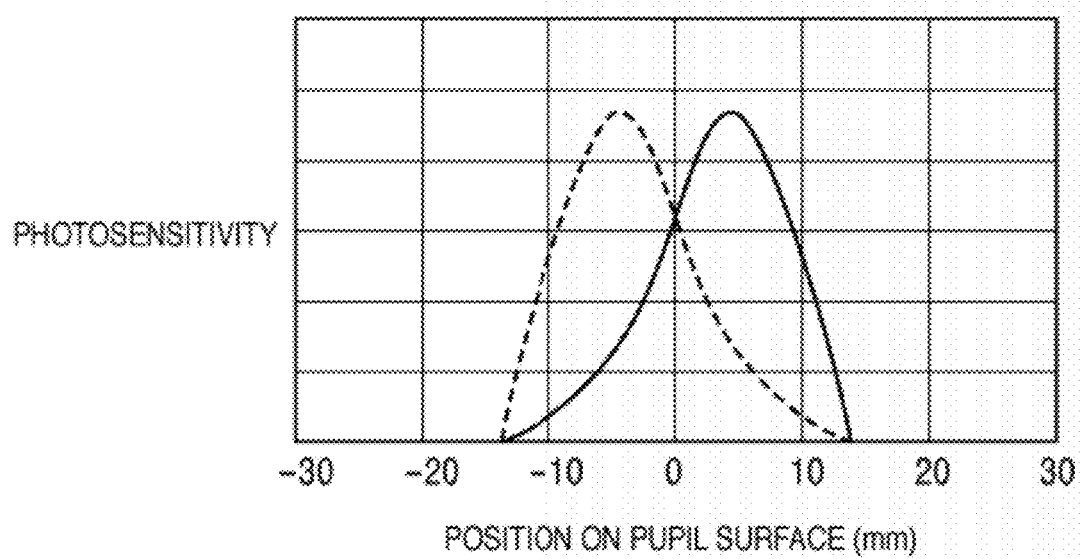
FIG. 17 is a diagram one-dimensionally showing pupil intensity distributions on the pupil surfaces Me at the center image height Img0.

FIG. 17 is a diagram one-dimensionally showing pupil intensity distributions of an incident luminous flux on the pupil surfaces Me of focus detection pixels at the center image height Img0 of the image sensor 107. The abscissa corresponds to the x-coordinate on the pupil surface Me and the ordinate represents intensity at each coordinate. The intensity at each x-coordinate is obtained by adding the pupil intensities in the y-direction in FIGS. 16A and 16B. Characteristics of the pixel $S_{HA}$ are indicated by a solid line and characteristics of the pixel $S_{HB}$ are indicated by a broken line. As shown in FIGS. 16A and 16B, the pupil intensity distributions on the pupil surfaces Me of the pixels $S_{HA}$ and $S_{HB}$ are mirror images of each other. Since vignette shape is symmetric with respect to the y-axis, the pupil intensity distributions of the incident luminous flux on the pupil surfaces Me of the pixels $S_{HA}$ and $S_{HB}$ are also mirror images of each other. However, while with the pixel $S_{HA}$, tailing is observed in the −x-direction, with the pixel $S_{HB}$, tailing is observed in the +x-direction. Thus, the pupil intensity distributions of both the pixels $S_{HA}$ and $S_{HB}$ are asymmetric with respect to the center of gravity of sensitivity.

Figure 18A:
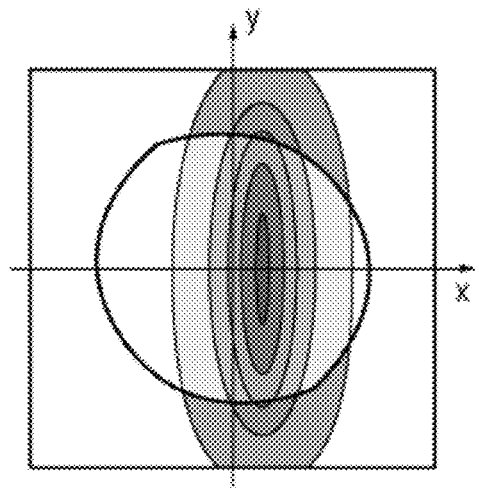
FIGS. 18A and 18B are diagrams each showing vignetting on a pupil surface Me at 40% diagonal image height Img1.
Figure 18B:
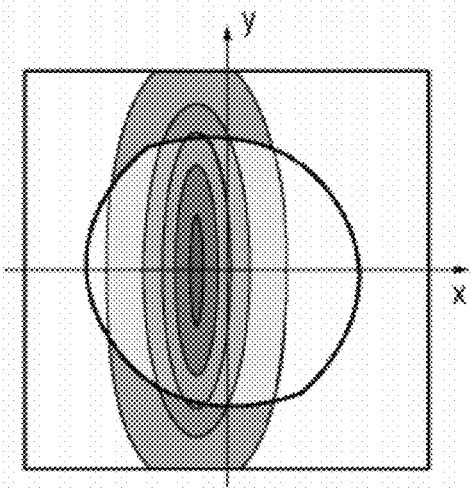

FIGS. 18A and 18B are diagrams each showing vignetting on the pupil surface Me of a pixel at 40% diagonal image height Img1 of the image sensor 107, where FIG. 18A shows characteristics of the pixel $S_{HA}$ and FIG. 18B shows characteristics of the pixel $S_{HB}$. FIGS. 18A and 18B are obtained by superimposing the pupil intensity distributions shown in FIGS. 14A and 14B over the pupil vignetting shape described with reference to FIG. 13B, where the luminous flux passing through the shape represented by Area2 enters the pixels $S_{HA}$ and $S_{HB}$ with the illustrated pupil intensity distributions.

Figure 19:
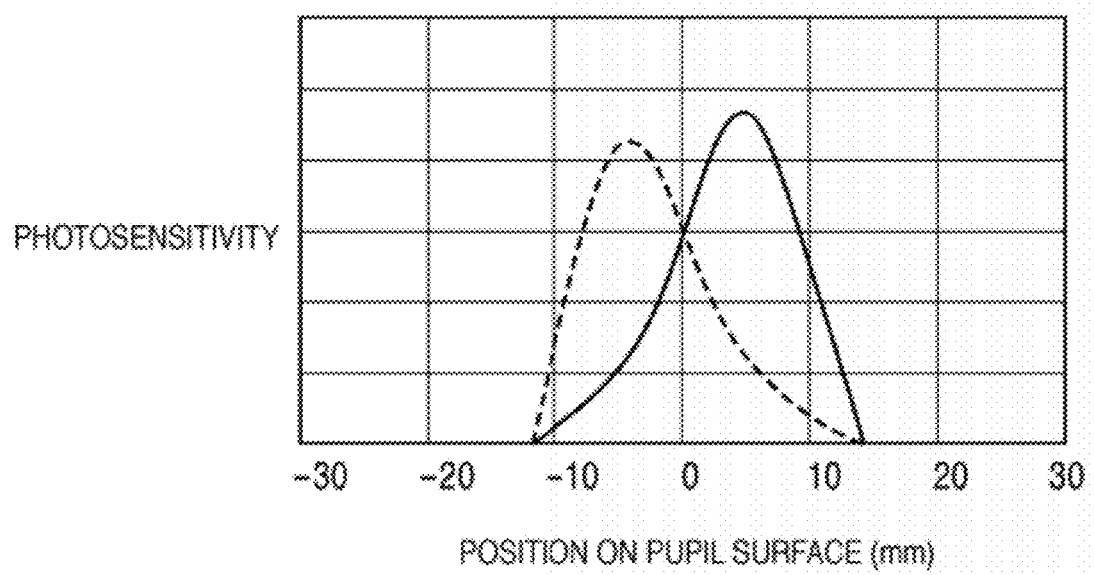
FIG. 19 is a diagram one-dimensionally showing pupil intensity distributions on the pupil surfaces Me at 40% diagonal image height Img1.

FIG. 19 is a diagram one-dimensionally showing pupil intensity distributions of an incident luminous flux on the pupil surfaces Me of the pixels at 40% diagonal image height Img1 of the image sensor 107. The abscissa corresponds to the x-coordinate on the pupil surface Me and the ordinate represents intensity at each coordinate. The intensity at each x-coordinate is obtained by adding the pupil intensities in the y-direction in FIGS. 18A and 18B, where the addition is performed in a direction orthogonal to the pupil separation direction. In FIG. 19, characteristics of the pixel $S_{HA}$ are indicated by a solid line and characteristics of the pixel $S_{HB}$ are indicated by a broken line. Vignette shape is somewhat asymmetric with respect to the y-axis, but the pupil intensity distributions of the pixels $S_{HA}$ and $S_{HB}$ at the center image height Img0 differ only slightly as can be seen from FIG. 19. Again, the pupil intensity distributions of both the pixels $S_{HA}$ and $S_{HB}$ are asymmetric with respect to the center of gravity of sensitivity.

Figure 20A:
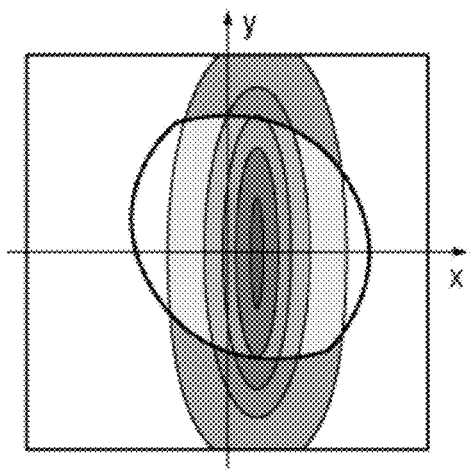
FIGS. 20A and 20B are diagrams each showing vignetting on a pupil surface Me at 80% diagonal image height Img2.
Figure 20B:
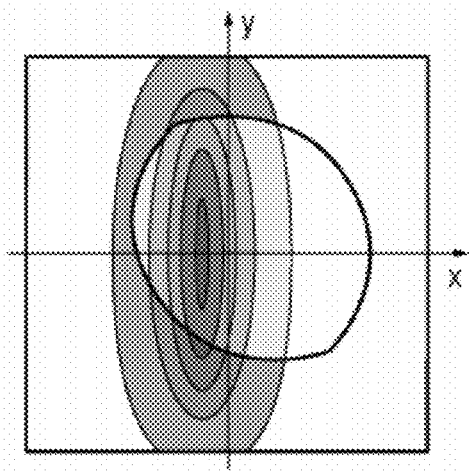
Figure 21:
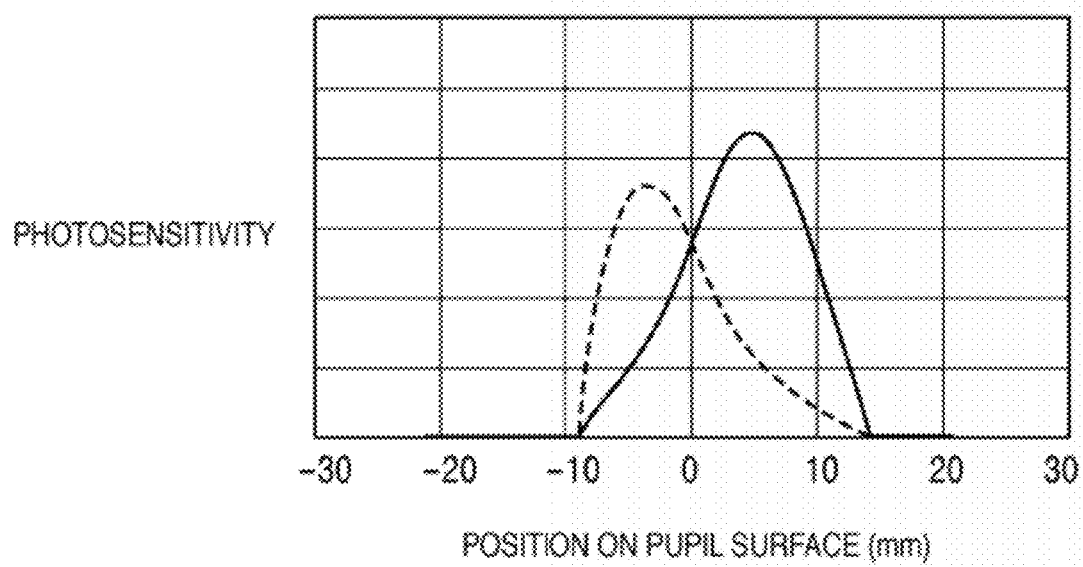
FIG. 21 is a diagram one-dimensionally showing pupil intensity distributions on the pupil surfaces Me at 80% diagonal image height Img2.

FIGS. 20A and 20B are diagrams each showing vignetting on the pupil surface Me of a pixel at 80% diagonal image height Img2 of the image sensor 107, where FIG. 20A shows characteristics of the pixel $S_{HA}$ and FIG. 20B shows characteristics of the pixel $S_{HB}$. FIG. 21 is a diagram one-dimensionally showing pupil intensity distributions of an incident luminous flux on the pupil surfaces Me of the pixels at 80% diagonal image height Img2 of the image sensor 107. The abscissa corresponds to the x-coordinate on the pupil surface Me and the ordinate represents intensity at each coordinate. The intensity at each x-coordinate is obtained by adding the pupil intensities in the y-direction in FIGS. 20A and 20B, where the addition is performed in a direction orthogonal to the pupil separation direction. Characteristics of the pixel $S_{HA}$ are indicated by a solid line and characteristics of the pixel $S_{HB}$ are indicated by a broken line. The pupil intensity distributions on the pupil surfaces Me of the pixels $S_{HA}$ and $S_{HB}$ are mirror images of each other. However, since vignette shape is asymmetric with respect to the y-axis, the pupil intensity distributions of the incident luminous flux on the pupil surfaces Me of the pixels $S_{HA}$ and $S_{HB}$ are not mirror images of each other. Further, while with the pixel $S_{HA}$, tailing is observed in the −x-direction, with the pixel $S_{HB}$, tailing is observed in the +x-direction. In this case, the pupil intensity distributions of both the pixels $S_{HA}$ and $S_{HB}$ are much asymmetric with respect to the center of gravity of sensitivity.

If light distribution of an object is f(x, y) and light distribution of an object image is g(x, y), $$g(x, y) = \int_{-\infty}^{\infty}\int_{-\infty}^{\infty} f(x-a, y-b)h(a, b)\,da\,db \quad (1)$$

Thus, a relationship given by the convolution holds, where h (x, y) is a transfer function called a point spread function which represents a degrading state of the object in an image forming system. Thus, to know a pair of object images used for focus detection, it is necessary to know the point spread function. In the phase difference focus detection, phase difference between a pair of object images is detected by paying attention to a one-dimensional direction of the images. Therefore, an image system related to focus detection can be evaluated using a line spread function which is a linear function instead of using the point spread function. Thus, by rewriting the light distribution of the object as f(x), and the light distribution of the object image as g(x), Equation (1) above can be rewritten as follows using a line spread function L(a):

$$g(x) = \int_{-\infty}^{\infty} f(x-a)L(a)\,da \quad (2)$$

Thus, under arbitrary defocus condition, a pair of line spread functions generated by luminous fluxes which pass different pupil regions in a phase shift direction are determined using Equation (2) above. Consequently, a pair of object images can be known. Once a pair of object images are known, the base length can be determined from distance between centers of gravity of the object images, and the defocus amount can be calculated based on the amount of image deviation between the pair of object images and on the base length. The base length can be determined using Equations (3) to (5) below. Let the centers of gravity of the object images be GA and GB and let the base length be G, then $$G_A = \frac{\int_{-\infty}^{\infty} x \cdot L_A(x)\,dx}{\int_{-\infty}^{\infty} L_A(x)\,dx} \quad (3)$$

$$G_B = \frac{\int_{-\infty}^{\infty} x \cdot L_B(x)\,dx}{\int_{-\infty}^{\infty} L_B(x)\,dx} \quad (4)$$

Base length $G = |G_A - G_B|$ (5)

An intensity distribution of a point image formed on an image plane by light emitted from a point light source and passed through an exit pupil of an optical system, that is, a so-called point spread function, is considered to be a reduced projection of the characteristics of the pupil intensity distribution of a focus detection pixel mapped to coordinates on the pupil with the pupil vignetting shape as an the open window. For example, it is considered that the intensity characteristics shown in FIGS. 16A and 16B are projected on an image plane in reduced form. Similarly, a line spread function can be considered to be the pupil intensity distribution's characteristics in the one-dimensional direction, that is, the pupil intensity distribution's characteristics integrated in the one-dimensional direction (e.g., intensity characteristics shown in FIG. 17) and formed in a reduced form on the image plane via the microlens ML.

Thus, it can be considered that the line spread function corresponds to the pupil intensity distributions shown in FIGS. 17, 19, and 21, which are reduced along the abscissa and expanded along the ordinate when the defocus amount is small, and expanded along the abscissa and reduced along the ordinate when the defocus amount is large.

That is as shown in FIGS. 17, 19, and 21, when the pupil intensity distributions of the incident luminous flux on the pupil surfaces Me of the pixels $S_{HA}$ and $S_{HB}$ are not identical in shape, agreement between object image A and object image B is poor and so is detection accuracy of the defocus amount. In order to increase the detection accuracy of the defocus amount, it is useful to reduce shape disagreement between object image A and object image B, and thereby improve the agreement between the images.

As described above, the shape disagreement between object image A and object image B is caused by convolution integration of pupil intensity distributions which differ in shape with respect to the centers of gravity of sensitivity between the pixels $S_{HA}$ and $S_{HB}$. The root cause lies in the shape disagreement in pupil intensity distribution. A major feature of the present invention is to improve detection accuracy regardless of defocus by reducing the shape disagreement in pupil intensity distribution in a simulated manner.

Figure 22A:
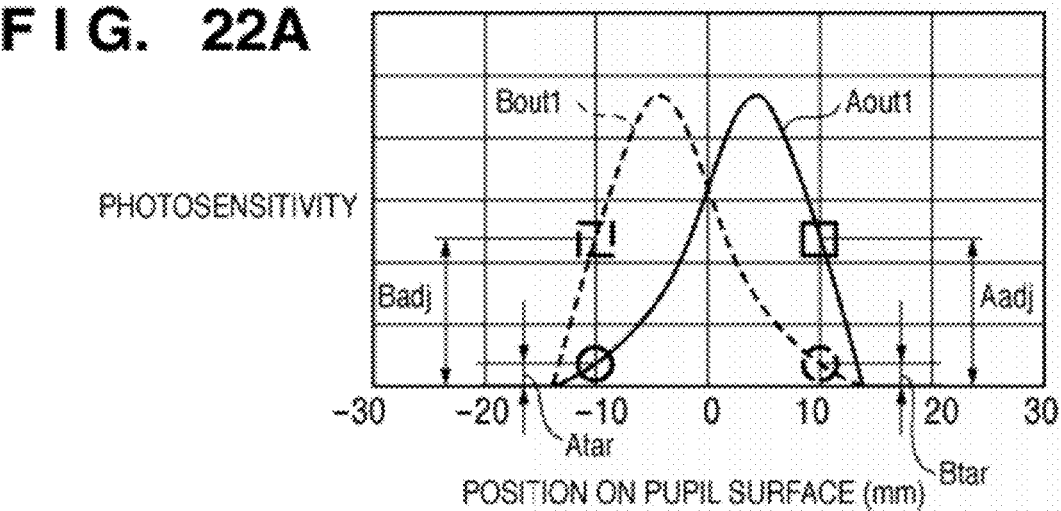
FIGS. 22A to 22C are diagrams showing the process of reducing shape disagreement in pupil intensity distribution at the center image height Img0 according to a first embodiment of the present invention.
Figure 22B:
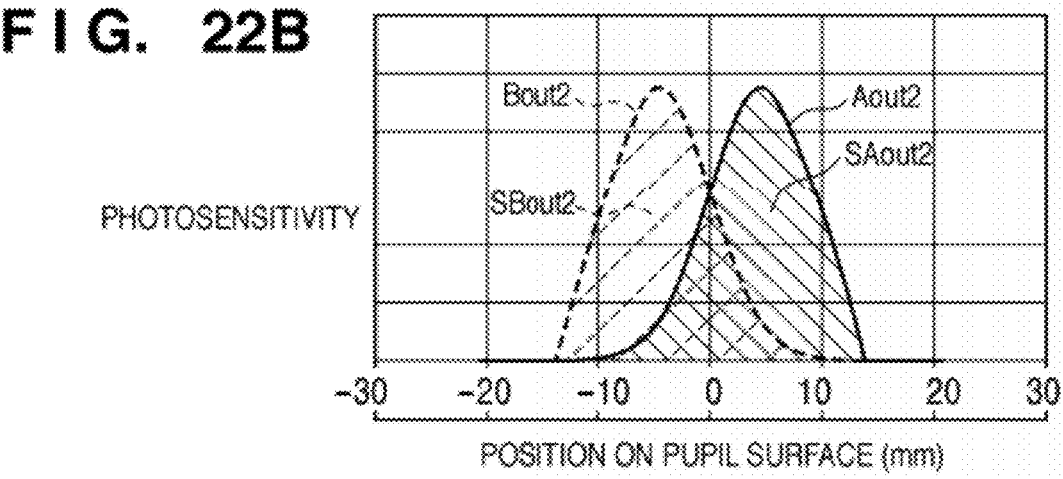
Figure 22C:
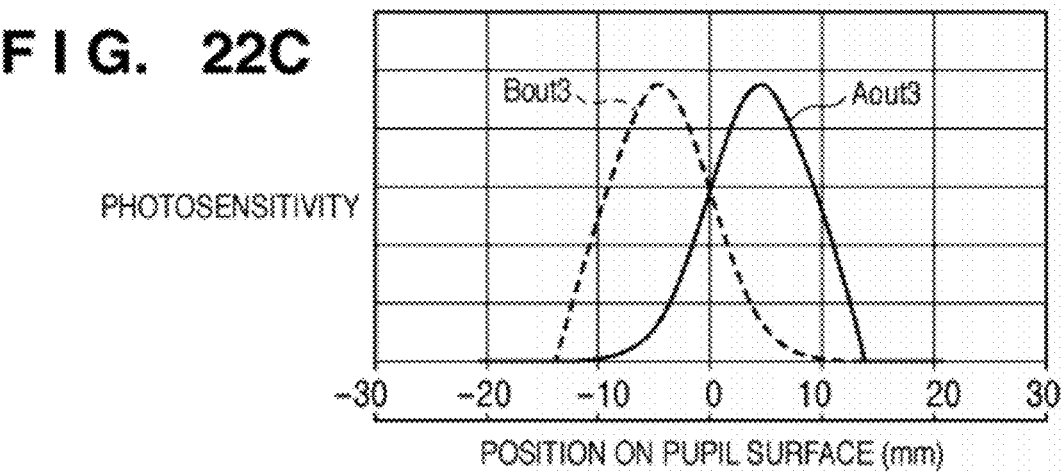

FIGS. 22A to 22C are diagrams for illustrating the process of reducing shape disagreement in pupil intensity distribution at the center image height Img0. FIG. 22A is a one-dimensional diagram of original pupil intensity distributions, FIG. 22B is a one-dimensional diagram in which tailing of the pupil intensity distributions is reduced, and FIG. 22C is a one-dimensional diagram in which total output values of the pixels $S_{HA}$ and $S_{HB}$ are equalized. Incidentally, in FIGS. 22A to 22C, characteristics of the pixel $S_{HA}$ are indicated by a solid line and characteristics of the pixel $S_{HB}$ are indicated by a broken line.

In the original pupil intensity distribution (FIG. 22A) at the center image height Img0, the tailing can be almost eliminated by subtracting a boxed portion of the pupil intensity distribution characteristic curve of the pixel $S_{HA}$ from an encircled portion of the tailing on one side of the pupil intensity distribution of the pixel $S_{HA}$. The value of the encircled portion of the tailing of the pixel $S_{HA}$ is denoted by Atar and the value of the corresponding boxed portion of the pixel $S_{HB}$ is denoted by Badj while the value of the encircled portion of the tailing of the pixel $S_{HB}$ is denoted by Btar and the value of the corresponding boxed portion of the pixel $S_{HA}$ is denoted by Aadj. Also, output values of single pixels in a pair of adjacent images A and B are denoted by Aout1(x) and Bout1(x) meaning the outputs of the x-th pixels in the respective focus detection areas while converted output values of image A and image B whose tailing has been reduced are denoted by Aout2(x) and Bout2(x).

b00=Atar/Badj
d00=Btar/Aadj
then, $$Aout2(x)=Aout1(x)-b00 \times Bout1(x) \quad (6)$$

$$Bout2(x)=Bout1(x)-d00 \times Aout1(x) \quad (7)$$

In this way, by simply objecting outputs of corresponding pixels in a pair of adjacent images A and B to differential signal conversion (subtraction process), it is possible to generate characteristic curves in which the tailing on one side of the pupil intensity distributions is reduced as shown in FIG. 22B. In this case, it is necessary to select locations of the encircled portions of the tailing in such a way that no part of the characteristic curves of the resulting signals Aout2(x) and Bout2(x) will become highly negative. This is because if there is any highly negative portion in the characteristic curves, the images are corrected excessively, and blurred images dependent on shape of the original object images could become unavailable.

Next, let SA2 and SB2 denote output integrals of the pupil intensity distributions of the pixels $S_{HA}$ and $S_{HB}$ with the tailing reduced as shown in FIG. 22B.

a0=SA2/SA2=1
c0=SA2/SB2

Then, by multiplying by proportionality constants as follows $$Aout3(x)=a0 \times Aout2(x) \quad (8)$$

$$Bout3(x)=c0 \times Bout2(x) \quad (9)$$

it is possible to equalize the integrals of the pupil intensity distributions of the pixels $S_{HA}$ and $S_{HB}$ as shown in FIG. 22C. At the center image height Img0, since SA2 and SB2 become equal, the shapes in FIG. 22B and FIG. 22C become identical.

From equations (6), (7), (8), and (9), $$Aout3(x) = a0 \times (Aout1(x) - b00 \times Bout1(x))$$
$$= a0 \times Aout1(x) - a0 \times b00 \times Bout1(x)$$

$$Bout3(x) = c0 \times (Bout1(x) - d00 \times Aout1(x))$$
$$= c0 \times Bout1(x) - c0 \times d00 \times Bout1(x)$$

Then, if
b0=a0×b00
d0=c0×d00
the following equations result:

$$Aout3(x)=a0 \times Aout1(x)-b0 \times Bout1(x) \quad (10)$$

$$Bout3(x)=c0 \times Bout1(x)-d0 \times Bout1(x) \quad (11)$$

Incidentally, in equations (10) and (11), Aout1(x) is an example of the first image signal, Bout1(x) is an example of the second image signal, Aout3(x) is an example of the first corrected image signal, and Bout3(x) is an example of the second corrected image signal. Furthermore, a0 is an example of the first coefficient, b0 is an example of the second coefficient, c0 is an example of the third coefficient, and d0 is an example of the fourth coefficient.

If the correction constants a0, b0, c0, and d0 used to reduce the shape disagreement at the center image height Img0 are set as follows
b00=d00=0.15
a0=c0=1
b0=d0=0.15
the pupil intensity distributions in FIG. 22A can be converted, in appearance, into the pupil intensity distributions in FIG. 22C.

Figure 23A:
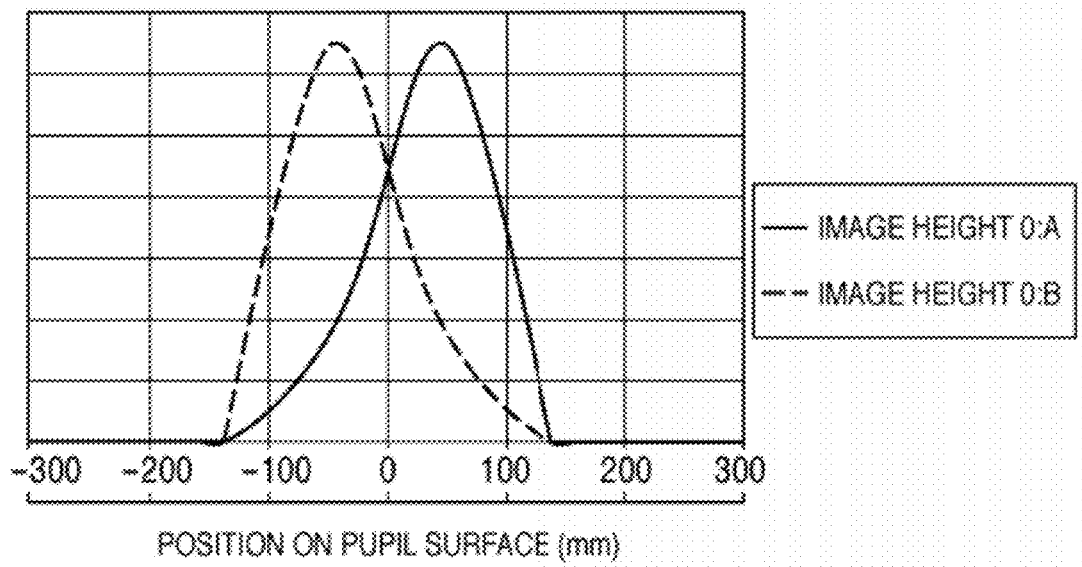
FIGS. 23A and 23B are diagrams showing line spreads, without reduction in shape disagreement, on a surface of the image sensor at the center image height Img0 according to the first embodiment of the present invention.
Figure 23B:
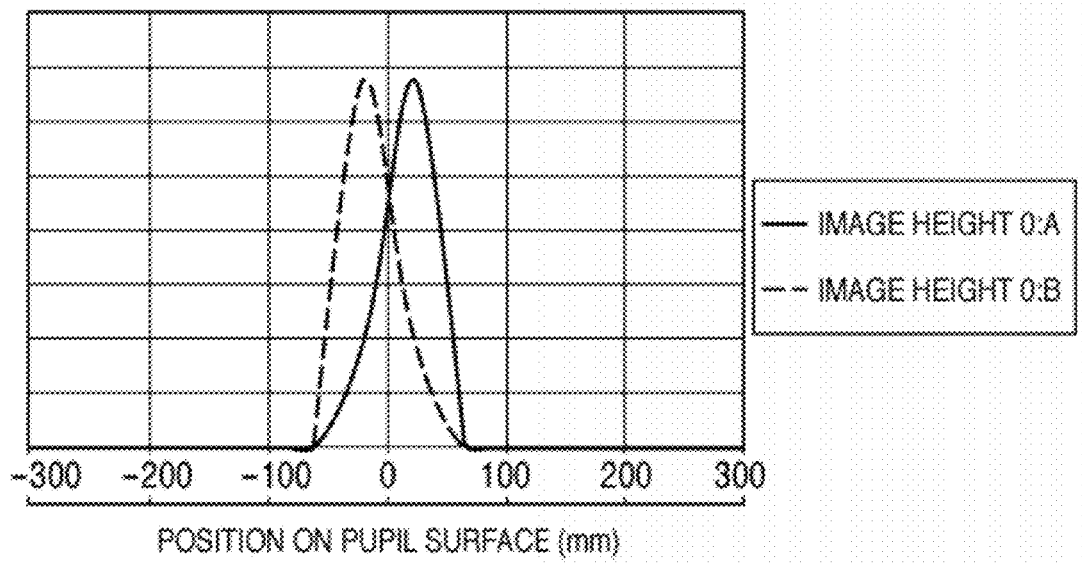

FIGS. 23A and 23B are diagrams showing line spreads on surfaces of the image sensor 107 with different defocus amounts corresponding to the pupil intensity distributions in FIG. 22A, where FIG. 23A shows an example in which the defocus amount is small and FIG. 23B shows an example in which the defocus amount is large. It can be seen that the shape disagreement in the pupil intensity distribution in FIG. 22A is maintained as it is in the line spreads of FIGS. 23A and 23B.

Figure 24A:
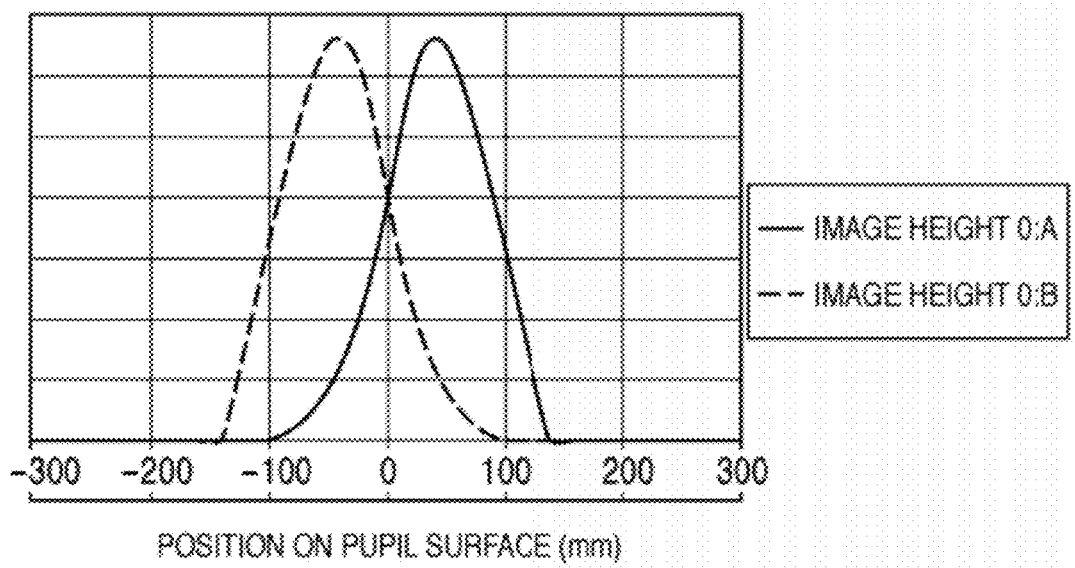
FIGS. 24A and 24B are diagrams showing line spreads, with reduction in shape disagreement, on the surface of the image sensor at the center image height Img0 according to the first embodiment of the present invention.
Figure 24B:
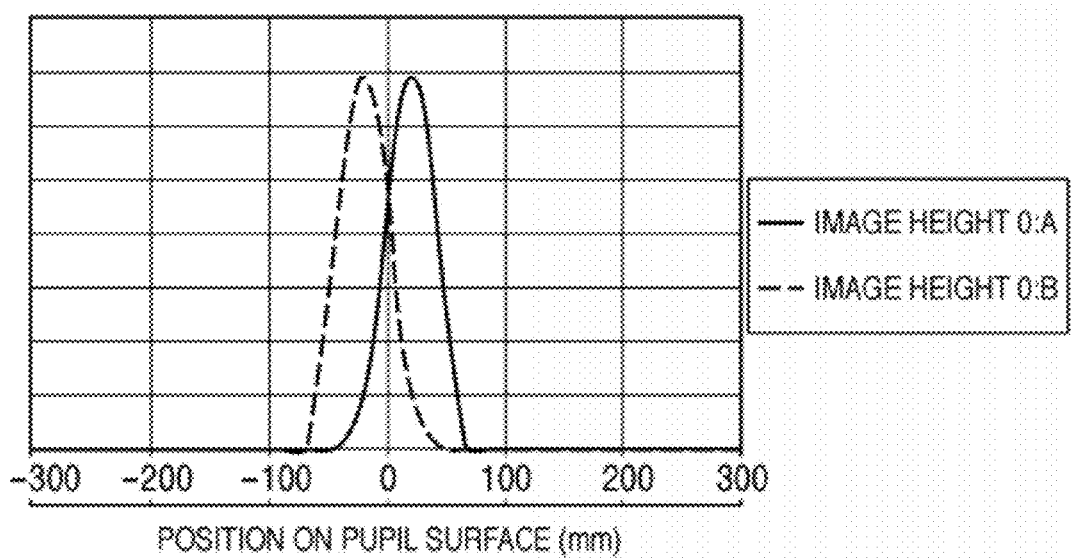

On the other hand, FIGS. 24A and 24B are diagrams showing line spreads on surfaces of the image sensor 107 with different defocus amounts corresponding to the pupil intensity distributions in FIG. 22C, where FIG. 24A shows an example in which the defocus amount is small and FIG. 24B shows an example in which the defocus amount is large. It can be seen that the reduced shape disagreement in the pupil intensity distribution in FIG. 22C is maintained as it is in the line spreads of FIGS. 24A and 24B.

Figure 25A:
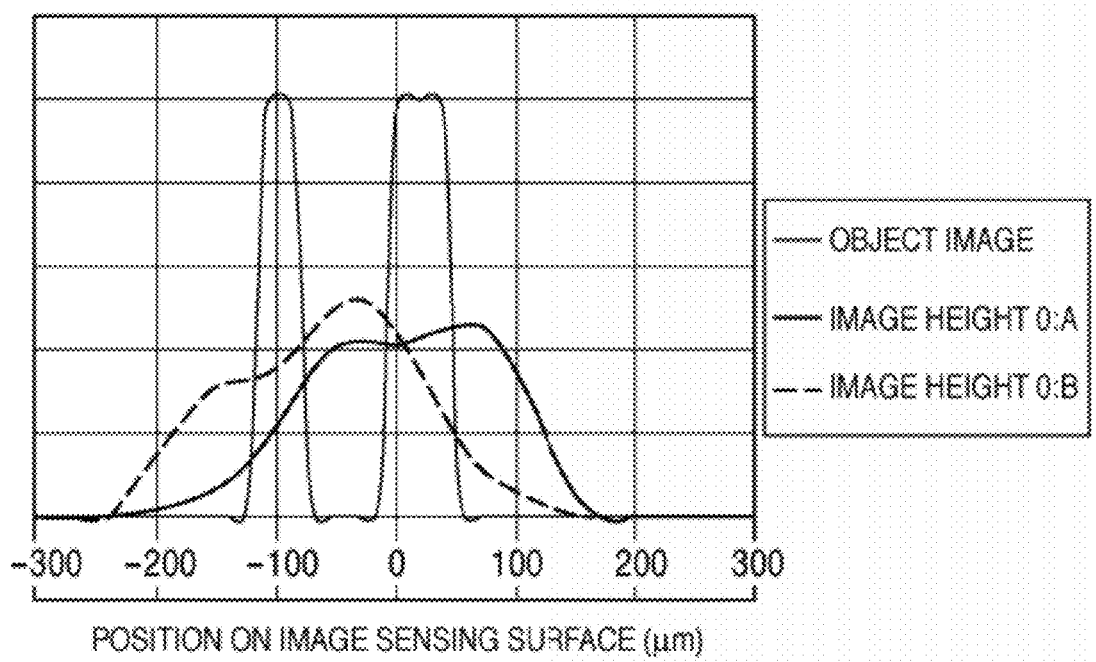
FIGS. 25A and 25B are diagrams showing an example of blurred images of bar charts, without reduction in shape disagreement, on the surface of the image sensor at the center image height Img0 according to the first embodiment of the present invention.
Figure 25B:
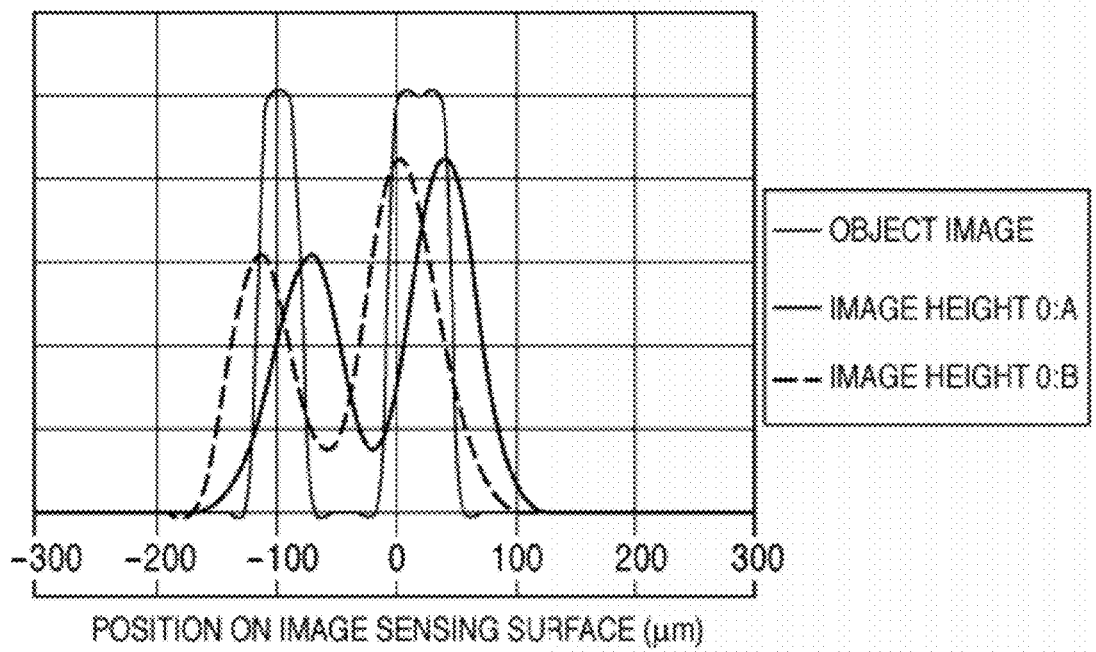

FIGS. 25A and 25B concretely show how two bar charts differing in width get blurred. Convolution integration of the object images with the line spreads in FIGS. 23A and 23B results in blur shapes, and FIGS. 25A and 25B correspond to the defocus amounts in FIGS. 23A and 23B, respectively.

Figure 26A:
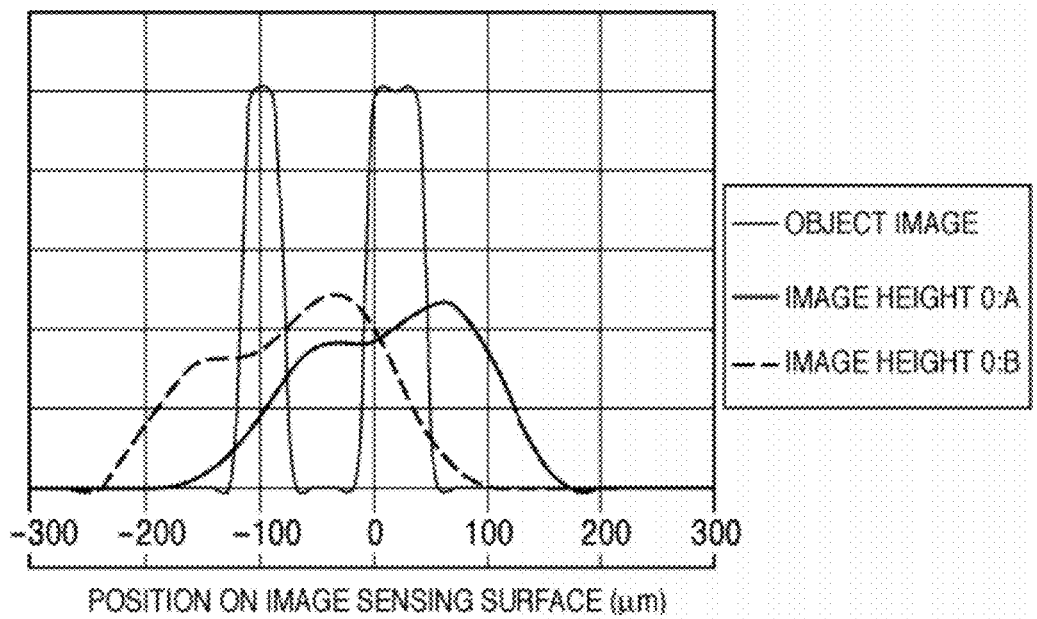
FIGS. 26A and 26B are diagrams showing an example of blurred images of a bar chart, with reduction in shape disagreement, on the surface of the image sensor at the center image height Img0 according to the first embodiment of the present invention.
Figure 26B:
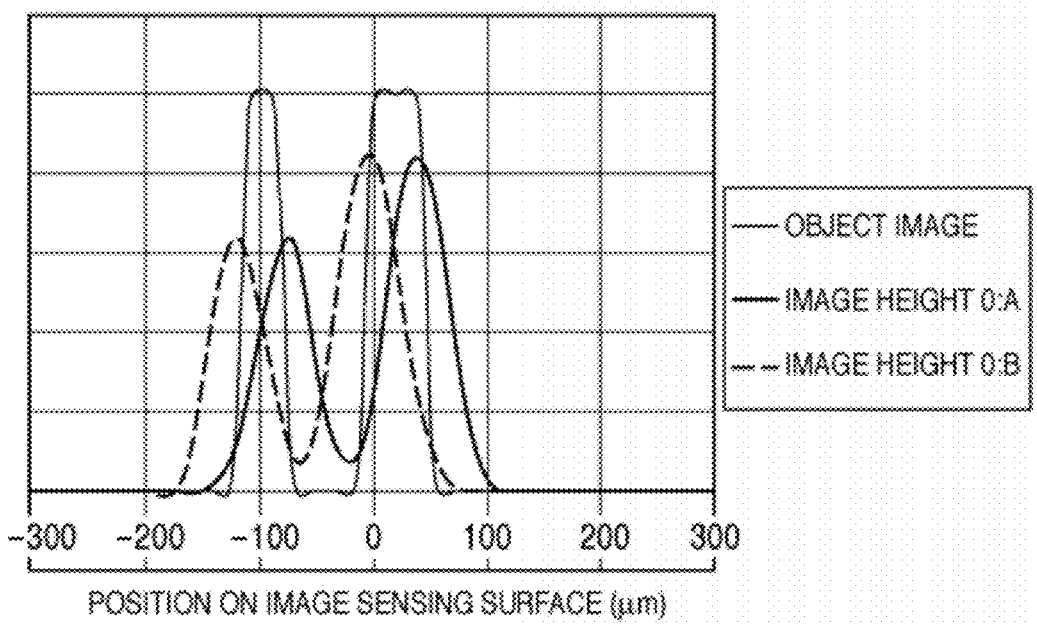

On the other hand, FIGS. 26A and 26B show blurred images of the bar charts on the surface of the image sensor 107. The blurred images are obtained by converting the object images in FIGS. 25A and 25B, that is, the object images whose shapes do not agree well, using equations (10) and (11) above. The blurred images coincide with the shapes resulting from the convolution integration of the line spreads whose shape disagreement has been reduced, and FIGS. 26A and 26B correspond to the defocus amounts in FIGS. 24A and 24B, respectively.

It can be seen that compared to the blur shapes in FIGS. 25A and 25B, the agreement between the blur shapes of the images in FIGS. 26A and 26B have been improved regardless of the degree of defocus.

As described above, the present embodiment makes it possible to restore images using fixed filters regardless of the degree of defocus, and thereby improve focusing accuracy in spite of small-scale arithmetic processing.

Figure 27A:
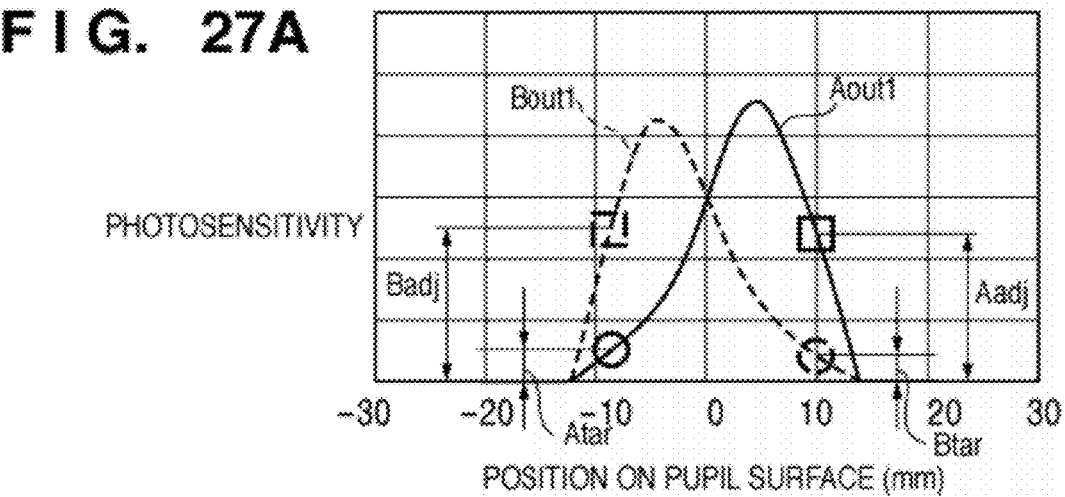
FIGS. 27A to 27C are diagrams illustrating the process of reducing shape disagreement in pupil intensity distribution at 40% diagonal image height Img1 according to the first embodiment of the present invention.
Figure 27B:
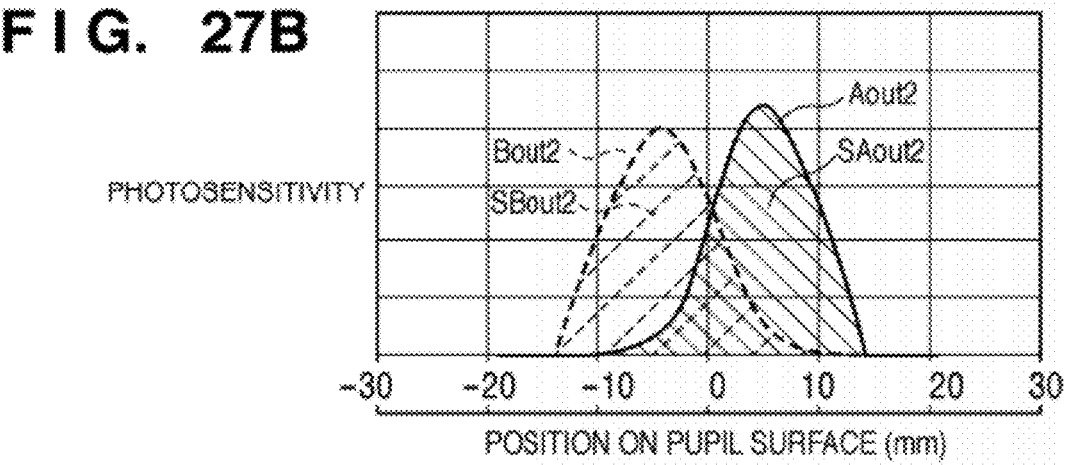
Figure 27C:
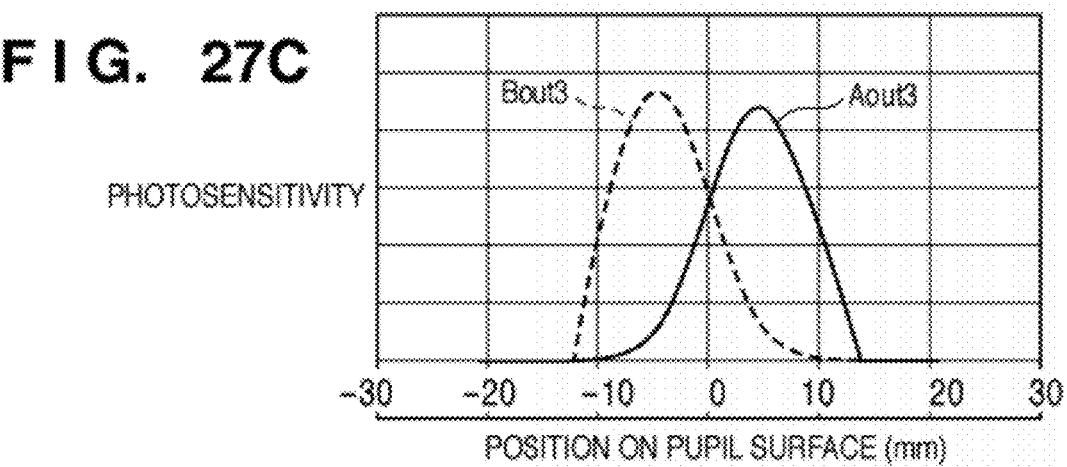

FIGS. 27A to 27C are diagrams illustrating the process of reducing shape disagreement in pupil intensity distribution at 40% diagonal image height Img1. FIG. 27A is a one-dimensional diagram of original pupil intensity distributions, FIG. 27B is a one-dimensional diagram in which tailing of the pupil intensity distributions is reduced, and FIG. 27C is a one-dimensional diagram in which total output values of the pixels $S_{HA}$ and $S_{HB}$ are equalized. Incidentally, in FIGS. 27A to 27C, characteristics of the pixel $S_{HA}$ are indicated by a solid line and characteristics of the pixel $S_{HB}$ are indicated by a broken line.

In the original pupil intensity distribution (FIG. 27A) at the 40% diagonal image height Img1, the tailing can be almost eliminated by subtracting the boxed portion of the pupil intensity distribution characteristic curve of the pixel $S_{HA}$ from the encircled portion of the tailing on one side of the pupil intensity distribution of the pixel $S_{HA}$. As in the case of shape disagreement at the center image height Img0, if it is assumed that b11=Atar/Badj
d11=Btar/Aadj
then, $$Aout2(x)=Aout1(x)-b11\times Bout1(x) \quad (12)$$

$$Bout2(x)=Bout1(x)-d11\times Aout1(x) \quad (13)$$

In this way, by simply objecting outputs of corresponding pixels in a pair of adjacent images A and B to differential signal conversion (subtraction process), it is possible to generate characteristic curves in which the tailing on one side of the pupil intensity distributions is reduced as shown in FIG. 27B.

Next, let SA2 and SB2 denote output integrals of the pupil intensity distributions of the pixels $S_{HA}$ and $S_{HB}$ with the tailing reduced as shown in FIG. 27B.

a1=SA2/SA2=1
c1=SA2/SB2

Then, by multiplying by proportionality constants as follows $$Aout3(x)=a1\times Aout2(x) \quad (14)$$

$$Bout3(x)=c1\times Bout2(x) \quad (15)$$

it is possible to equalize the integrals of the pupil intensity distributions of the pixels $S_{HA}$ and $S_{HB}$ as shown in FIG. 27C. At the 40% diagonal image height Img1, since SA2 and SB2 are different, the shapes in FIG. 27B and FIG. 27C are different.

From equations (12), (13), (14), and (15), $$\begin{aligned}Aout3(x) &= a1 \times (Aout1(x) - b11 \times Bout1(x)) \\ &= a1 \times Aout1(x) - a1 \times b11 \times Bout1(x)\end{aligned}$$

$$\begin{aligned}Bout3(x) &= c1 \times (Bout1(x) - d11 \times Aout1(x)) \\ &= c1 \times Bout1(x) - c1 \times d11 \times Bout1(x)\end{aligned}$$

Then, if
b1=a1×b11
d1=c1×d11
the following equations result:

$$Aout3(x)=a1\times Aout1(x)-b1\times Bout1(x) \quad (16)$$

$$Bout3(x)=c1\times Bout1(x)-d1\times Bout1(x) \quad (17)$$

Incidentally, in equations (16) and (17), Aout1(x) is an example of the first image signal, Bout1(x) is an example of the second image signal, Aout3(x) is an example of the first corrected image signal, and Bout3(x) is an example of the second corrected image signal. Furthermore, a1 is an example of the first coefficient, b1 is an example of the second coefficient, c1 is an example of the third coefficient, and d1 is an example of the fourth coefficient.

If the correction constants a1, b1, c1, and d1 used to reduce the shape disagreement at the 40% diagonal image height Img1 are set as follows b11=0.17, d11=0.15
a1=1, c1=1.16
b1=0.17, d1=0.173 the pupil intensity distributions in FIG. 27A can be converted, in appearance, into the pupil intensity distributions in FIG. 27C.

Figure 28A:
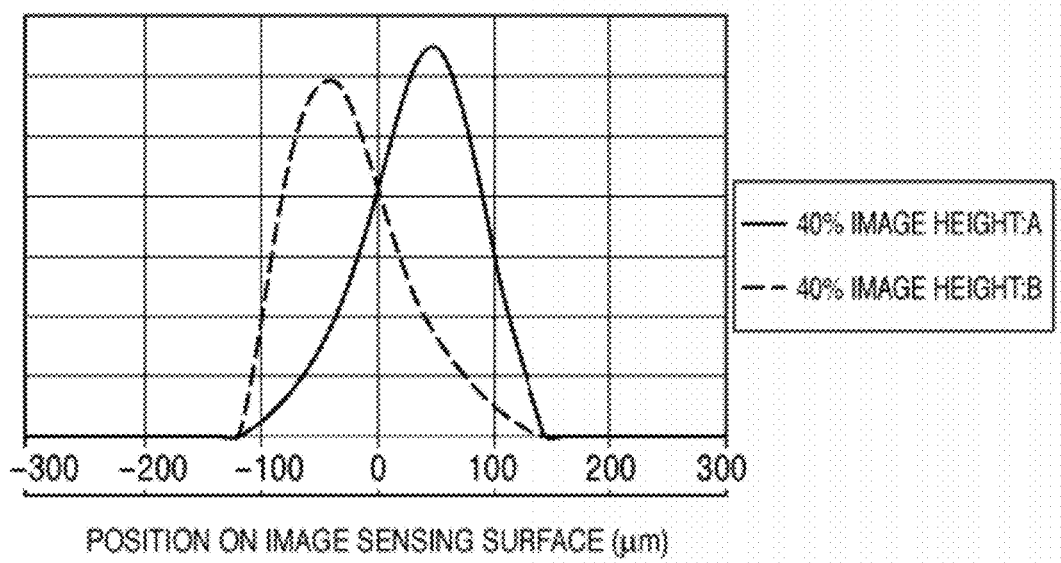
FIGS. 28A and 28B are diagrams showing line spreads, without reduction in shape disagreement, on the surface of the image sensor at 40% diagonal image height Img1 according to the first embodiment of the present invention.
Figure 28B:
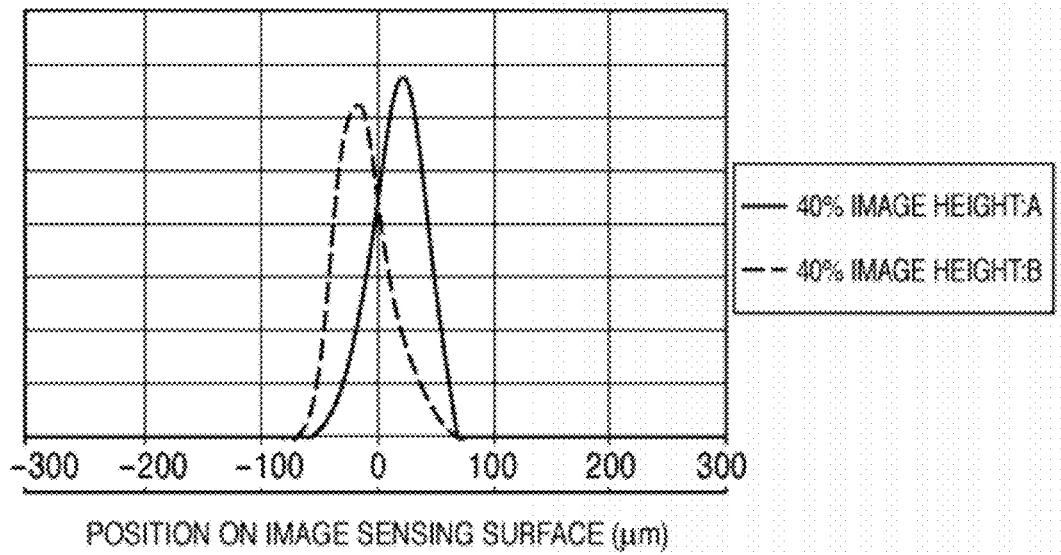

FIGS. 28A and 28B are diagrams showing line spreads on surfaces of the image sensor 107 with different defocus amounts corresponding to the pupil intensity distributions in FIG. 27A, where FIG. 28A shows an example in which the defocus amount is small and FIG. 28B shows an example in which the defocus amount is large. It can be seen that the shape disagreement in the pupil intensity distribution in FIG. 27A is maintained as it is in the line spreads of FIGS. 28A and 28B.

Figure 29A:
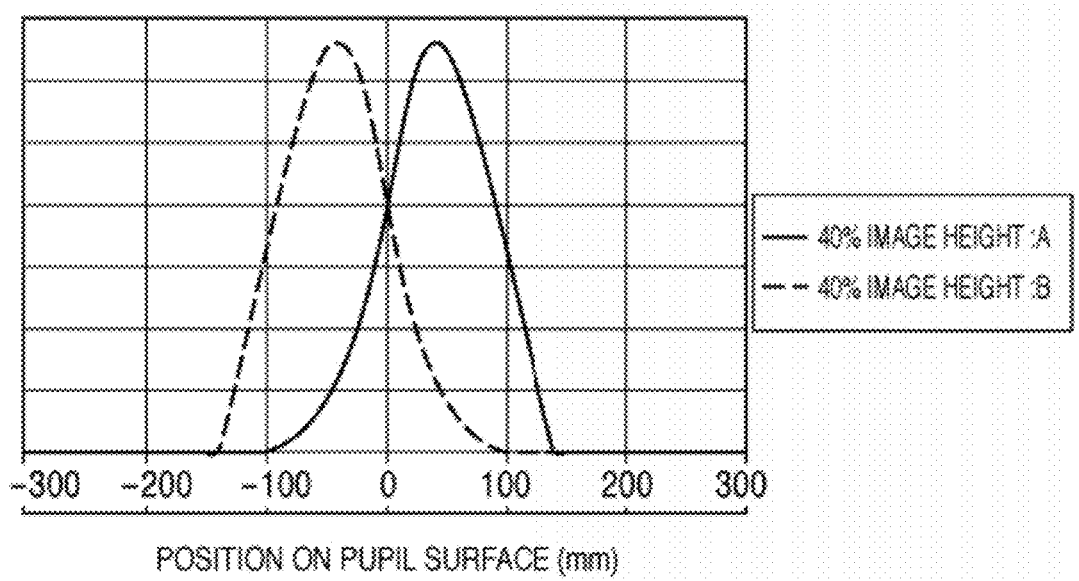
FIGS. 29A and 29B are diagrams showing line spreads, with reduction in shape disagreement, on the surface of the image sensor at 40% diagonal image height Img1 according to the first embodiment of the present invention.
Figure 29B:
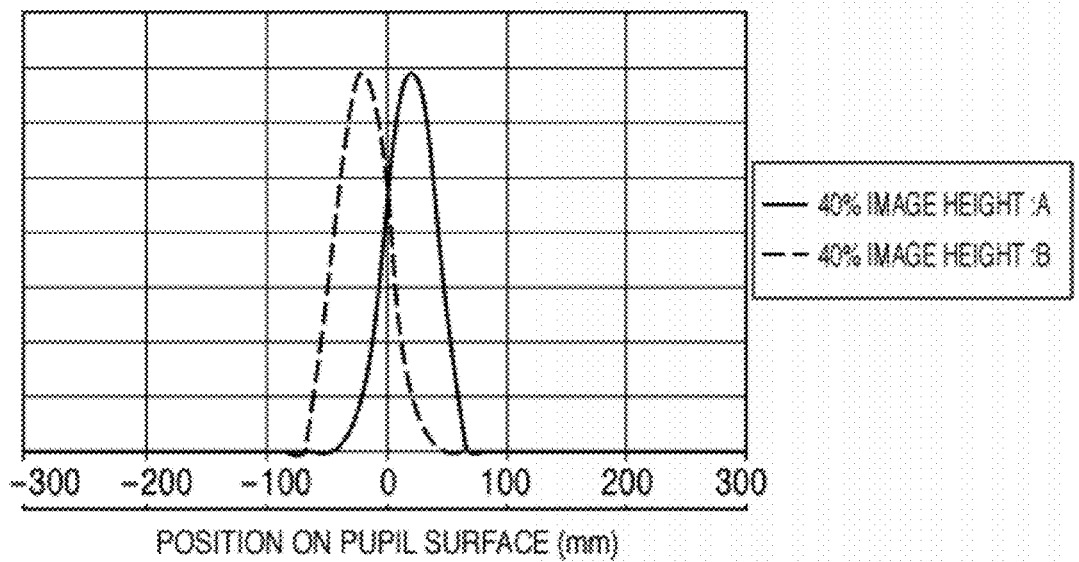

On the other hand, FIGS. 29A and 29B are diagrams showing line spreads on surfaces of the image sensor 107 with different defocus amounts corresponding to the pupil intensity distributions in FIG. 27C, where FIG. 29A shows an example in which the defocus amount is small and FIG. 29B shows an example in which the defocus amount is large. It can be seen that the reduced shape disagreement in the pupil intensity distribution in FIG. 27C is maintained as it is in the line spreads of FIGS. 29A and 29B.

Figure 30A:
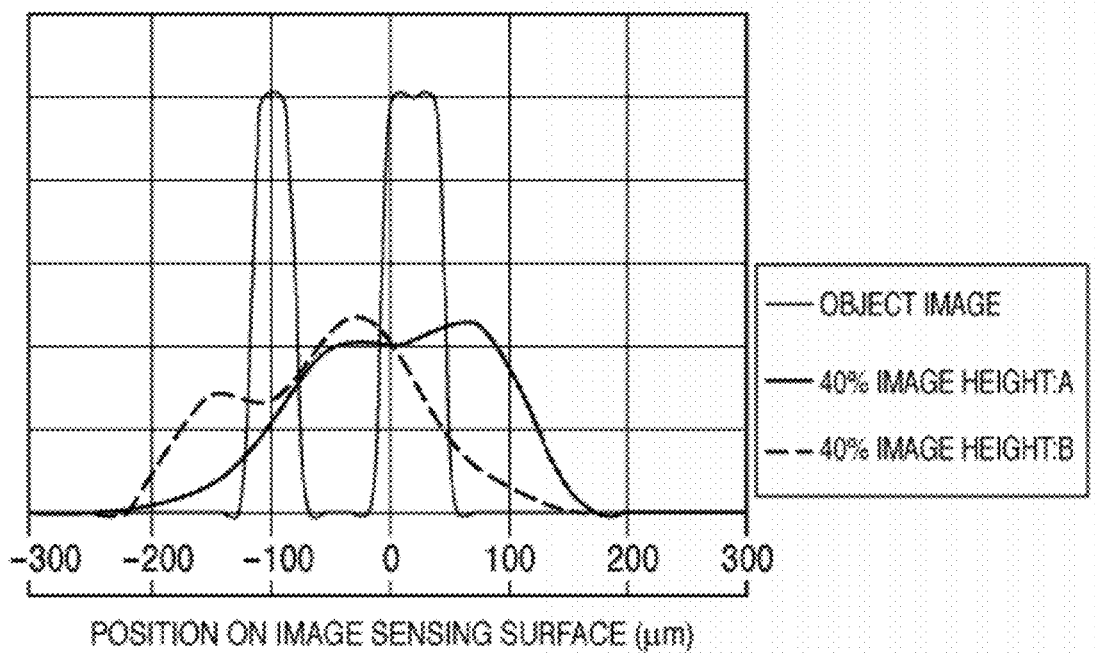
FIGS. 30A and 30B are diagrams showing an example of blurred images of bar charts, without reduction in shape disagreement, on the surface of the image sensor at 40% diagonal image height Img1 according to the first embodiment of the present invention.
Figure 30B:
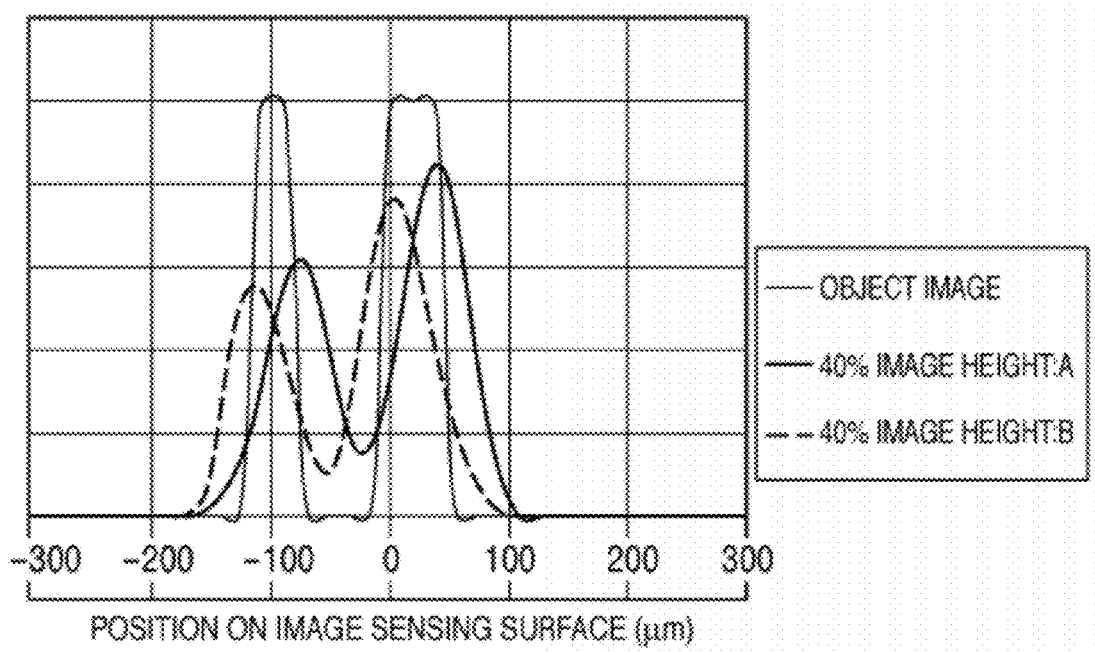

FIGS. 30A and 30B concretely show how two bar charts differing in width get blurred. Convolution integration of the object images with the line spreads in FIGS. 28A and 28B results in blur shapes, and FIGS. 30A and 30B correspond to the defocus amounts in FIGS. 28A and 28B, respectively.

Figure 31A:
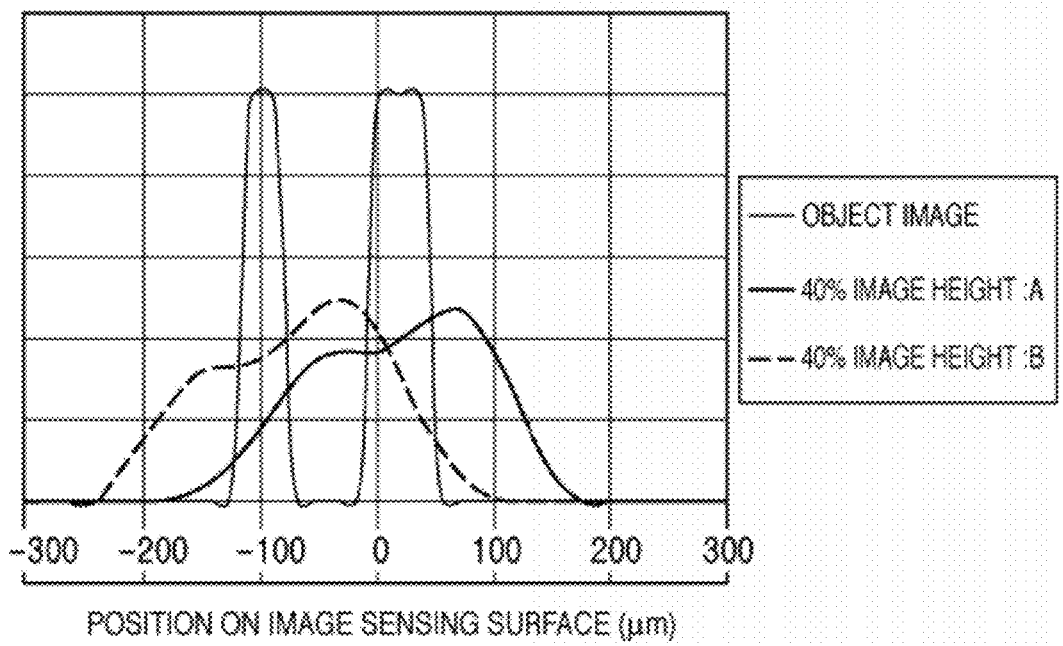
FIGS. 31A and 31B are diagrams showing an example of blurred images of bar charts, with reduction in shape disagreement, on the surface of the image sensor at 40% diagonal image height Img1 according to the first embodiment of the present invention.
Figure 31B:
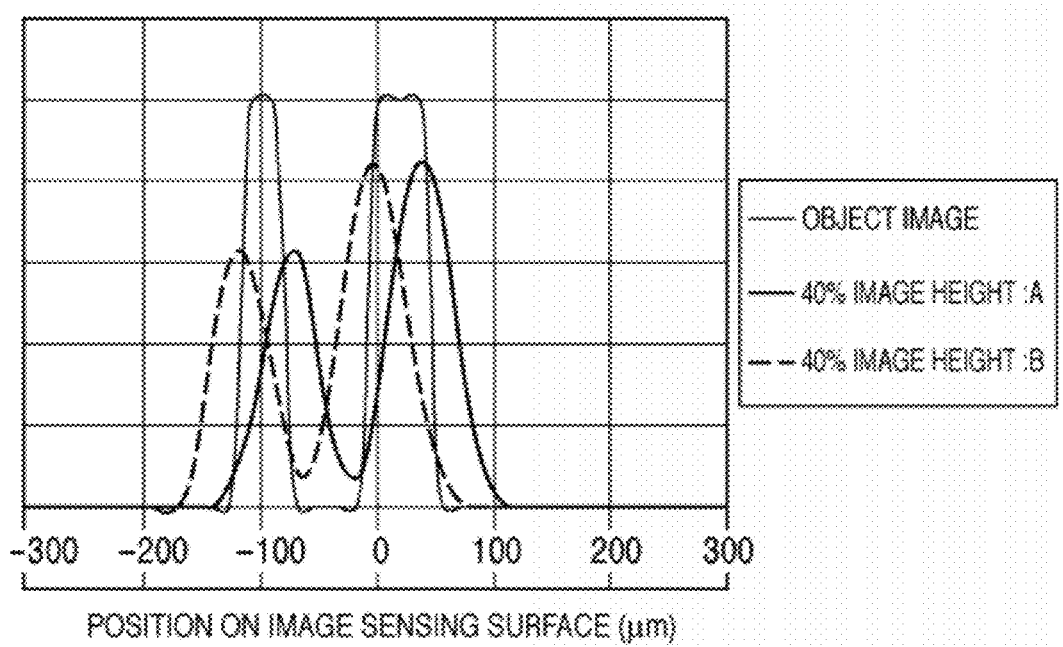

On the other hand, FIGS. 31A and 31B show blurred images of the bar charts on the surface of the image sensor 107. The blurred images are obtained by converting the object images in FIGS. 30A and 30B, that is, the object images whose shapes do not agree well, using equations (16) and (17) above. The blurred images coincide with the shapes resulting from the convolution integration of the line spreads whose shape disagreement has been reduced, and FIGS. 31A and 31B correspond to the defocus amounts in FIGS. 29A and 29B, respectively.

It can be seen that compared to the blur shapes in FIGS. 30A and 30B, the agreement between the blur shapes of the images in FIGS. 31A and 31B have been improved regardless of the degree of defocus.

Figure 32A:
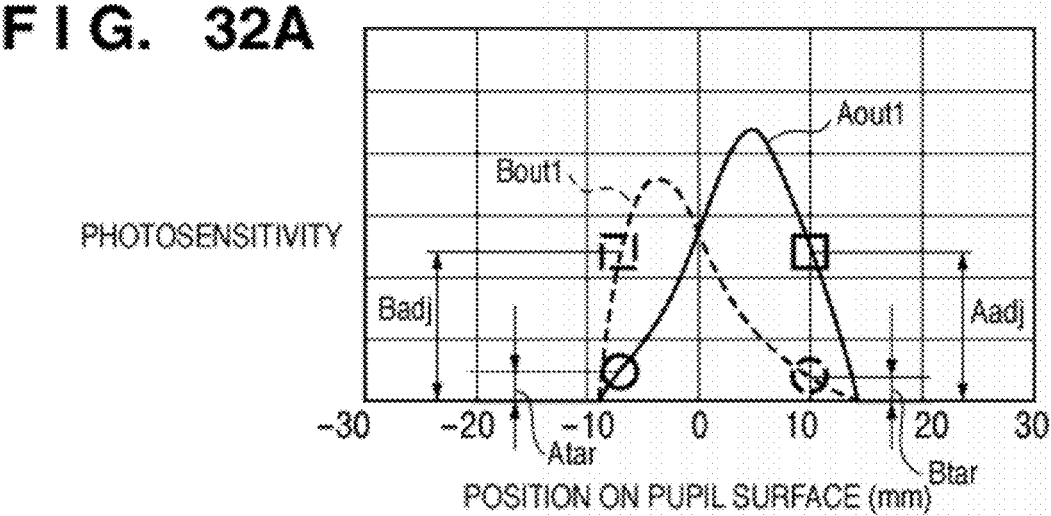
FIGS. 32A to 32C are diagrams showing the process of reducing shape disagreement in pupil intensity distribution at 80% diagonal image height Img2 according to the first embodiment of the present invention.
Figure 32B:
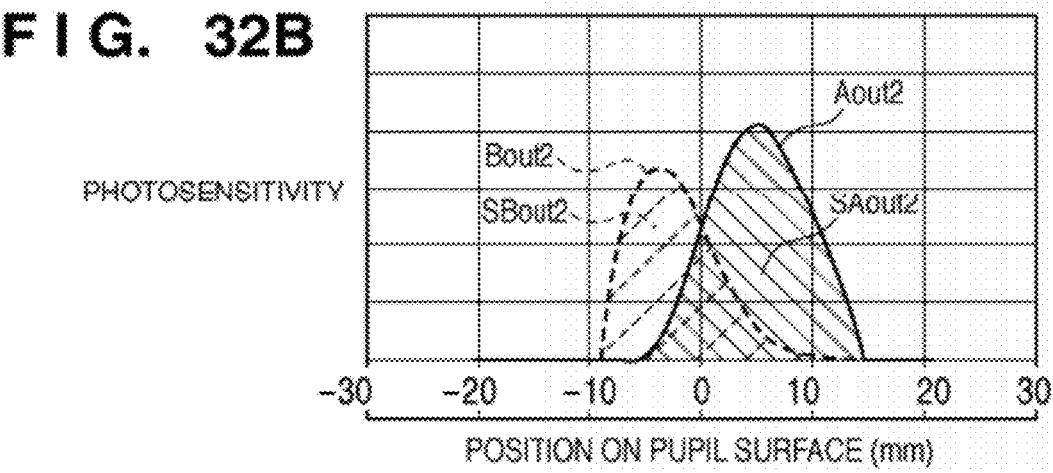
Figure 32C:
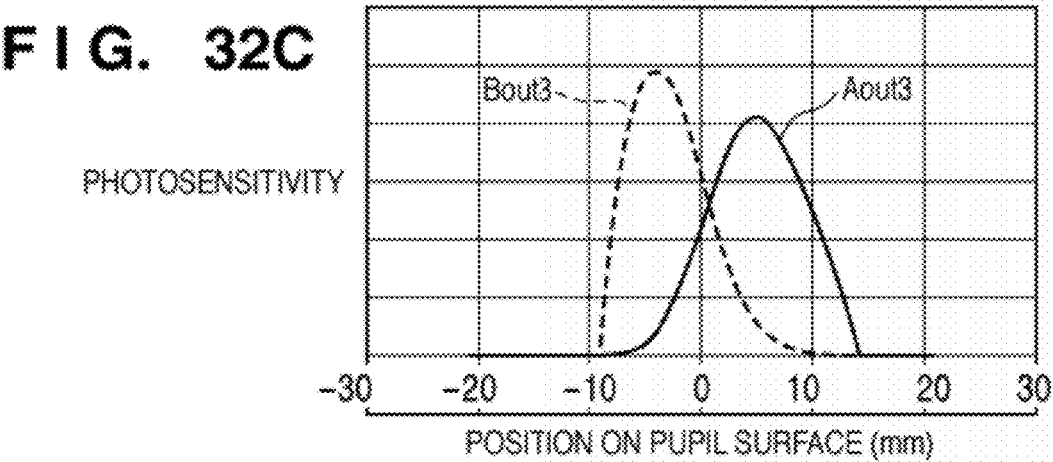

FIGS. 32A to 32C are diagrams illustrating the process of reducing shape disagreement in pupil intensity distribution at 80% diagonal image height Img2. FIG. 32A is a one-dimensional diagram of original pupil intensity distributions, FIG. 32B is a one-dimensional diagram in which tailing of the pupil intensity distributions is reduced, and FIG. 32C is a one-dimensional diagram in which total output values of the pixels $S_{HA}$ and $S_{HB}$ are equalized. Incidentally, in FIGS. 32A to 32C, characteristics of the pixel $S_{HA}$ are indicated by a solid line and characteristics of the pixel $S_{HB}$ are indicated by a broken line.

In the original pupil intensity distribution (FIG. 32A) at the 80% diagonal image height Img2, the tailing can be almost eliminated by subtracting the boxed portion of the pupil intensity distribution characteristic curve of the pixel $S_{HA}$ from the encircled portion of the tailing on one side of the pupil intensity distribution of the pixel $S_{HA}$. As in the case of shape disagreement at the center image height Img0 and at the 40% diagonal image height Img1, if it is assumed that b22=Atar/Badj
d22=Btar/Aadj
then, $$Aout2(x)=Aout1(x)-b22\times Bout1(x) \quad (18)$$

$$Bout2(x)=Bout1(x)-d22\times Aout1(x) \quad (19)$$

In this way, by simply objecting outputs of corresponding pixels in a pair of adjacent images A and B to differential signal conversion (subtraction process), it is possible to generate characteristic curves in which the tailing on one side of the pupil intensity distributions is reduced as shown in FIG. 32B.

Next, let SA2 and SB2 denote output integrals of the pupil intensity distributions of the pixels $S_{HA}$ and $S_{HB}$ with the tailing reduced as shown in FIG. 32B.

a2=SA2/SA2=1
c2=SA2/SB2

Then, by multiplying by proportionality constants as follows:

$$Aout3(x)=a2\times Aout2(x) \qquad (20)$$

$$Bout3(x)=c2\times Bout2(x) \qquad (21)$$

it is possible to equalize the integrals of the pupil intensity distributions of the pixels $S_{HA}$ and $S_{HB}$ as shown in FIG. 32C. At the 80% diagonal image height Img2, since SA2 and SB2 are different, the shapes in FIG. 32B and FIG. 32C are different.

From equations (18), (19), (20), and (21)

$$Aout3(x) = a2 \times (Aout1(x) - b22 \times Bout1(x))$$
$$= a2 \times Aout1(x) - a2 \times b22 \times Bout1(x)$$

$$Bout3(x) = c2 \times (Bout1(x) - d22 \times Aout1(x))$$
$$= c2 \times Bout1(x) - c2 \times d22 \times Bout1(x)$$

Then, if
b2=a2×b22
d2=c2×d22
the following equations result:

$$Aout3(x)=a2\times Aout1(x)-b2\times Bout1(x) \qquad (22)$$

$$Bout3(x)=c2\times Bout1(x)-d2\times Bout1(x) \qquad (23)$$

Incidentally, in equations (22) and (23), Aout1(x) is an example of the first image signal, Bout1(x) is an example of the second image signal, Aout3(x) is an example of the first corrected image signal, and Bout3(x) is an example of the second corrected image signal. Furthermore, a2 is an example of the first coefficient, b2 is an example of the second coefficient, c2 is an example of the third coefficient, and d2 is an example of the fourth coefficient.

If the correction constants a2, b2, c2, and d2 used to reduce the shape disagreement at the 80% diagonal image height Img2 are set as follows
b22=0.22, d22=0.15
a2=1, c2=1.1
b2=0.22, d2=0.164
the pupil intensity distributions in FIG. 32A can be converted, in appearance, into the pupil intensity distributions in FIG. 32C.

Figure 33A:
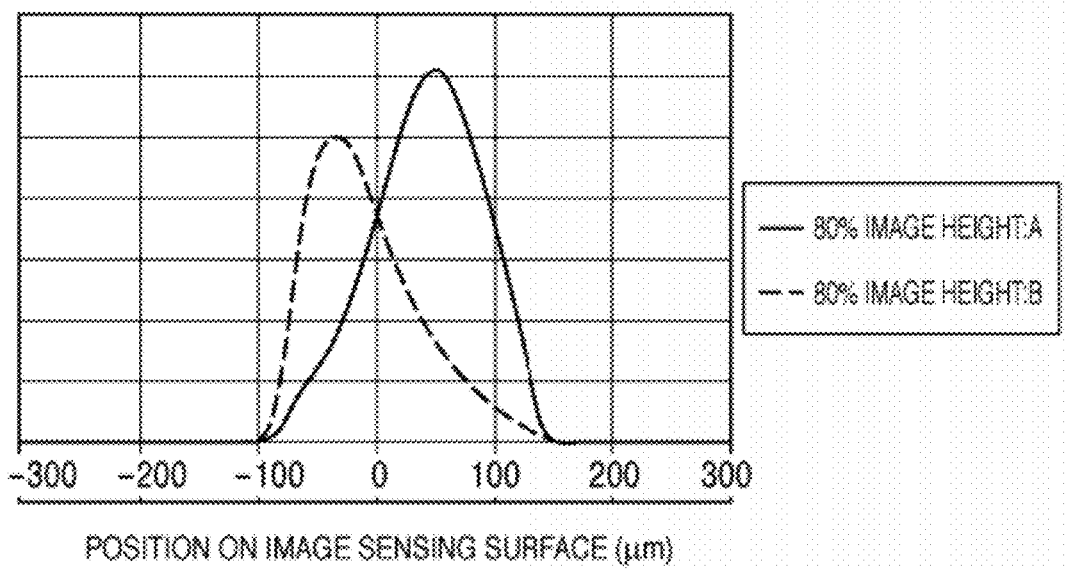
FIGS. 33A and 33B are diagrams showing line spreads, without reduction in shape disagreement, on the surface of the image sensor at 80% diagonal image height Img2 according to the first embodiment of the present invention.
Figure 33B:
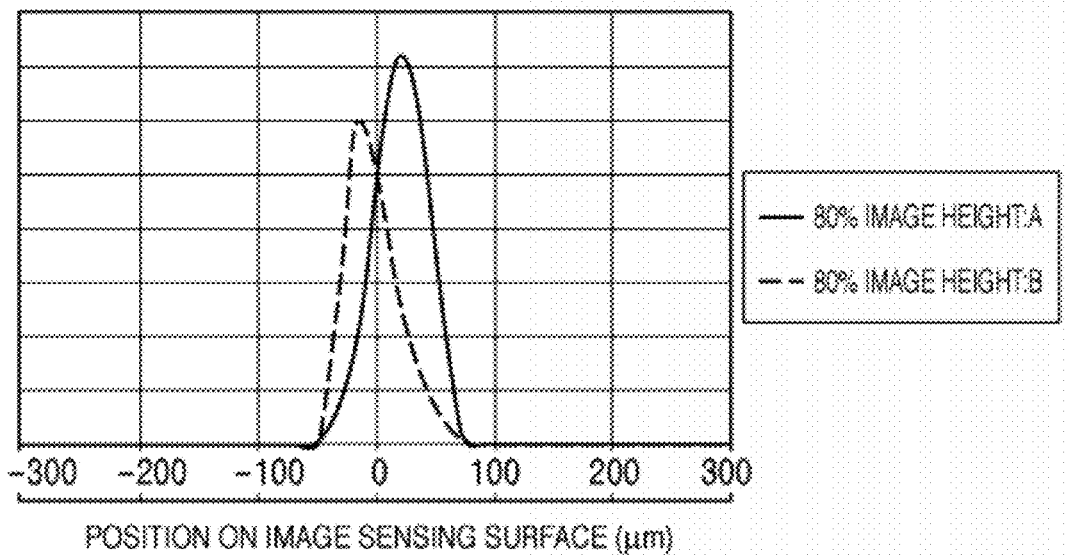

FIGS. 33A and 33B are diagrams showing line spreads on surfaces of the image sensor 107 with different defocus amounts corresponding to the pupil intensity distributions in FIG. 32A, where FIG. 33A shows an example in which the defocus amount is small and FIG. 33B shows an example in which the defocus amount is large. It can be seen that the shape disagreement in the pupil intensity distribution in FIG. 32A is maintained as it is in the line spreads of FIGS. 33A and 33B.

Figure 34A:
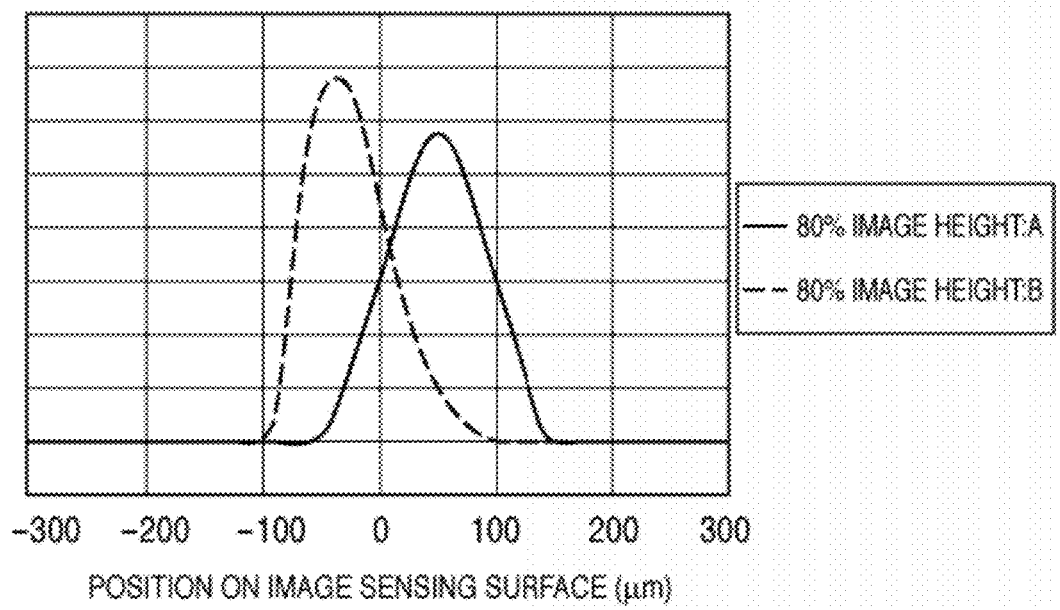
FIGS. 34A and 34B are diagrams showing line spreads, with reduction in shape disagreement, on the surface of the image sensor at 80% diagonal image height Img2 according to the first embodiment of the present invention.
Figure 34B:
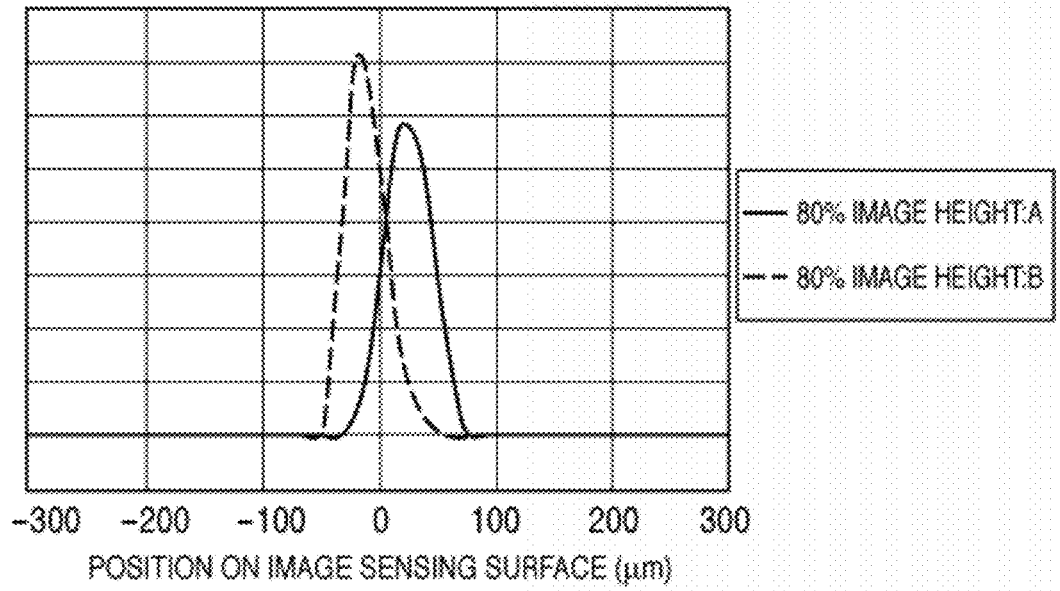

On the other hand, FIGS. 34A and 34B are diagrams showing line spreads on surfaces of the image sensor 107 with different defocus amounts corresponding to the pupil intensity distributions in FIG. 32C, where FIG. 34A shows an example in which the defocus amount is small and FIG. 34B shows an example in which the defocus amount is large. It can be seen that the reduced shape disagreement in the pupil intensity distribution in FIG. 32C is maintained as it is in the line spreads of FIGS. 34A and 34B.

Figure 35A:
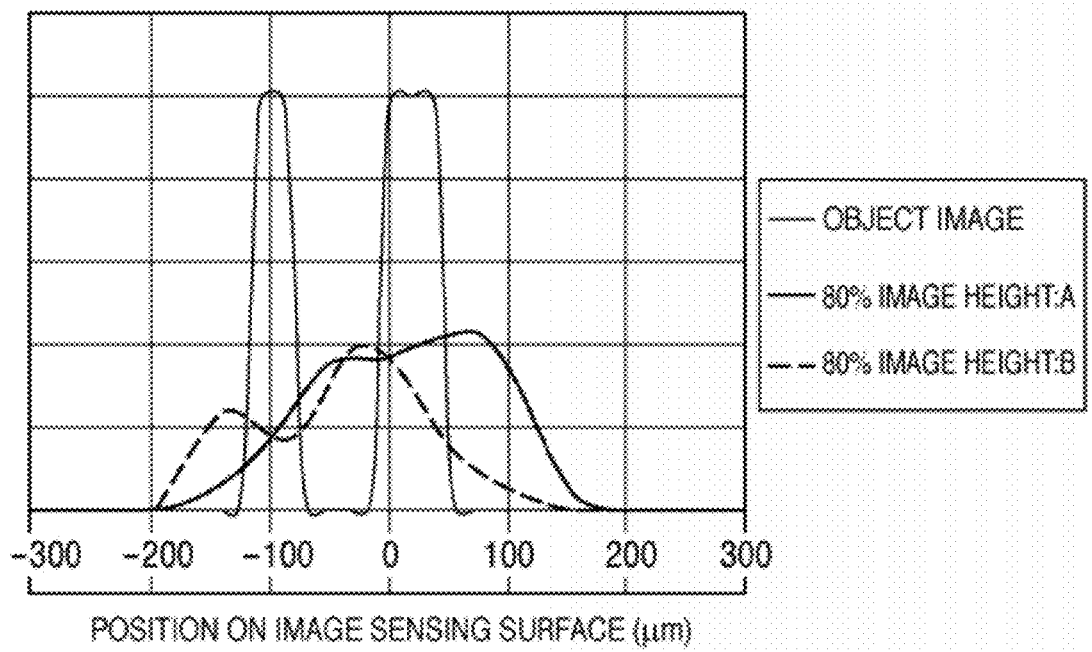
FIGS. 35A and 35B are diagrams showing an example of blurred images of bar charts, without reduction in shape disagreement, on the surface of the image sensor at 80% diagonal image height Img2 according to the first embodiment of the present invention.
Figure 35B:
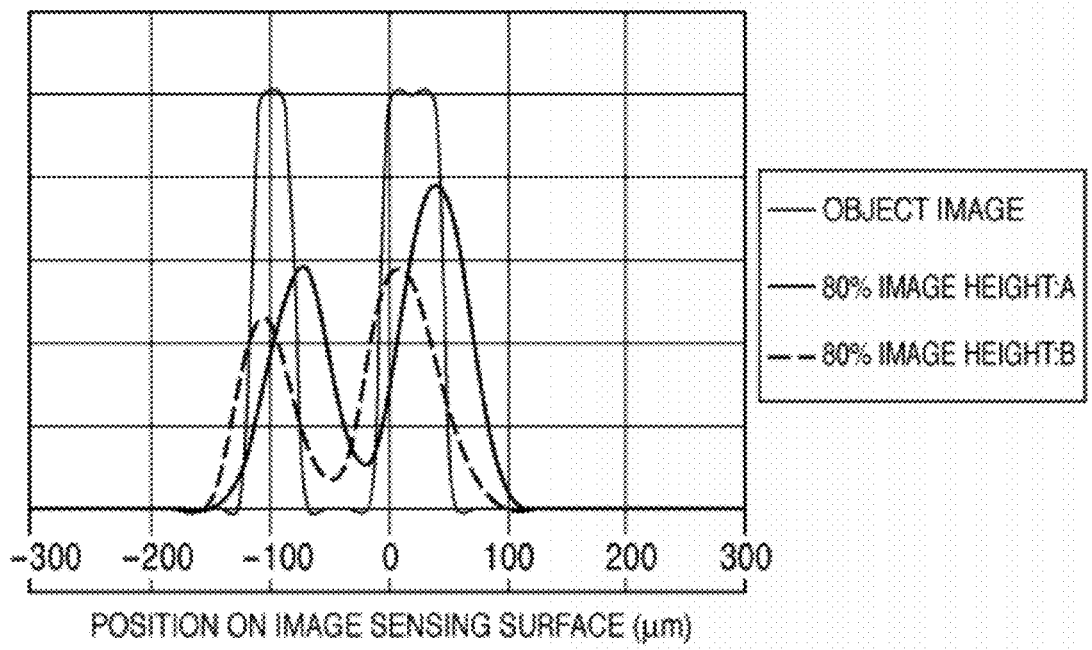

FIGS. 35A and 35B concretely show how two bar charts differing in width get blurred. Convolution integration of the object images with the line spreads in FIGS. 33A and 33B results in blur shapes, and FIGS. 35A and 35B correspond to the defocus amounts in FIGS. 33A and 33B, respectively.

Figure 36A:
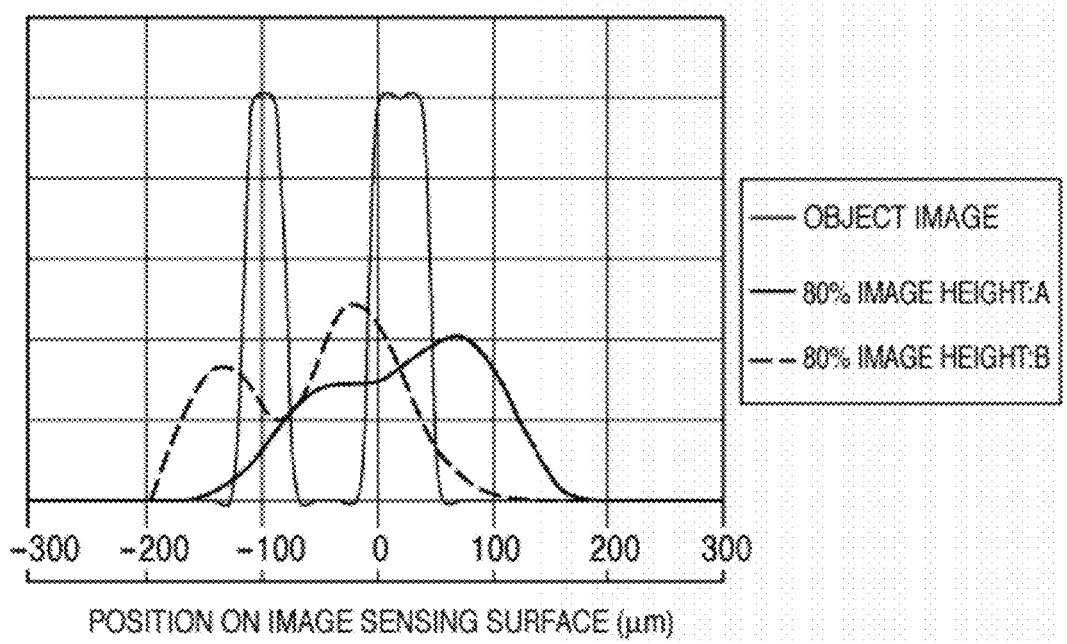
FIGS. 36A and 36B are diagrams showing an example of blurred images of bar charts, with reduction in shape disagreement, on the surface of the image sensor at 80% diagonal image height Img2 according to the first embodiment of the present invention.
Figure 36B:
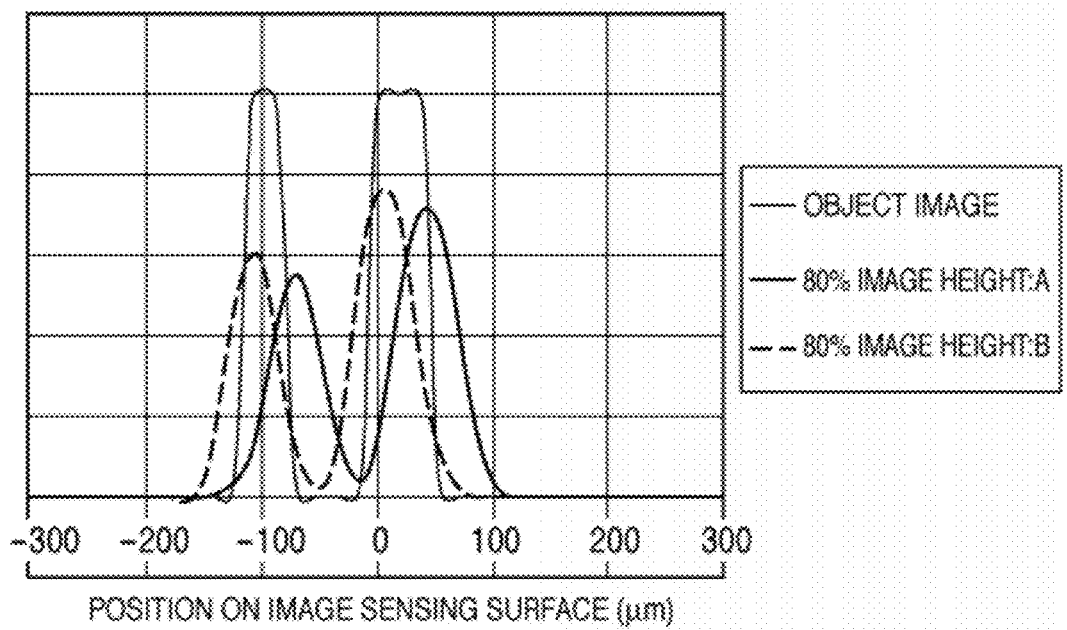

On the other hand, FIGS. 36A and 36B show blurred images of the bar charts on the surface of the image sensor 107. The blurred images are obtained by converting the object images in FIGS. 35A and 35B, that is, the object images whose shapes do not agree well, using equations (22) and (23) above. The blurred images coincide with the shapes resulting from the convolution integration of the line spreads whose shape disagreement has been reduced, and FIGS. 36A and 36B correspond to the defocus amounts in FIGS. 34A and 34B, respectively.

It can be seen that compared to the blur shapes in FIGS. 35A and 35B, the agreement between the blur shapes of the images in FIGS. 36A and 36B have been improved regardless of the degree of defocus. In FIGS. 36A and 36B, it appears that the blurred images after correction differ in the amount of light, but the total amounts of light of the object images coincide when integrated. This phenomenon occurs because the images differ in the way they are blurred. Even in such a situation, the images coincide in size if they are in focus. The images also coincide in size in the presence of a uniform luminance plane. The above process makes the images of the pixels $S_{HA}$ and $S_{HB}$ equal in the total amount of light.

As described above, even when the image height changes greatly, if optimum correction constants are specified individually, it is possible to restore images using fixed filters regardless of the degree of defocus, and thereby improve focusing accuracy in spite of small-scale arithmetic processing.

Also, in a configuration which restricts focus detection areas, for example, in a configuration which handles only a central area, the correction constants can be fixed, making it possible to further simplify arithmetic processing.

Figure 37:
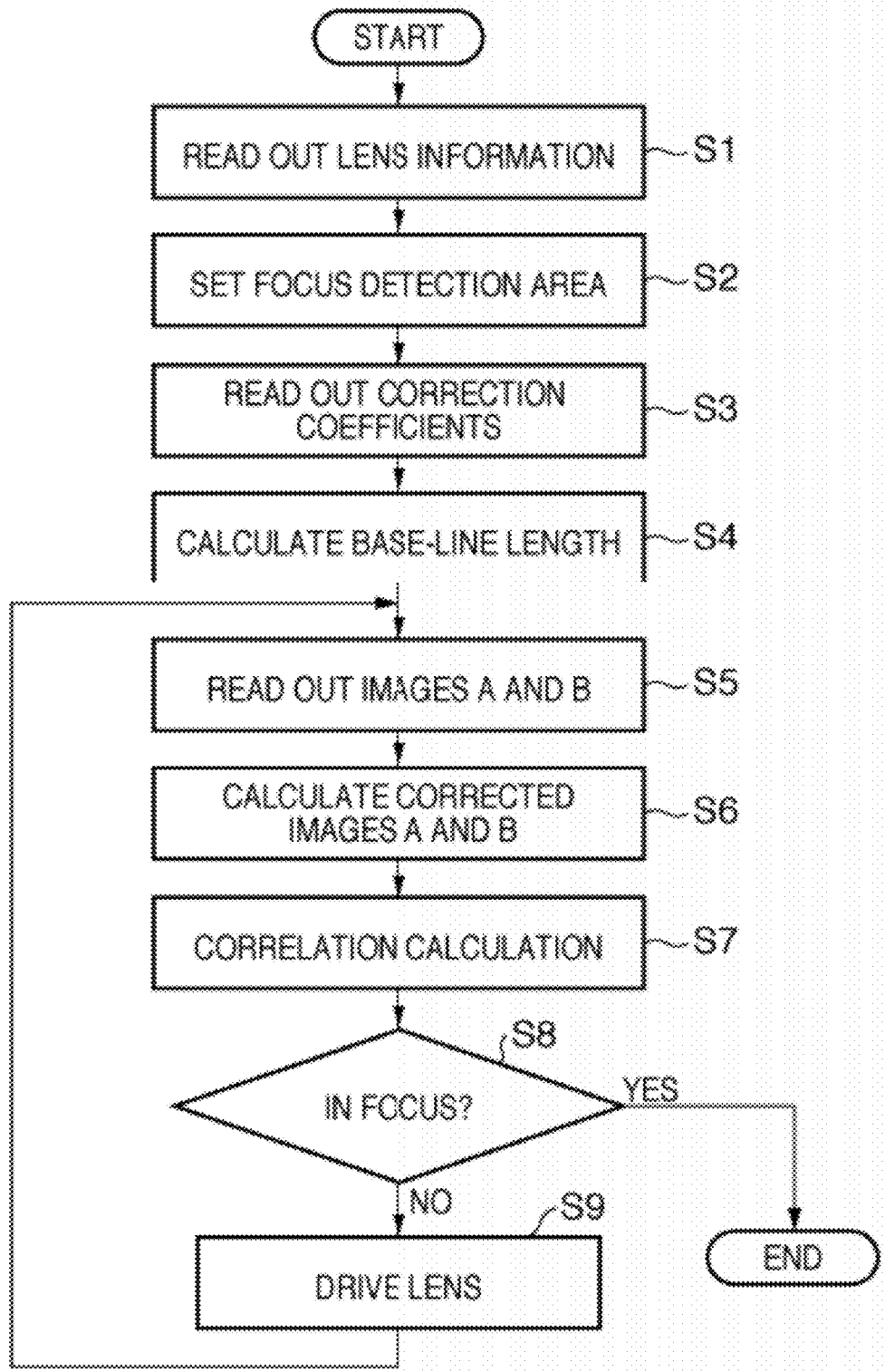
FIG. 37 is a flowchart showing a focus detection process according to the embodiment of the present invention.

Next, a flow of a focus detection process according to the first embodiment will be described with reference to a flowchart in FIG. 37. The operation of the flowchart in FIG. 37 is performed by the CPU 121.

In step S1, the CPU 121 reads out lens information—specifically, lens type, zoom position, aperture value, and the like—to check vignetting state. In step S2, the CPU 121 reads out a focus detection area set by the user, and then goes to step S3.

In step S3, the CPU 121 reads the correction coefficients of each focus detection pixel corresponding to the lens information out of the ROM of the CPU 121, and then goes to step S4. In step S4, the CPU 121 calculates the center of gravity of the pupil intensity distribution whose shape disagreement has been reduced and which has been obtained in step S3 and determines the base-line length. Then, the CPU 121 goes to step S5.

Next, in step S5, the CPU 121 reads image signals from the focus detection pixels in the focus detection area and forms object image A and object image B. Then, the CPU 121 goes to step S6.

In step S6, based on the correction coefficients read out in step S3, the CPU 121 reduces the shape disagreement of object image A and object image B formed in step S5 and thereby generates corrected object images A and B. Then, the CPU 121 goes to step S7.

In step S7, using a known correlation calculation method, the CPU 121 determines an amount of image deviation between object image A and object image B objected to image correction in step S6, and determines a defocus amount based on the amount of image deviation in conjunction with the base-line length determined in step S4. Once the defocus amount is calculated, the CPU 121 goes to step S8.

In step S8, based on the calculated defocus amount, the CPU 121 determines whether the image is in focus. If it is not determined that the image is in focus, the CPU 121 goes to step S9 to move the third lens group 105 forward or backward based on results of the defocus calculation. Then, the CPU 121 returns to step S5.

On the other hand, if it is determined that the image is in focus, the CPU 121 finishes the focus detection process made up of a series of steps.

As described above, the first embodiment makes it possible to restore images using simple calculations by reading out correction coefficients corresponding to the vignetting state of a luminous flux in focus adjustment areas at different image heights, and thereby improve focusing accuracy.

Second Embodiment

Next, a second embodiment of the present invention will be described.

A configuration of the image sensing apparatus according to the second embodiment is the same as the first embodiment, and thus description thereof will be omitted herein. Operation of the second embodiment will be described assuming that the aperture value of the lens (f-number) is set to 4. Pupil intensity distributions of the focus detection pixels are also similar to those of the first embodiment shown in FIGS. 14A and 14B.

Figure 38A:
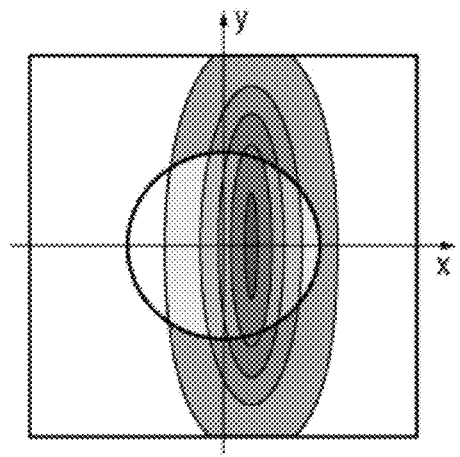
FIGS. 38A and 38B are diagrams each showing vignetting on the pupil surface Me according to a second embodiment of the present invention.
Figure 38B:
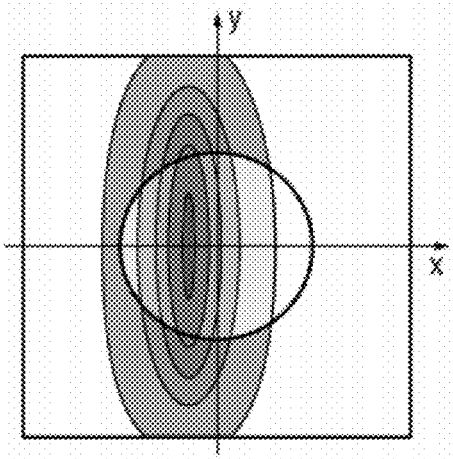

FIGS. 38A and 38B are diagrams each showing vignetting, at a predetermined aperture value (f-number) of 4, on the pupil surface Me of a focus detection pixel at the center image height Img0 of the image sensor 107, where FIG. 38A shows characteristics of the pixel $S_{HA}$ and FIG. 38B shows characteristics of the pixel $S_{HB}$. In this case, shape of pupil vignetting corresponds to aperture size at f4, where the luminous flux passing through the shape represented by Area1 in FIG. 13A enters the pixels $S_{HA}$ and $S_{HB}$ with the illustrated pupil intensity distributions.

Figure 39:
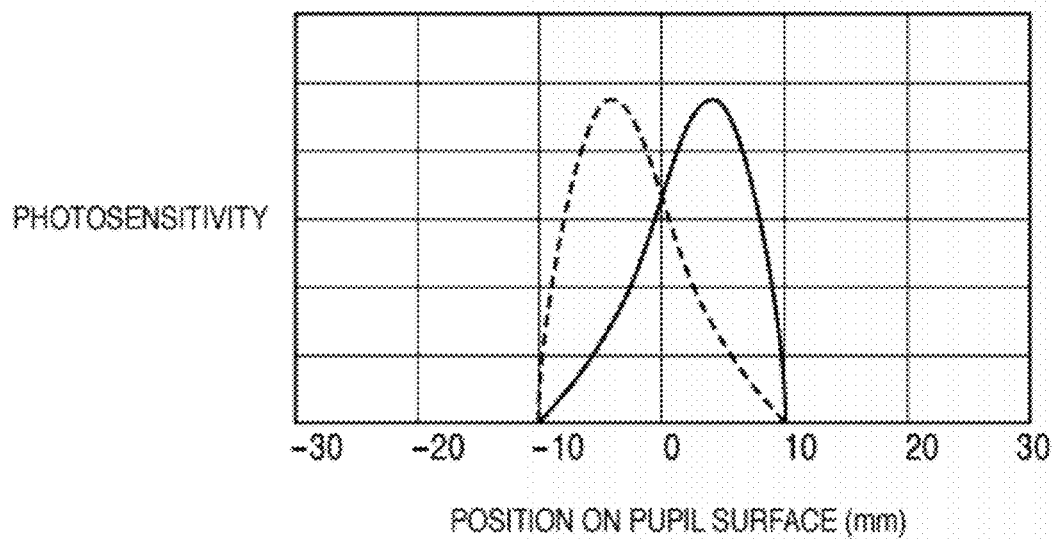
FIG. 39 is a diagram one-dimensionally showing pupil intensity distributions on the pupil surfaces Me according to the second embodiment of the present invention.

FIG. 39 is a diagram one-dimensionally showing pupil intensity distributions of an incident luminous flux on the pupil surfaces Me of focus detection pixels at the center image height Img0 of the image sensor 107. The abscissa corresponds to the x-coordinate on the pupil surface Me and the ordinate represents intensity at each coordinate. The intensity at each x-coordinate is obtained by adding the pupil intensities in the y-direction in FIGS. 38A and 38B, where characteristics of the pixel $S_{HA}$ are indicated by a solid line and characteristics of the pixel $S_{HB}$ are indicated by a broken line. As shown in FIGS. 38A and 38B, the pupil intensity distributions on the pupil surfaces Me of the pixels $S_{HA}$ and $S_{HB}$ are mirror images of each other. Since vignette shape is symmetric with respect to the y-axis, the pupil intensity distributions of the incident luminous flux on the pupil surfaces Me of the pixels $S_{HA}$ and $S_{HB}$ are also mirror images of each other.

Figure 40A:
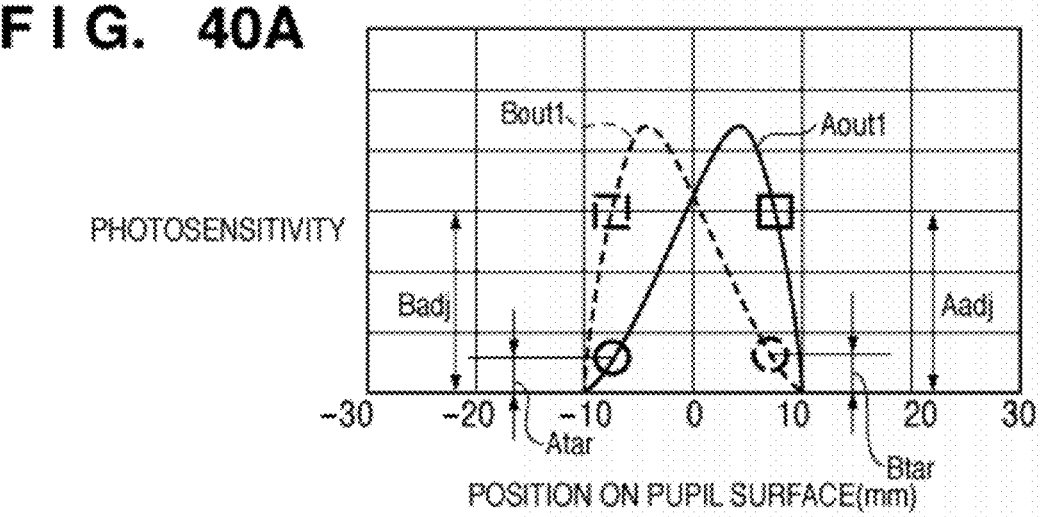
FIGS. 40A to 40C are diagrams showing the process of reducing shape disagreement in pupil intensity distribution according to the second embodiment of the present invention.
Figure 40B:
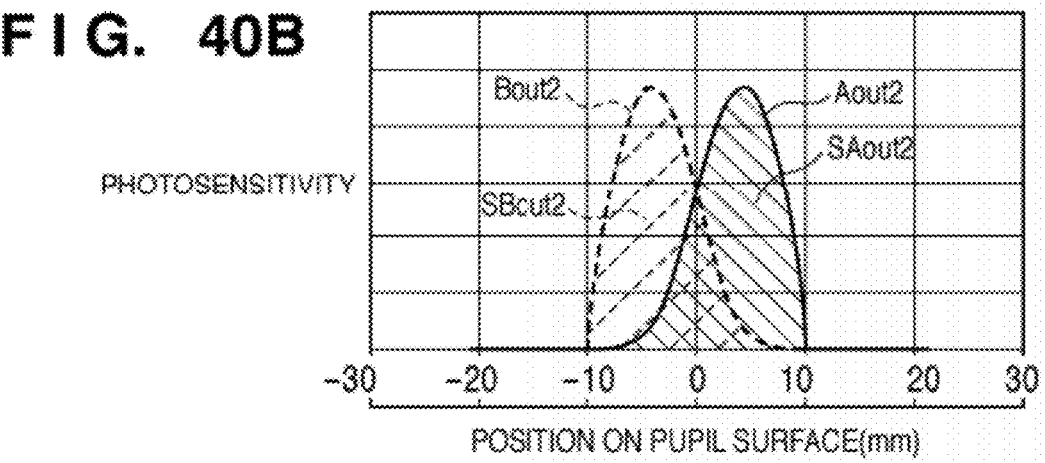
Figure 40C:
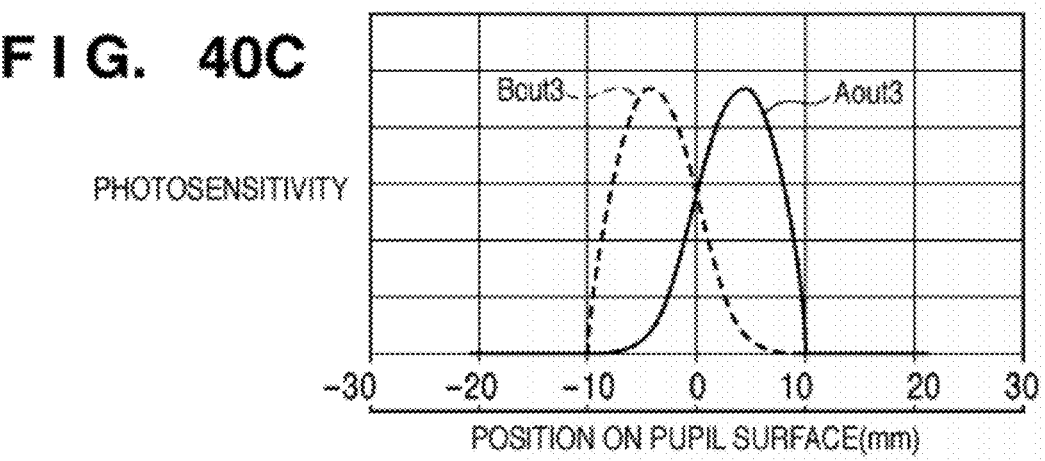

FIGS. 40A to 40C are diagrams for illustrating the process of reducing shape disagreement in pupil intensity distribution at the center image height Img0. FIG. 40A is a one-dimensional diagram of original pupil intensity distributions, FIG. 40B is a one-dimensional diagram in which tailing of the pupil intensity distributions is reduced, and FIG. 40C is a one-dimensional diagram in which total output values of the pixels $S_{HA}$ and $S_{HB}$ are equalized. Incidentally, in FIGS. 40A to 40C, characteristics of the pixel $S_{HA}$ are indicated by a solid line and characteristics of the pixel $S_{HB}$ are indicated by a broken line.

According to the second embodiment, pupil intensity distributions are converted in appearance using the process used for the portion at the center image height Img0 according to the first embodiment.

According to the first embodiment, based on equations (6) to (11) and using correction coefficients for the maximum aperture (f2.8), the correction constants a0, b0, c0, and d0 used to reduce the shape disagreement at the center image height Img0 are given by:

b00=d00=0.15
a0=c0=1
b0=d0=0.15

On the other hand, different correction coefficients are used for an f-number of 4, specifically, as follows:

b00=d00=0.19
a0=c0=1
b0=d0=0.19

Consequently, the pupil intensity distributions in FIG. 40A can be converted, in appearance, into the pupil intensity distributions in FIG. 40C. The reason why the correction coefficients vary with the f-number is that in FIGS. 22A and 40A, value Atar of the encircled portion of the tailing of the pixel $S_{HA}$ and value Badj of the boxed portion of the corresponding pixel $S_{HB}$ differ from each other and so do value Btar of the encircled portion of the tailing of the pixel $S_{HB}$ and value Aadj of the boxed portion of the corresponding pixel $S_{HA}$. That is, since the following values vary with the aperture value b00=Atar/Badj
d00=Btar/Aadj it is necessary to change the correction values.

Figure 41A:
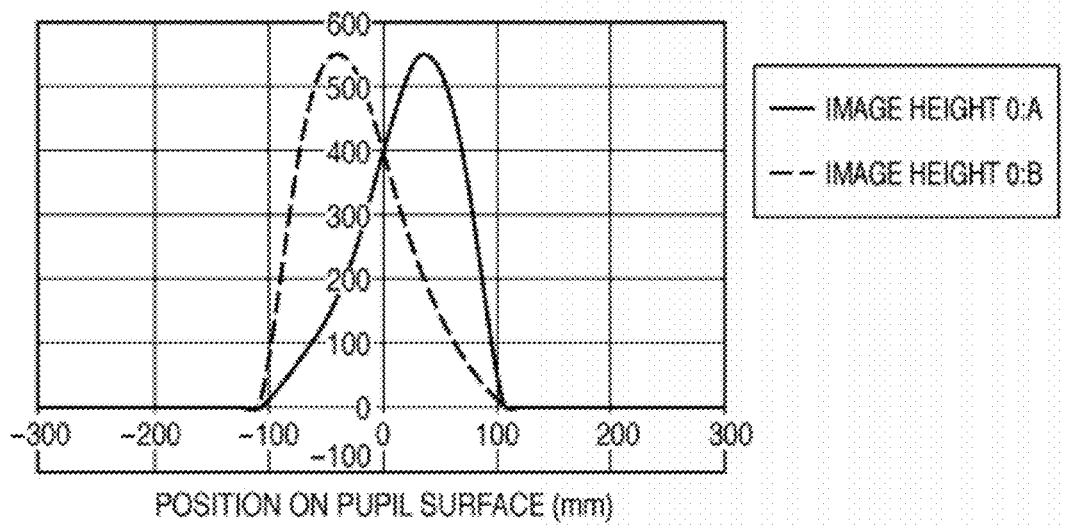
FIGS. 41A and 41B are diagrams showing line spreads, without reduction in shape disagreement, on the surface of the image sensor according to the second embodiment of the present invention.
Figure 41B:
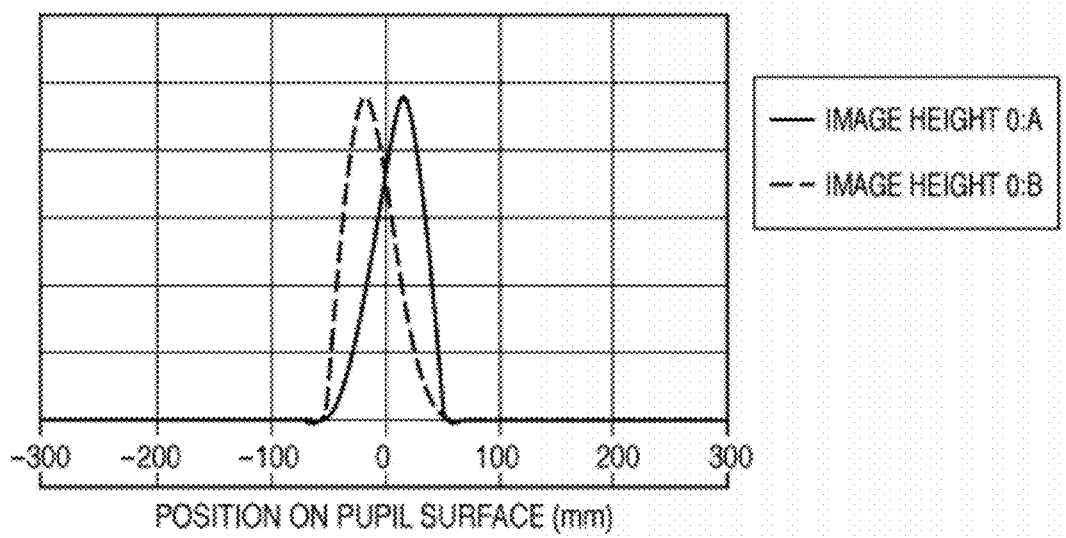

FIGS. 41A and 41B are diagrams showing line spreads on surfaces of the image sensor 107 with different defocus amounts corresponding to the pupil intensity distributions in FIG. 40A, where FIG. 41A shows an example in which the defocus amount is small and FIG. 41B shows an example in which the defocus amount is large. It can be seen that the shape disagreement in the pupil intensity distribution in FIG. 40A is maintained as it is in the line spreads of FIGS. 41A and 41B.

Figure 42A:
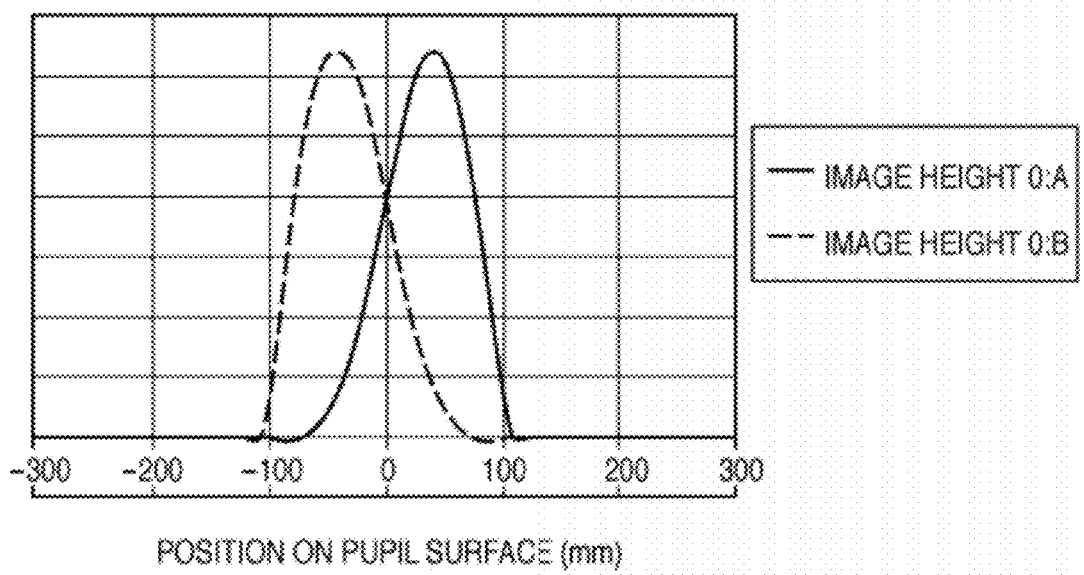
FIGS. 42A and 42B are diagrams showing line spreads, with reduction in shape disagreement, on the surface of the image sensor according to the second embodiment of the present invention.
Figure 42B:
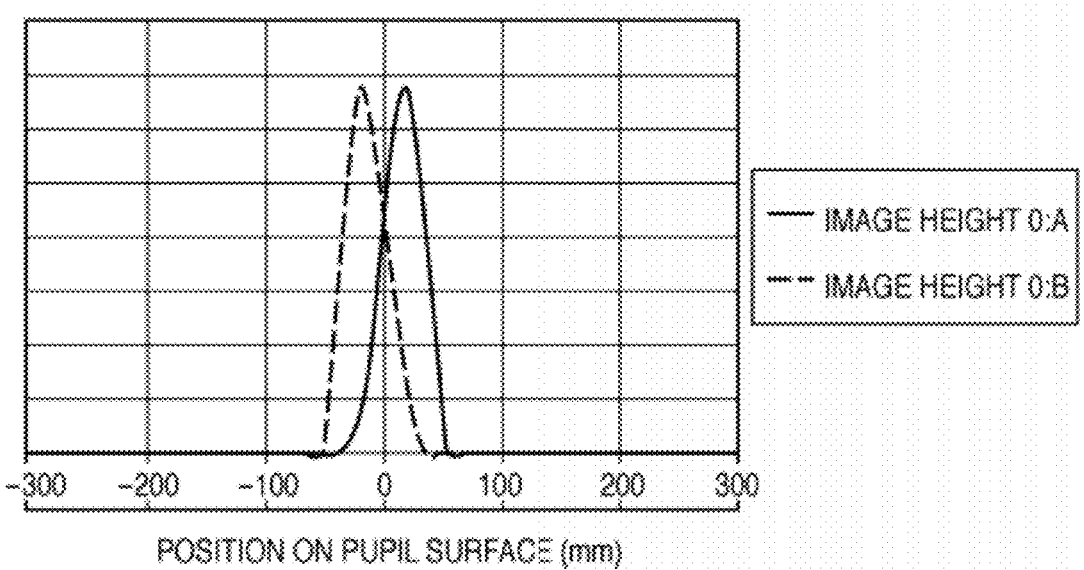

On the other hand, FIGS. 42A and 42B are diagrams showing line spreads on surfaces of the image sensor 107 with different defocus amounts corresponding to the pupil intensity distributions in FIG. 40C, where FIG. 42A shows an example in which the defocus amount is small and FIG. 42B shows an example in which the defocus amount is large. It can be seen that the reduced shape disagreement in the pupil intensity distribution in FIG. 40C is maintained as it is in the line spreads of FIGS. 42A and 42B.

Figure 43A:
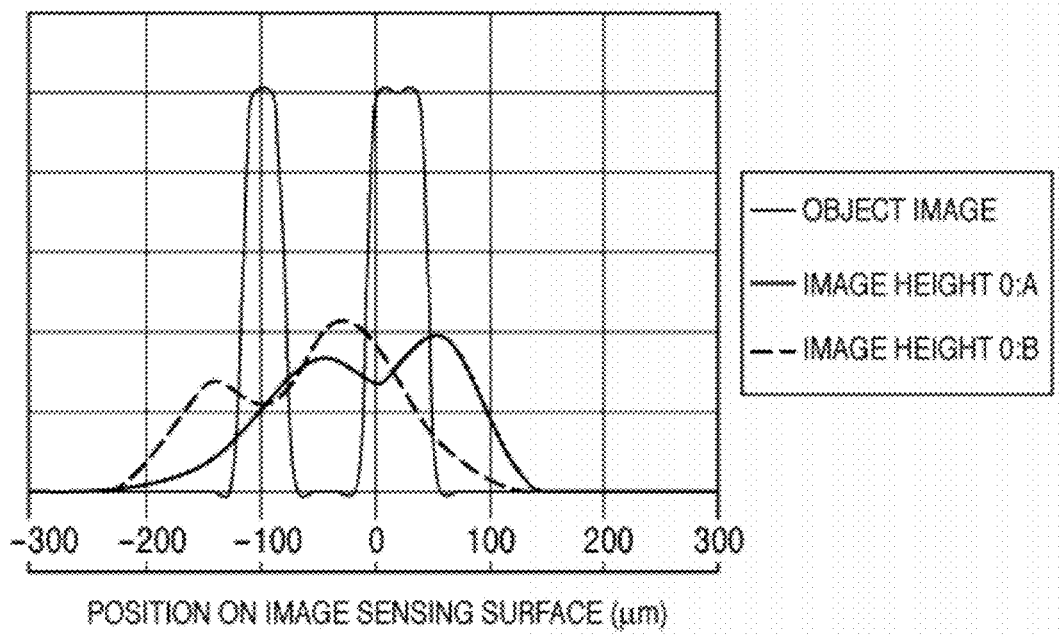
FIGS. 43A and 43B are diagrams showing blurred images of bar charts, without reduction in shape disagreement, on the surface of the image sensor according to the second embodiment of the present invention.
Figure 43B:
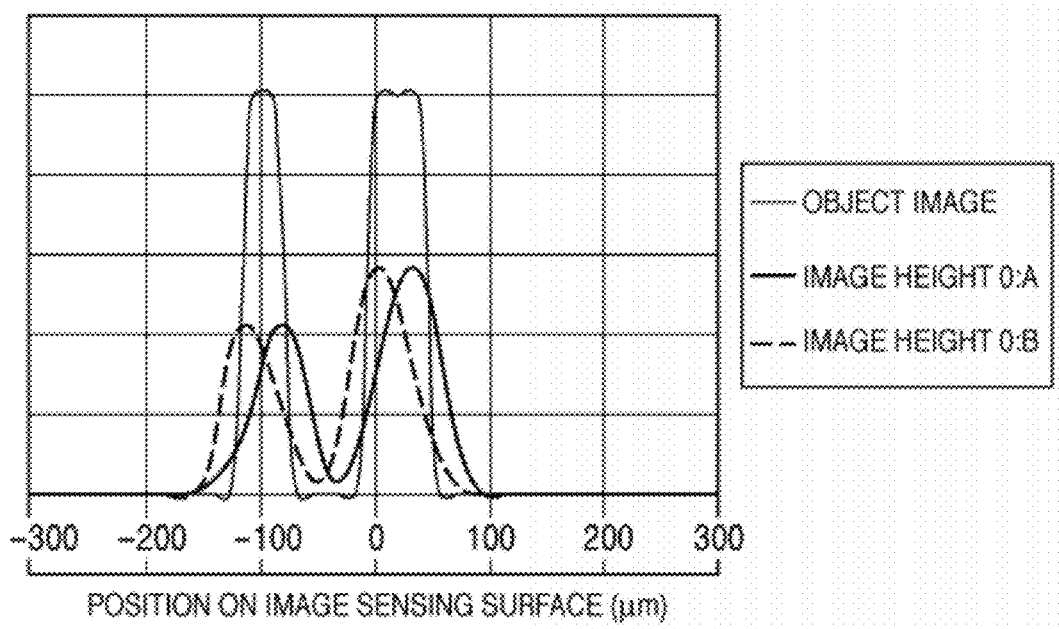

FIGS. 43A and 43B concretely show how two bar charts differing in width get blurred. Convolution integration of the object images with the line spreads in FIGS. 41A and 41B results in blur shapes, and FIGS. 43A and 43B correspond to the defocus amounts in FIGS. 41A and 41B, respectively.

Figure 44A:
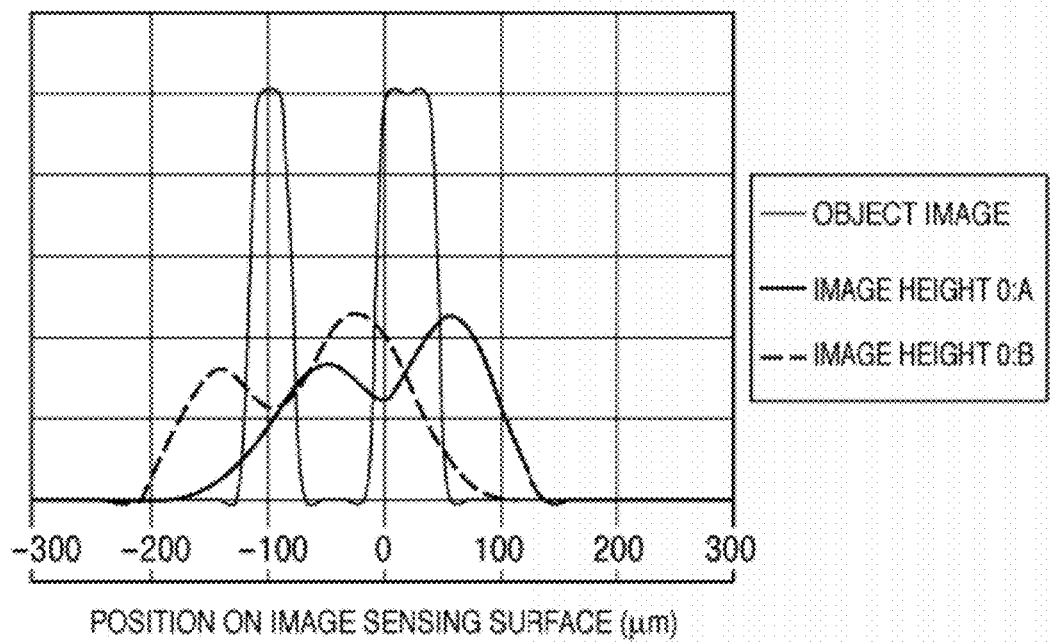
FIGS. 44A and 44B are diagrams showing blurred images of bar charts, with reduction in shape disagreement, on the surface of the image sensor according to the second embodiment of the present invention.
Figure 44B:
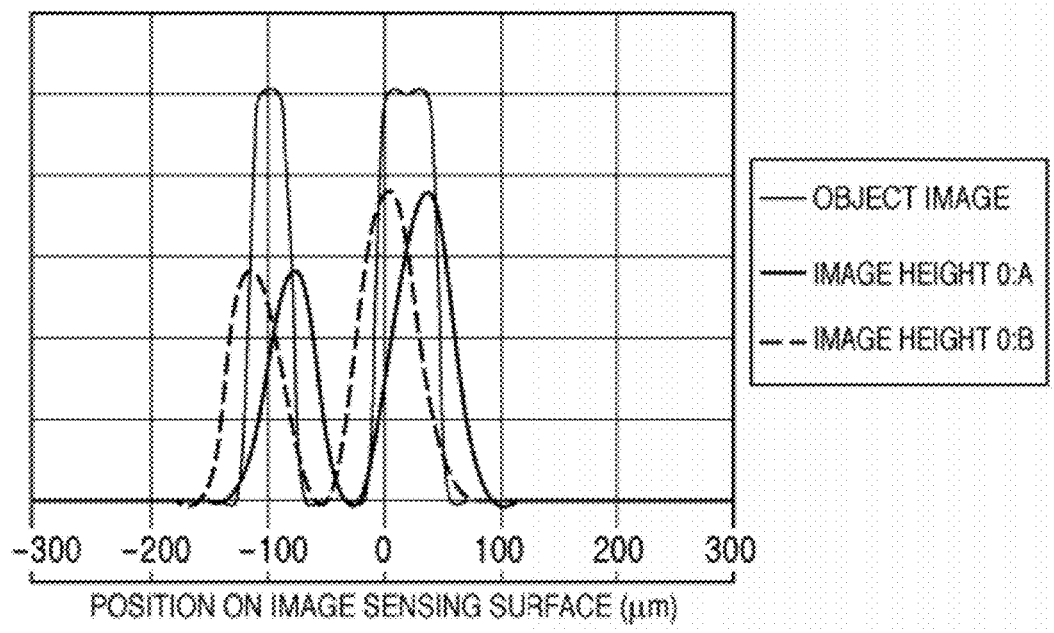

On the other hand, FIGS. 44A and 44B show blurred images of the bar charts on the surface of the image sensor 107. The blurred images are obtained by converting the object images in FIGS. 43A and 43B, that is, the object images whose shapes do not agree well, using equations (10) and (11) above. The blurred images coincide with the shapes resulting from the convolution integration of the line spreads whose shape disagreement has been reduced, and FIGS. 44A and 44B correspond to the defocus amounts in FIGS. 42A and 42B, respectively.

It can be seen that compared to the blur shapes in FIGS. 43A and 43B, the agreement between the blur shapes of the images in FIGS. 44A and 44B have been improved regardless of the degree of defocus.

A flow of a focus detection process according to the second embodiment is the same as the one according to the first embodiment described with reference to the flowchart in FIG. 37 except that the correction coefficients corresponding to the f-number of 4 is read out in step S3.

As described above, the second embodiment makes it possible to restore images using simple calculations by reading out correction coefficients corresponding to various lens aperture values, and thereby improve focusing accuracy.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-328659, filed on Dec. 24, 2008 which is hereby incorporated by reference herein in its entirety.

What is claimed is:

1. A focus detection apparatus comprising:
    an image sensor which includes a pair of pixel groups, outputs a first image signal from one of the pair of pixel groups, and outputs a second image signal from the other of the pair of pixel groups, where the pair of pixel groups receive luminous fluxes passing different pupil regions of an imaging optical system which forms an object image;
    a calculation unit which generates a first corrected image signal by subtracting the second image signal multiplied by a coefficient from the first image signal and generates a second corrected image signal by subtracting the first image signal multiplied by a coefficient from the second image signal; and
    a focus detection unit which detects a defocus amount based on a phase difference between the first corrected image signal and the second corrected image signal generated by said calculation unit.

2. The focus detection apparatus according to claim 1, wherein intensity distributions of the luminous fluxes vary with an image height of the pixel groups and the coefficients are determined in advance based on the intensity distributions corresponding to different image heights.

3. The focus detection apparatus according to claim 1, wherein intensity distributions of the luminous fluxes vary with an aperture value and the coefficients are determined in advance based on the intensity distributions corresponding to different aperture values.

4. The focus detection apparatus according to claim 1, further comprising a storage unit storing the coefficients.

5. An image sensing apparatus comprising:
    an imaging optical system which form an object image; and
    the focus detection apparatus according to claim 1.

6. A focus detection apparatus comprising:
    an image sensor which includes a pair of pixel groups, outputs a first image signal from one of the pair of pixel groups, and outputs a second image signal from the other of the pair of pixel groups, where the pair of pixel groups receive luminous fluxes passing different pupil regions of an imaging optical system which forms an object image;
    a calculation unit which generates a first corrected image signal based on the first image signal and on the second image signal multiplied by a coefficient corresponding to an image height and generates a second corrected image signal based on the second image signal and on the first image signal multiplied by a coefficient corresponding to the image height; and
    a focus detection unit which detects a defocus amount based on a phase difference between the first corrected image signal and the second corrected image signal generated by said calculation unit.

7. A focus detection method comprising:
    an image sensing step of outputting a first image signal from one of a pair of pixel groups and outputting a second image signal from the other of the pair of pixel groups, where the pair of pixel groups receive luminous fluxes passing different pupil regions of an imaging optical system which form an object image;
    a calculation step of generating a first corrected image signal by subtracting the second image signal multiplied by a coefficient from the first image signal, and generating a second corrected image signal by subtracting the first image signal multiplied by a coefficient from the second image signal; and
    a focus detection step of detecting a defocus amount based on a phase difference between the first corrected image signal and the second corrected image signal generated in said calculation step.

8. A non-transitory computer-readable medium storing a program which makes a computer execute the steps of the focus detection method according to claim 7.

* * * * *